United States Patent
Ahn et al.

(10) Patent No.: US 11,792,220 B2
(45) Date of Patent: Oct. 17, 2023

(54) RULE-BASED NETWORK-THREAT DETECTION

(71) Applicant: Centripetal Networks, LLC, Portsmouth, NH (US)

(72) Inventors: David K Ahn, Winston-Salem, NC (US); Keith A. George, Fort Royal, VA (US); Peter P. Geremia, Portsmouth, NH (US); Pierre Mallett, III, Herndon, VA (US); Sean Moore, Hollis, NH (US); Robert T. Perry, Ashburn, VA (US); Jonathan R. Rogers, Hampton Falls, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

(21) Appl. No.: 18/200,801

(22) Filed: May 23, 2023

(65) Prior Publication Data
US 2023/0300162 A1    Sep. 21, 2023

Related U.S. Application Data

(63) Continuation of application No. 17/232,291, filed on Apr. 16, 2021, now Pat. No. 11,700,273, which is a
(Continued)

(51) Int. Cl.
*H04L 9/40* (2022.01)
*H04L 43/028* (2022.01)

(52) U.S. Cl.
CPC ...... *H04L 63/1425* (2013.01); *H04L 63/0227* (2013.01); *H04L 63/0236* (2013.01);
(Continued)

(58) Field of Classification Search
CPC ............. H04L 63/1425; H04L 63/0227; H04L 63/0236; H04L 63/0263; H04L 63/12;
(Continued)

(56) References Cited

U.S. PATENT DOCUMENTS 5,835,726 A    11/1998    Shwed et al.
6,098,172 A    8/2000    Coss et al.
(Continued)

FOREIGN PATENT DOCUMENTS

AU    2005328336 B2    9/2011
AU    2006230171 B2    6/2012
(Continued)

OTHER PUBLICATIONS

"Cisco ACNS Software Configuration Guide for Centrally Managed Deployments," Release 5.5. Text Part No. OL-9136-01, Cisco Systems, Inc., 2006, 944 pages.
(Continued)

*Primary Examiner* — Darren B Schwartz
(74) *Attorney, Agent, or Firm* — Banner & Witcoff, Ltd.

(57) ABSTRACT

A packet-filtering device may receive packet-filtering rules configured to cause the packet-filtering device to identify packets corresponding to network-threat indicators. The packet-filtering device may receive packets and, for each packet, may determine that the packet corresponds to criteria specified by a packet-filtering rule. The criteria may correspond to one or more of the network-threat indicators. The packet-filtering device may apply an operator specified by the packet-filtering rule. The operator may be configured to cause the packet-filtering device to either prevent the packet from continuing toward its destination or allow the packet to continue toward its destination. The packet-filtering device may generate a log entry comprising information from the packet-filtering rule that identifies the one or more network-
(Continued)

threat indicators and indicating whether the packet-filtering device prevented the packet from continuing toward its destination or allowed the packet to continue toward its destination.

30 Claims, 27 Drawing Sheets

Related U.S. Application Data continuation of application No. 17/001,164, filed on Aug. 24, 2020, now Pat. No. 11,012,459, which is a continuation of application No. 16/813,220, filed on Mar. 9, 2020, now Pat. No. 10,757,126, which is a continuation of application No. 16/706,388, filed on Dec. 6, 2019, now Pat. No. 10,609,062, which is a continuation of application No. 16/217,720, filed on Dec. 12, 2018, now Pat. No. 10,567,413, which is a continuation of application No. 15/827,477, filed on Nov. 30, 2017, now Pat. No. 10,193,917, which is a continuation of application No. 14/690,302, filed on Apr. 17, 2015, now Pat. No. 9,866,576.

(52) U.S. Cl.
CPC .......... *H04L 63/0263* (2013.01); *H04L 63/12* (2013.01); *H04L 63/1416* (2013.01); *H04L 63/1441* (2013.01); *H04L 43/028* (2013.01)

(58) Field of Classification Search
CPC .............. H04L 63/1416; H04L 63/1441; H04L 43/028
See application file for complete search history.

(56) References Cited

U.S. PATENT DOCUMENTS

| | | |
|---|---|---|
| 6,147,976 A | 11/2000 | Shand et al. |
| 6,226,372 B1 | 5/2001 | Beebe et al. |
| 6,279,113 B1 | 8/2001 | Vaidya |
| 6,317,837 B1 | 11/2001 | Kenworthy |
| 6,484,261 B1 | 11/2002 | Wiegel |
| 6,611,875 B1 | 8/2003 | Chopra et al. |
| 6,615,357 B1 | 9/2003 | Boden et al. |
| 6,662,235 B1 | 12/2003 | Callis et al. |
| 6,678,827 B1 | 1/2004 | Rothermel et al. |
| 6,678,835 B1 | 1/2004 | Shah et al. |
| 6,826,694 B1 | 11/2004 | Dutta et al. |
| 6,907,042 B1 | 6/2005 | Oguchi |
| 6,922,417 B2 | 7/2005 | Vanlint |
| 6,971,028 B1 | 11/2005 | Lyle et al. |
| 6,981,158 B1 | 12/2005 | Sanchez et al. |
| 7,032,031 B2 | 4/2006 | Jungck et al. |
| 7,089,581 B1 | 8/2006 | Nagai et al. |
| 7,095,716 B1 | 8/2006 | Ke et al. |
| 7,107,613 B1 | 9/2006 | Chen et al. |
| 7,143,438 B1 | 11/2006 | Coss et al. |
| 7,152,240 B1 | 12/2006 | Green et al. |
| 7,185,368 B2 | 2/2007 | Copeland, III |
| 7,215,637 B1 | 5/2007 | Ferguson et al. |
| 7,225,269 B2 | 5/2007 | Watanabe |
| 7,225,468 B2 | 5/2007 | Waisman et al. |
| 7,227,842 B1 | 6/2007 | Ji et al. |
| 7,237,258 B1 | 6/2007 | Pantuso et al. |
| 7,237,267 B2 | 6/2007 | Rayes et al. |
| 7,263,099 B1 | 8/2007 | Woo et al. |
| 7,293,238 B1 | 11/2007 | Brook et al. |
| 7,296,288 B1 | 11/2007 | Hill et al. |
| 7,299,353 B2 | 11/2007 | Le Pennec et al. |
| 7,302,705 B1 | 11/2007 | Boivie |
| 7,331,061 B1 | 2/2008 | Ramsey et al. |
| 7,370,358 B2 | 5/2008 | Ghanea-Hercock |
| 7,389,537 B1 | 6/2008 | Callon et al. |
| 7,478,429 B2 | 1/2009 | Lyon |
| 7,499,412 B2 | 3/2009 | Matityahu et al. |
| 7,539,186 B2 | 5/2009 | Aerrabotu et al. |
| 7,610,621 B2 | 10/2009 | Turley et al. |
| 7,684,400 B2 | 3/2010 | Govindarajan et al. |
| 7,706,358 B2 | 4/2010 | Kitada |
| 7,710,885 B2 | 5/2010 | Ilnicki et al. |
| 7,721,084 B2 | 5/2010 | Salminen et al. |
| 7,747,737 B1 | 6/2010 | Apte et al. |
| 7,752,665 B1 | 7/2010 | Robertson et al. |
| 7,792,775 B2 | 9/2010 | Matsuda |
| 7,814,158 B2 | 10/2010 | Malik |
| 7,814,546 B1 | 10/2010 | Strayer et al. |
| 7,818,794 B2 | 10/2010 | Wittman |
| 7,849,502 B1 | 12/2010 | Bloch et al. |
| 7,913,303 B1 | 3/2011 | Rouland et al. |
| 7,953,014 B2 | 5/2011 | Toda et al. |
| 7,954,143 B2 | 5/2011 | Aaron |
| 7,962,606 B2 | 6/2011 | Barron et al. |
| 7,966,654 B2 | 6/2011 | Crawford |
| 7,990,911 B2 | 8/2011 | Sutivong et al. |
| 8,004,994 B1 | 8/2011 | Darisi et al. |
| 8,009,566 B2 | 8/2011 | Zuk et al. |
| 8,037,517 B2 | 10/2011 | Fulp et al. |
| 8,042,149 B2 | 10/2011 | Judge |
| 8,042,167 B2 | 10/2011 | Fulp et al. |
| 8,065,721 B1 | 11/2011 | Shah |
| 8,117,655 B2 | 2/2012 | Spielman |
| 8,156,206 B2 | 4/2012 | Kiley et al. |
| 8,176,561 B1 | 5/2012 | Hurst et al. |
| 8,219,675 B2 | 7/2012 | Ivershen |
| 8,271,645 B2 | 9/2012 | Rajan et al. |
| 8,306,994 B2 | 11/2012 | Kenworthy |
| 8,307,029 B2 | 11/2012 | Davis et al. |
| 8,331,234 B1 | 12/2012 | Newton et al. |
| 8,370,936 B2 | 2/2013 | Zuk et al. |
| 8,413,238 B1 | 4/2013 | Sutton |
| 8,422,391 B2 | 4/2013 | Zhu |
| 8,438,270 B2 | 5/2013 | Nappier et al. |
| 8,495,725 B2 | 7/2013 | Ahn |
| 8,510,821 B1 | 8/2013 | Brandwine et al. |
| 8,654,626 B2 | 2/2014 | Ichino et al. |
| 8,689,107 B2 | 4/2014 | Dong et al. |
| 8,694,779 B2 | 4/2014 | Gagnon et al. |
| 8,719,943 B2 | 5/2014 | Noel et al. |
| 8,726,379 B1 | 5/2014 | Stiansen et al. |
| 8,789,135 B1 | 7/2014 | Pani |
| 8,806,638 B1 | 8/2014 | Mani |
| 8,819,285 B1 | 8/2014 | Wilkinson et al. |
| 8,832,832 B1 | 9/2014 | Visbal |
| 8,856,926 B2 | 10/2014 | Narayanaswamy et al. |
| 8,914,406 B1 | 12/2014 | Haugsnes et al. |
| 8,918,838 B1 | 12/2014 | Baldonado et al. |
| 8,923,181 B2 | 12/2014 | Yao et al. |
| 8,930,690 B2 | 1/2015 | Zuo et al. |
| 8,935,785 B2 | 1/2015 | Pandrangi |
| 8,955,128 B1 | 2/2015 | Trama et al. |
| 9,009,461 B2 | 4/2015 | Martini |
| 9,021,575 B2 | 4/2015 | Martini |
| 9,077,667 B2 | 7/2015 | Sridhar |
| 9,094,288 B1 | 7/2015 | Nucci et al. |
| 9,094,445 B2 | 7/2015 | Moore et al. |
| 9,100,352 B2 | 8/2015 | Zha et al. |
| 9,124,552 B2 | 9/2015 | Moore |
| 9,137,205 B2 | 9/2015 | Rogers et al. |
| 9,154,446 B2 | 10/2015 | Gemelli et al. |
| 9,160,713 B2 | 10/2015 | Moore |
| 9,172,627 B2 | 10/2015 | Kjendal et al. |
| 9,282,017 B2 | 3/2016 | Iizuka et al. |
| 9,342,691 B2 | 5/2016 | Maestas |
| 9,361,085 B2 | 6/2016 | El-Gillani |
| 9,380,489 B2 | 6/2016 | Kotecha et al. |
| 9,407,602 B2 | 8/2016 | Feghali et al. |
| 9,413,722 B1 | 8/2016 | Ahn et al. |
| 9,419,942 B1 | 8/2016 | Buruganahalli et al. |
| 9,531,672 B1 | 12/2016 | Li et al. |
| 9,544,135 B2 | 1/2017 | Andoni |
| 9,584,536 B2 | 2/2017 | Nantel |
| 9,608,879 B2 | 3/2017 | Cartwright et al. |
| 9,614,689 B2 | 4/2017 | Cook et al. |

(56) References Cited

U.S. PATENT DOCUMENTS

| | | |
|---|---|---|
| 9,634,911 B2 | 4/2017 | Meloche |
| 9,654,503 B1 * | 5/2017 | Kowalyshyn ....... H04L 63/1425 |
| 9,686,193 B2 | 6/2017 | Moore |
| 9,699,043 B2 | 7/2017 | Erb |
| 9,813,306 B1 | 11/2017 | Allen |
| 10,097,510 B2 | 10/2018 | Agrawal et al. |
| 10,142,301 B1 | 11/2018 | Sharifi Mehr et al. |
| 10,193,917 B2 | 1/2019 | Ahn et al. |
| 10,250,618 B2 | 4/2019 | Bhogavilli et al. |
| 10,469,453 B2 | 11/2019 | Reddy et al. |
| 10,476,673 B2 | 11/2019 | Higgins et al. |
| 10,542,028 B2 | 1/2020 | Ahn et al. |
| 10,567,413 B2 | 2/2020 | Ahn et al. |
| 10,659,480 B2 * | 5/2020 | Arcamone ......... H04L 63/1425 |
| 10,757,126 B2 | 8/2020 | Ahn et al. |
| 10,931,797 B2 | 2/2021 | Ahn et al. |
| 2001/0039579 A1 | 11/2001 | Trcka et al. |
| 2001/0039624 A1 | 11/2001 | Kellum |
| 2002/0009079 A1 | 1/2002 | Jungck et al. |
| 2002/0015387 A1 | 2/2002 | Houh |
| 2002/0016858 A1 | 2/2002 | Sawada et al. |
| 2002/0038339 A1 | 3/2002 | Xu |
| 2002/0049899 A1 | 4/2002 | Kenworthy |
| 2002/0083345 A1 | 6/2002 | Halliday et al. |
| 2002/0112188 A1 | 8/2002 | Syvanne |
| 2002/0152209 A1 | 10/2002 | Merugu et al. |
| 2002/0164962 A1 | 11/2002 | Mankins et al. |
| 2002/0165949 A1 | 11/2002 | Na et al. |
| 2002/0186683 A1 | 12/2002 | Buck et al. |
| 2002/0198981 A1 | 12/2002 | Corl et al. |
| 2003/0005122 A1 | 1/2003 | Freimuth et al. |
| 2003/0014665 A1 | 1/2003 | Anderson et al. |
| 2003/0018591 A1 | 1/2003 | Komisky |
| 2003/0035370 A1 | 2/2003 | Brustoloni |
| 2003/0051026 A1 | 3/2003 | Carter et al. |
| 2003/0051165 A1 | 3/2003 | Krishnan et al. |
| 2003/0088787 A1 | 5/2003 | Egevang |
| 2003/0097590 A1 | 5/2003 | Syvanne |
| 2003/0105976 A1 | 6/2003 | Copeland |
| 2003/0110393 A1 | 6/2003 | Brock et al. |
| 2003/0120622 A1 | 6/2003 | Nurmela et al. |
| 2003/0123456 A1 | 7/2003 | Denz et al. |
| 2003/0142681 A1 | 7/2003 | Chen et al. |
| 2003/0145225 A1 | 7/2003 | Bruton et al. |
| 2003/0154297 A1 | 8/2003 | Suzuki et al. |
| 2003/0154399 A1 | 8/2003 | Zuk et al. |
| 2003/0188192 A1 | 10/2003 | Tang et al. |
| 2003/0212900 A1 | 11/2003 | Liu et al. |
| 2003/0220940 A1 | 11/2003 | Futoransky et al. |
| 2004/0010712 A1 | 1/2004 | Hui et al. |
| 2004/0015719 A1 | 1/2004 | Lee et al. |
| 2004/0030776 A1 | 2/2004 | Cantrell et al. |
| 2004/0073655 A1 | 4/2004 | Kan et al. |
| 2004/0088542 A1 | 5/2004 | Daude et al. |
| 2004/0093513 A1 | 5/2004 | Cantrell et al. |
| 2004/0098511 A1 | 5/2004 | Lin et al. |
| 2004/0114518 A1 | 6/2004 | MacFaden et al. |
| 2004/0123220 A1 | 6/2004 | Johnson et al. |
| 2004/0131056 A1 | 7/2004 | Dark |
| 2004/0148520 A1 | 7/2004 | Talpade et al. |
| 2004/0151155 A1 | 8/2004 | Jouppi |
| 2004/0172529 A1 | 9/2004 | Culbert |
| 2004/0172557 A1 * | 9/2004 | Nakae ................ H04L 63/20 726/22 |
| 2004/0177139 A1 | 9/2004 | Schuba et al. |
| 2004/0181689 A1 | 9/2004 | Kiyoto et al. |
| 2004/0181690 A1 | 9/2004 | Rothermel et al. |
| 2004/0193943 A1 | 9/2004 | Angelino et al. |
| 2004/0199629 A1 | 10/2004 | Bomer et al. |
| 2004/0205360 A1 | 10/2004 | Norton et al. |
| 2004/0250124 A1 | 12/2004 | Chesla et al. |
| 2005/0010765 A1 | 1/2005 | Swander et al. |
| 2005/0024189 A1 | 2/2005 | Weber |
| 2005/0071650 A1 | 3/2005 | Jo et al. |
| 2005/0076227 A1 | 4/2005 | Kang et al. |
| 2005/0108557 A1 | 5/2005 | Kayo et al. |
| 2005/0114704 A1 | 5/2005 | Swander |
| 2005/0117576 A1 | 6/2005 | McDysan et al. |
| 2005/0125697 A1 | 6/2005 | Tahara |
| 2005/0138204 A1 | 6/2005 | Tyer et al. |
| 2005/0138353 A1 | 6/2005 | Spies et al. |
| 2005/0141537 A1 | 6/2005 | Kumar et al. |
| 2005/0157647 A1 | 7/2005 | Sterne et al. |
| 2005/0183140 A1 | 8/2005 | Goddard |
| 2005/0188079 A1 | 8/2005 | Motsinger et al. |
| 2005/0188080 A1 * | 8/2005 | Motsinger ............ H04L 67/02 709/224 |
| 2005/0188423 A1 | 8/2005 | Motsinger et al. |
| 2005/0229246 A1 | 10/2005 | Rajagopal et al. |
| 2005/0240989 A1 | 10/2005 | Kim et al. |
| 2005/0249214 A1 | 11/2005 | Peng |
| 2005/0251570 A1 | 11/2005 | Heasman et al. |
| 2005/0278779 A1 | 12/2005 | Koppol et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1 | 3/2006 | Roese et al. |
| 2006/0048209 A1 | 3/2006 | Shelest et al. |
| 2006/0053491 A1 | 3/2006 | Khuti et al. |
| 2006/0070122 A1 | 3/2006 | Bellovin |
| 2006/0075504 A1 | 4/2006 | Liu |
| 2006/0080733 A1 | 4/2006 | Khosmood et al. |
| 2006/0085849 A1 | 4/2006 | Culbert |
| 2006/0098585 A1 | 5/2006 | Singh et al. |
| 2006/0101516 A1 | 5/2006 | Sudaharan et al. |
| 2006/0104202 A1 | 5/2006 | Reiner |
| 2006/0114899 A1 | 6/2006 | Toumura et al. |
| 2006/0129587 A1 | 6/2006 | Renfro et al. |
| 2006/0129810 A1 | 6/2006 | Jeong et al. |
| 2006/0133377 A1 | 6/2006 | Jain |
| 2006/0136987 A1 | 6/2006 | Okuda |
| 2006/0137009 A1 | 6/2006 | Chesla |
| 2006/0146816 A1 | 7/2006 | Jain |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0230167 A1 | 10/2006 | Watanabe et al. |
| 2006/0248580 A1 | 11/2006 | Fulp et al. |
| 2006/0256729 A1 | 11/2006 | Chen et al. |
| 2006/0262798 A1 | 11/2006 | Joshi et al. |
| 2007/0044147 A1 | 2/2007 | Choi et al. |
| 2007/0056038 A1 | 3/2007 | Lok |
| 2007/0083924 A1 | 4/2007 | Lu |
| 2007/0097976 A1 | 5/2007 | Wood et al. |
| 2007/0118894 A1 | 5/2007 | Bhatia |
| 2007/0147380 A1 | 6/2007 | Ormazabal et al. |
| 2007/0192863 A1 | 8/2007 | Kapoor et al. |
| 2007/0211644 A1 | 9/2007 | Ottamalika et al. |
| 2007/0240208 A1 | 10/2007 | Yu et al. |
| 2007/0244974 A1 | 10/2007 | Chasin |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0134328 A1 | 6/2008 | Yang et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0276319 A1 | 11/2008 | Rittermann |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0007219 A1 | 1/2009 | Abzarian et al. |
| 2009/0028160 A1 | 1/2009 | Eswaran et al. |
| 2009/0064332 A1 | 3/2009 | Porras et al. |
| 2009/0077663 A1 | 3/2009 | Sun et al. |

(56) References Cited

U.S. PATENT DOCUMENTS

| | | |
|---|---|---|
| 2009/0138938 A1 | 5/2009 | Harrison et al. |
| 2009/0144819 A1 | 6/2009 | Babbar et al. |
| 2009/0150972 A1 | 6/2009 | Moon et al. |
| 2009/0172800 A1 | 7/2009 | Wool |
| 2009/0198707 A1 | 8/2009 | Rohner |
| 2009/0222877 A1 | 9/2009 | Diehl et al. |
| 2009/0240698 A1 | 9/2009 | Shukla et al. |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0046378 A1 | 2/2010 | Knapp et al. |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0125900 A1 | 5/2010 | Dennerline et al. |
| 2010/0132027 A1 | 5/2010 | Ou |
| 2010/0153316 A1 | 6/2010 | Duffield et al. |
| 2010/0195503 A1 | 8/2010 | Raleigh |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0281536 A1 | 11/2010 | Richards et al. |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0154470 A1 | 6/2011 | Grimes et al. |
| 2011/0185055 A1 | 7/2011 | Nappier et al. |
| 2011/0191467 A1 | 8/2011 | Imbimbo et al. |
| 2011/0213869 A1 | 9/2011 | Korsunsky et al. |
| 2011/0214157 A1 | 9/2011 | Korsunsky et al. |
| 2011/0270956 A1 | 11/2011 | McDysan et al. |
| 2011/0277034 A1 | 11/2011 | Hanson |
| 2011/0305160 A1 | 12/2011 | Green et al. |
| 2012/0023576 A1 | 1/2012 | Sorensen et al. |
| 2012/0047571 A1 | 2/2012 | Duncan et al. |
| 2012/0079101 A1 | 3/2012 | Muppala et al. |
| 2012/0084866 A1 | 4/2012 | Stolfo |
| 2012/0106354 A1 | 5/2012 | Pleshek et al. |
| 2012/0110656 A1 | 5/2012 | Santos et al. |
| 2012/0113987 A1 | 5/2012 | Riddoch et al. |
| 2012/0143650 A1 | 6/2012 | Crowley et al. |
| 2012/0216282 A1 | 8/2012 | Pappu et al. |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0290829 A1 | 11/2012 | Altman |
| 2012/0314617 A1 | 12/2012 | Erichsen et al. |
| 2012/0331543 A1 | 12/2012 | Bostrom et al. |
| 2013/0007257 A1 | 1/2013 | Ramaraj et al. |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0104236 A1 | 4/2013 | Ray et al. |
| 2013/0117852 A1 | 5/2013 | Stute |
| 2013/0139236 A1 | 5/2013 | Rubinstein et al. |
| 2013/0246925 A1 | 9/2013 | Ahuja et al. |
| 2013/0254766 A1 | 9/2013 | Zuo et al. |
| 2013/0262655 A1 | 10/2013 | Desch nes et al. |
| 2013/0291100 A1 | 10/2013 | Ganapathy et al. |
| 2013/0305311 A1 | 11/2013 | Puttaswamy Naga et al. |
| 2014/0007238 A1 | 1/2014 | Magee et al. |
| 2014/0010083 A1 | 1/2014 | Hamdi et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0101764 A1 | 4/2014 | Montoro |
| 2014/0115654 A1 | 4/2014 | Rogers et al. |
| 2014/0140213 A1 | 5/2014 | Raleigh et al. |
| 2014/0150051 A1 | 5/2014 | Bharali et al. |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0245423 A1 | 8/2014 | Lee |
| 2014/0259168 A1 | 9/2014 | McNamee et al. |
| 2014/0259170 A1 | 9/2014 | Amsler |
| 2014/0280778 A1 | 9/2014 | Paxton |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0317737 A1 | 10/2014 | Shin et al. |
| 2014/0321290 A1 | 10/2014 | Jin et al. |
| 2014/0337613 A1 | 11/2014 | Martini |
| 2014/0365372 A1 | 12/2014 | Ross et al. |
| 2014/0366132 A1 | 12/2014 | Stiansen et al. |
| 2015/0016255 A1 | 1/2015 | Bisht et al. |
| 2015/0033336 A1 | 1/2015 | Wang et al. |
| 2015/0052601 A1 | 2/2015 | White et al. |
| 2015/0106927 A1 | 4/2015 | Ferragut et al. |
| 2015/0106930 A1 | 4/2015 | Honda et al. |
| 2015/0121449 A1 | 4/2015 | CP et al. |
| 2015/0128274 A1 | 5/2015 | Giokas |
| 2015/0135325 A1 | 5/2015 | Stevens et al. |
| 2015/0143107 A1 | 5/2015 | Kale et al. |
| 2015/0188937 A1 | 7/2015 | Wu et al. |
| 2015/0207809 A1 | 7/2015 | Macaulay |
| 2015/0215334 A1 | 7/2015 | Bingham et al. |
| 2015/0236968 A1 | 8/2015 | Zhang et al. |
| 2015/0237012 A1 | 8/2015 | Moore |
| 2015/0244734 A1 | 8/2015 | Olson et al. |
| 2015/0256431 A1 | 9/2015 | Buchanan et al. |
| 2015/0304354 A1 | 10/2015 | Rogers et al. |
| 2015/0334009 A1 | 11/2015 | Clark et al. |
| 2015/0334125 A1 | 11/2015 | Bartos et al. |
| 2015/0341389 A1 | 11/2015 | Kurakami |
| 2015/0347246 A1 | 12/2015 | Matsui et al. |
| 2015/0350229 A1 | 12/2015 | Mitchell |
| 2015/0372977 A1 | 12/2015 | Yin |
| 2015/0373043 A1 | 12/2015 | Wang et al. |
| 2016/0020968 A1 | 1/2016 | Aumann et al. |
| 2016/0028751 A1 | 1/2016 | Cruz Mota et al. |
| 2016/0065611 A1 | 3/2016 | Fakeri-Tabrizi et al. |
| 2016/0080316 A1 | 3/2016 | Gonzalez Pizarro et al. |
| 2016/0094418 A1 | 3/2016 | Raney |
| 2016/0112443 A1 | 4/2016 | Grossman et al. |
| 2016/0119365 A1 | 4/2016 | Barel |
| 2016/0127417 A1 | 5/2016 | Janssen |
| 2016/0173446 A1 | 6/2016 | Nantel |
| 2016/0191558 A1 | 6/2016 | Davison |
| 2016/0205069 A1 | 7/2016 | Blocher et al. |
| 2016/0212165 A1 | 7/2016 | Singla et al. |
| 2016/0219065 A1 | 7/2016 | Dasgupta et al. |
| 2016/0226895 A1 | 8/2016 | Huang et al. |
| 2016/0277447 A1 | 9/2016 | Pope et al. |
| 2016/0285706 A1 | 9/2016 | Rao |
| 2016/0294870 A1 | 10/2016 | Banerjee et al. |
| 2016/0344708 A1 | 11/2016 | Kawai et al. |
| 2016/0366099 A1 | 12/2016 | Jordan |
| 2016/0366159 A1 | 12/2016 | Chiba et al. |
| 2017/0223046 A1 | 8/2017 | Singh |
| 2017/0272469 A1 | 9/2017 | Kraemer et al. |
| 2017/0339192 A1 | 11/2017 | Veeramachaneni et al. |

FOREIGN PATENT DOCUMENTS

| | | |
|---|---|---|
| CA | 2600236 A1 | 10/2006 |
| DE | 602016016646.1 | 7/2019 |
| EP | 1006701 A2 | 6/2000 |
| EP | 1313290 A1 | 5/2003 |
| EP | 1484884 A2 | 12/2004 |
| EP | 1677484 A2 | 7/2006 |
| EP | 2385676 A1 | 11/2011 |
| EP | 2482522 A1 | 8/2012 |
| EP | 2498442 A1 | 9/2012 |

(56) References Cited

FOREIGN PATENT DOCUMENTS

| | | | |
|---|---|---|---|
| EP | 1864226 B1 | 5/2013 |
| EP | 3284238 B1 | 7/2019 |
| EP | 2528299 B1 | 8/2019 |
| EP | 3361695 B1 | 3/2020 |
| KR | 20010079361 A | 8/2001 |
| KR | 10-2009-0076556 A | 7/2009 |
| WO | 2005046145 A1 | 5/2005 |
| WO | 2006093557 A2 | 9/2006 |
| WO | 2006105093 A2 | 10/2006 |
| WO | 2007/023465 A1 | 3/2007 |
| WO | 2007109541 A2 | 9/2007 |
| WO | 2011038420 A2 | 3/2011 |
| WO | 2012146265 A1 | 11/2012 |
| WO | 2012164336 A1 | 12/2012 |
| WO | 2014/001773 A1 | 1/2014 |
| WO | 2016168044 A1 | 10/2016 |

OTHER PUBLICATIONS

"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—U.S. Office Action—U.S. Appl. No. 11/390,976.
Sep. 14, 2009 U.S. Office Action—U.S. Appl. No. 11/316,331.
Apr. 29, 2010—U.S. Interview Summary—U.S. Appl. No. 11/390,976.
Aug. 20, 2010—(AU) Office Action—App 2005328336.
Jun. 23, 2010—U.S. Final Rejection—U.S. Appl. No. 11/316,331.
Mar. 26, 2010—U.S. Final Rejection—U.S. Appl. No. 11/390,976.
Sep. 10, 2010—(AU) Office Action—App 2006230171.
Sep. 30, 2010—U.S. Office Action—U.S. Appl. No. 11/390,976.
Apr. 27, 2011—(WO) International Search Report and Written Opinion—App PCT/US2010/054520.
Aug. 25, 2011—U.S. Non Final Rejection—U.S. Appl. No. 12/871,806.
Feb. 14, 2011—(EP) Search Report—App 06758213.0.
Jun. 9, 2011—U.S. Notice of Allowance—U.S. Appl. No. 11/390,976.
Mar. 3, 2011—(EP) Communication Pursuant to Rules 70(2) and 70a(2)—App 06758213.0.
Mar. 4, 2011—U.S. Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—U.S. Non Final Rejection—U.S. Appl. No. 12/871,806.
Feb. 6, 2012—U.S. Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—U.S. Final Rejection—U.S. Appl. No. 12/871,806.
Apr. 4, 2013—U.S. Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—U.S. Final Office Action—U.S. Appl. No. 14/714,207.
Jan. 14, 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
May 14, 2015—U.S. Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—U.S. Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015 U.S. Notice of Allowance—U.S. Appl. No. 14/702,755.
Jul. 11, 2023, Patent Owner's Response, Case IPR2022-01535, U.S. Pat. No. 10,609,062, 25 pages.
Exhibit 2007 as cited in Patent Owner's Response dated Jul. 11, 2023, Case IPR2022-01535, U.S. Pat. No. 10,609,062, Decision Granting Institution of Inter Partes Review, 37 C.F.R. 42.108, dated Feb. 16, 2022, Paper 9, 51 pages.
Exhibit 2009 as cited in Patent Owner's Response dated Jul. 11, 2023, Case IPR2022-01535, U.S. Pat. No. 10,609,062, Transcript of Deposition of Dr. Stuart Staniford, dated Jun. 22, 2023, 50 pages.
Jun. 19, 2023, Petitioner's Reply to Patent Owner's Response, Case IPR2022-01097, U.S. Pat. No. 10,193,917, 41 pages.
Exhibit 1053 as cited in Petitioner's Reply to Patent Owner's Response dated Jun. 19, 2023, Case IPR2022-01097, U.S. Pat. No. 10,193,917, Transcript of the deposition of Dr. Michael Goodrich, IPR2022-01097, dated Jun. 2, 2023, 64 pages.
Aug. 8, 2023 Notice: Issuance of Initial Determination on Violation of Section 337 with Recommendation on Remedy, Inv. No. 337-TA-1314, 2 pages.
Apr. 15, 2016—U.S. Notice of Allowance—U.S. Appl. No. 14/855,374.
Apr. 26, 2016—U.S. Office Action—U.S. Appl. No. 14/745,207.
Dec. 5, 2016—U.S. Notice of Allowance—U.S. Appl. No. 14/714,207.
Feb. 24, 2016—(AU) Office Action—App 2014228257.
Feb. 25, 2016—(AU) Office Action—App 2014249055.
Feb. 26, 2016—U.S. Non Final Office Action—U.S. Appl. No. 14/253,992.
Jan. 11, 2016—U.S. Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—U.S. Office Action—U.S. Appl. No. 14/921,718.
Jun. 9, 2016—(WO) International Search Report—PCT/US2016/026339.
Jun. 14, 2016—U.S. Office Action—U.S. Appl. No. 14/625,486.
Jun. 16, 2016—(CA) Office Action—App 2,888,935.
May 6, 2016—U.S. Office Action—U.S. Appl. No. 14/714,207.
May 13, 2016—U.S. Office Action—U.S. Appl. No. 13/940,240.
Nov. 21, 2016—U.S. Office Action—U.S. Appl. No. 14/745,207.
Oct. 5, 2016—U.S. Notice of Allowance—U.S. Appl. No. 14/698,560.
Oct. 26, 2016—U.S. Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—U.S. Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017—U.S. Notice of Allowance—U.S. Appl. No. 14/625,486.

(56) References Cited

OTHER PUBLICATIONS

Feb. 15, 2017—U.S. Notice of Allowance—U.S. Appl. No. 14/921,718.
Jul. 20, 2017 U.S. Complaint for Patent Infringement—Case No. 2:17-cv-00383-HCN-LRL, Document 1, 38 pages.
Jun. 7, 2017—U.S. Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 U.S. Notice of Allowance—U.S. Appl. No. 14/690,302.
Nov. 3, 2017 U.S. Non-Final Office Action—U.S. Appl. No. 15/413,834.
Oct. 17, 2017 (WO) International Preliminary Report on Patentability—App. PCT/US2016/026339.
Sep. 5, 2017 (US) Defendant Ixia's Partial Answer to Complaint for Patent Infringement—Case No. 2:17-cv-00383-HCN-LRL, Document 29, 14 pages.
Sep. 5, 2017 (US) Memorandum in Support of Defendant's Ixia and Keysight Technologies, Inc's Motion to Dismiss for Unpatentability Under 35 U.S.C. § 101—Case No. 2:17-cv-00383-HCM-LRL, Document 21, 29 pages.
Sep. 5, 2017 (US) Request for Judicial Notice in Support of Defendants Ixia and Keysight Technologies, Inc's Motion to Dismiss for Unpatentability under 35 U.S.C. § 101—Case No. 2:17-cv-00383-HCN-LRL, Document 22, 3 pages.
Sep. 29, 2017 (CA) Examination Report—App. 2,772,630.
Apr. 17, 2018 U.S. Non-Final Office Action—U.S. Appl. No. 15/610,995.
Aug. 15, 2018 (US) Declaration of Kevin Jeffay, PhD in Support of Petition for Inter Partes Review of U.S. Pat. No. 9,565,213—IPR2018-01512.
Aug. 20, 2018 (US) Petition for Inter Partes Review of U.S. Pat. No. 9,565,213—IPR2018-01512.
Aug. 29, 2018 (CA) Office Action—App. 2,888,935.
Aug. 9, 2018 U.S. Non-Final Office Action—U.S. Appl. No. 15/413,947.
Jul. 11, 2018 (US) Declaration of Kevin Jeffay, PhD in Support of Petition for Inter Partes Review of U.S. Pat. No. 9,565,213—IPR2018-01386.
Jul. 12, 2018 (US) Petition for Inter Partes Review of U.S. Pat. No. 9,565,213—IPR2018-01386.
Jul. 13, 2018 U.S. Notice of Allowance—U.S. Appl. No. 15/414,117.
Jul. 20, 2018 (US) Declaration of Dr. Stuart Staniford in Support of Petition for Inter Partes Review of U.S. Pat. No. 9,124,552—IPR2018-01436.
Jul. 20, 2018 (US) Declaration of Dr. Stuart Staniford in Support of Petition for Inter Partes Review of U.S. Pat. No. 9,160,713—IPR2018-01437.
Jul. 20, 2018 (US) Petition for Inter Partes Review of U.S. Pat. No. 9,124,552—IPR2018-01436.
Jul. 20, 2018 (US) Petition for Inter Partes Review of U.S. Pat. No. 9,160,713—IPR2018-01437.
May 29, 2023 (AU) Examination Report No. 1, App 2022202068, 6 pages.
Aug. 29, 2022—Petitioner's Reply to Patent Owner's Response, Case IPR-2021-01147, U.S. Pat. No. 10,542,028, 41 pages.
Aug. 31, 2022—Petitioner's Reply to Patent Owner's Response, Case IPR2021-01148, U.S. Pat. No. 10,757,126, 42 pages.
Jun. 28, 2022 (EP) Nullty Action (English translation), Patent: EP3284238 (DE file No. 602016016646.1), Plaintiff: Keysight Technologies Deutschland, GmbH, Defendant: Centripetal Networks Inc., 51 pages.
Sep. 13, 2022 Petition for Inter Partes Review of U.S. Pat. No. 10,609,062, Inter Partes Review No. Unassigned, U.S. Pat. No. 10,609,062, 86 pages.
Exhibit 1003 as cited in Petition for Inter Partes Review, Inter Partes Review No. Unassigned, U.S. Pat. No. 10,609,062, Declaration of Dr. Stuart Staniford In Support of Petition for Inter Partes Review of U.S. Pat. No. 10,609,062, dated Sep. 8, 2022, 150 pages.
Sep. 22, 2022 Patent Owner's Sur-Reply, Case IPR2021-01147, U.S. Pat. No. 10,542,028, 32 pages.
Sep. 22, 2022 Patent Owner's Sur-Reply, Case IPR2021-01148, U.S. Pat. No. 10,757,126, 33 pages.
Sep. 19, 2022 Patent Owner's Sur-Reply to Petitioner's Reply, Case IPR2021-01149, U.S. Pat. No. 10,567,413, 41 pages.
Sep. 21, 2022 Patent Owner's Preliminary Response, Case IPR2022-01097, U.S. Pat. No. 10,193,917, 53 pages.
Exhibit 2001 as listed in Patent Owner's Preliminary Response, Case IPR2022-01097, U.S. Pat. No. 10,193,917, Petition for Inter Partes Review of U.S. Pat. No. 10,609,062, No. IPR2022-01535, Paper 1 (P.T.A.B. Sep. 13, 2022), 86 pages.
Exhibit 2004 as cited in Patent Owner's Preliminary Response, Case IPR2022-01097 (U.S. Pat. No. 10,193,917), Joint Claim Construction Chart, Certain Computer Network Security Equipment and Systems, Related Software, Components Thereof, and Products Containing Same, Inv. No. 337-TA-1314 (Aug. 15, 2022), 9 pages.
Feb. 9, 2023, US Judgment, Final Written Decision, IPR2021-01147, U.S. Pat. No. 10,542,028 B2, Paper 40, 48 pages.
Feb. 9, 2023, US Judgment, Final Written Decision, IPR2021-01148, U.S. Pat. No. 10,757,126 B2, Paper 40, 44 pages.
Jan. 20, 2023—US Patent Owner's Preliminary Response, Case IPR2022-01535, U.S. Pat. No. 10,609,062, 43 pages.
Exhibit 2009 as cited in Patent Owner's Updated Exhibit List dated Jan. 23, 2023, Case IPR2022-01097, U.S. Pat. No. 10,193,917, Declaration of Dr. Alessandro Orso in Support of Patent Owner's Preliminary Response, Case IPR2022-01097, U.S. Pat. No. 10,193,917, dated Sep. 21, 2022, 108 pages.
Feb. 22, 2023 (US) Order No. 37: Construing Certain Terms of the Asserted Claims (Markman Claim Construction), Inv. No. 337-TA-1314, 41 pages.
Feb. 17, 2023 (US) Judgment, Final Written Decision Determining All Challenged Claims Unpatentable 35 U.S.C. § 318 (a), Paper 46, IPR2021-01149, U.S. Pat. No. 10,567,413B2, 58 pages.
Sep. 19, 2022 US Declaration of Michael T. Goodrich, Ph.D. In Support of Patent Owner's Sur-Reply to Petitioner's Reply, Case IPR2021-01149, U.S. Pat. No. 10,567,413, 7 pages.
Dec. 19, 2022 US Decision Granting Institution of Inter Partes Review 35 U.S.C. § 314, Paper 8, IPR2022-01097, U.S. Pat. No. 10,193,917B2, 37 pages.
Mar. 27, 2023 Patent Owner's Response, Case IPR2022-01097, U.S. Pat. No. 10,193,917, 44 pages.
Apr. 18, 2023 Decision Granting Institution of Inter Partes Review 35 U.S.C.§ 314, Paper 9, IPR2022-01535, U.S. Pat. No. 10,609,062 B1, 36 pages.
Exhibit 2003 as cited in Patent Owner's Response, Case IPR2022-01097, U.S. Pat. No. 10,193,917, dated Mar. 27, 2023, Order No. 7, Adopted Procedural Schedule, Inv. No. 337-TA-1314, dated Jun. 17, 2022, 10 pages.
Exhibit 2006 as cited in Patent Owner's Response, Case IPR2022-01097, U.S. Pat. No. 10,193,917, dated Mar. 27, 2023, Excerpts from Exhibit B1, Claim Chart from '917 Patent, Respondent's Initial Disclosure of Burden Contentions, Inv. No. 337-TA-1314, Aug. 17, 2022, 1 page.
Exhibit 2013 as cited in Patent Owner's Response, Case IPR2022-01097, U.S. Pat. No. 10,193,917, dated Mar. 27, 2023, Declaration of Dr. Michael Goodrich in Support of Patent Owner's Response, dated Mar. 27, 2023, Case IPR2022-01097, U.S. Pat. No. 10,193,917, 89 pages.
Exhibit 2014 as cited in Patent Owner's Response, Case IPR2022-01097, U.S. Pat. No. 10,193,917, dated Mar. 27, 2023, Excerpts from Tanenbaum, et al., Computer Networks (5th Ed. 2011) (p. 405), 2011, 3 pages.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Nichols, et al., "Definition of the Differentiated Services Field (DS Field) in the IPv4 and IPv6 Headers," Network Working Group RFC 2474, Dec. 1998, 20 pages.

(56) References Cited

OTHER PUBLICATIONS

O. Paul et al., "A full Bandwidth ATM Firewall", Proceedings of the 6th European Symposium on Research in Computer Security ESORICS'2000, 2000.
P. Warkhede et al., "Fast Packet Classification for Two-Dimensional Conflict-Free Filters", Proceedings of IEEE INFOCOM, 1434-1443, 2001.
Palo Alto Networks; "Designing A Zero Trust Network With Next-Generation Firewalls"; pp. 1-10; last viewed on Oct. 21, 2012.
Perkins, "IP Encapsulation with IP," Network Working Group RFC 2003, Oct. 1996, 14 pages.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
R.L. Graham et al., "Optimization and Approximation in Deterministic Sequencing and Scheduling: A Survey", Annals of Discrete Mathematics, 5: 287-326, 1979.
Reumann, John; "Adaptive Packet Filters"; IEEE, 2001, Department of Electrical Engineering and Computer Science, The University of Michigan, Ann Arbor, MI.
S,M. Bellovin et al., "Network Firewalls", IEEE Communications Magazine, 50-57, 1994.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
Singh, Rajeev et al. "Detecting and Reducing the Denial of Service attacks in WLANs", Dec. 2011, World Congress on Information and Communication TEchnologies, pp. 968-973.
Sourcefire 3D System User Guide, Version 4.10, Mar. 16, 2011, 2123 pages.
Statement RE: Related Application, dated Jul. 24, 2015.
Tarsa et al., "Balancing Trie-Based Policy representations for Network Firewalls," Department of Computer Science, Wake Forest University, pp. 1-6 (2006).
U. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Ylonen, et al, "The Secure Shell (SSH) Transport Layer Protocol," SSH Communication Security Corp, Newtork Working Group RFC 4253, Jan. 2006, 32 pages.
Dec. 18, 2018 U.S. Final Office Action—U.S. Appl. No. 15/610,995.
Jan. 24, 2019 U.S. Notice of Allowance—U.S. Appl. No. 15/610,995.
Feb. 6, 2019 U.S. Final Office Action—U.S. Appl. No. 15/413,750.
Feb. 6, 2019 U.S. Notice of Allowance and Fees Due—U.S. Appl. No. 16/039,896.
Sep. 17, 2018 (US) Petition for Inter Partes Review of U.S. Pat. No. 9,560,176 (First)—IPR 2018-01654.
Sep. 17, 2018 (US) Declaration of Narasimha Reddy Ph.D., in Support Of Petition for Inter Partes Review of U.S. Pat. No. 9,560,176 (First)—IRP2018-01654.
Sep. 17, 2018 (US) Petition for Inter Partes review of U.S. Pat. No. 9,560,176 (Second)—IPR2018-01655.
Sep. 17, 2018 (US) Declaration of Narasimha Reddy Ph.D., in Support Of Petition for Inter Partes Review of U.S. Pat. No. 9,560,176 (Second)—IRP2018-01655.
Reddy, A.L.(2012) A.L. Narasimha Reddy Curriculum Vitae. Retrieved from https://cesg.tamu.edu/wp-content/uploads/2012/02/res_ext032.pdf, 16 pages.
Frahim, et al., "Cisco ASA: All-in-One Firewall, IPS, and VPN Adaptive Security Appliance," Indiana: Cisco Press: 2006, 54 pages.
Mar. 8, 2019 U.S. Notice of Allowance and Fees Due—U.S. Appl. No. 16/060,374.
Mar. 11, 2019 U.S. Final Office Action—U.S. Appl. No. 16/030,354.
Feb. 21, 2019 U.S. Final Office Action—U.S. Appl. No. 15/382,806.
Jan. 24, 2019 (US) Decision—Institution of Inter Partes Review of U.S. Pat. No. 9,160,713 B2—IPR 2018-01437.
Mar. 8, 2019 U.S. Notice of Allowance and Fees Due—U.S. Appl. No. 16/030,374.
Aug. 21, 2018 (US) Petition for Inter Partes Review of U.S. Pat. No. 9,686,193—IPR2018-01559.
Aug. 15, 2018 (US) Declaration of Staurt Staniford, PhD in Support of Petition for Inter Partes Review of U.S. Pat. No. 9,686,193—IPR2018-01556.
Jan. 24, 2019 (US) Decision—Institution of Inter Partes Review of U.S. Pat. No. 9,124,552 B2—IPR 2018-01436.
Mar. 18, 2019 (AU) First Examination Report—App. 2016379156.
Apr. 8, 2019 U.S. Final Office Action—U.S. Appl. No. 15/413,947.
Aug. 10, 2018 (US) Declaration of Kevin Jeffay, PhD in Support of Fourth Petition for Inter Partes Review of U.S. Pat. No. 9,137,205—IPR2018-01506.
Aug. 10, 2018 (US) Fourth Petition for Inter Partes Review of U.S. Pat. No. 9,137,205—IPR2018-01506.
Aug. 3, 2018 (US) Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,560,077—IPR2018-01513.
Apr. 2, 2019 (US) Decision—Institution of Inter Partes Review of U.S. Pat. No. 9,560,077—IPR 2018-01513.
Aug. 10, 2018 (US) Petition for Inter Partes Review of Claims 1-20 of U.S. Pat. No. 9,560,077—IPR2018-01513.
Jun. 3, 2019 U.S. Final Office Action—U.S. Appl. No. 15/614,956.
May 23, 2019 U.S. Non-Final Office Action—U.S. Appl. No. 14/745,207.
May 24, 2019 U.S. Non-Final Office Action—U.S. Appl. No. 16/111,524.
Jun. 3, 2019 (EP) Communication pursuant to Article 94(3) EPC—Third Examination Report—App. 13765547.8.
Aug. 2, 2018 U.S. Notice of Allowance and Fees Due—U.S. Appl. No. 16/030,254.
Jul. 5, 2019 (EP) Extended European Search Report—App. 19179539.2.
Aug. 2, 2019 (CA) Office Action—App. 2,888,935.
Aug. 2, 2019 U.S. Non-Final Office Action—U.S. Appl. No. 16/448,969.
Aug. 16, 2019 (EP) Extended Search Report—App. 19170936.9.
Sep. 18, 2018 (US) Petition for Inter Partes Review of U.S. Pat. No. 9,413,722—IPR 2018-01760.
Sep. 18, 2018 (US) Declaration of Dr. Stuart Staniford in Support of Petition for Inter Partes Review of U.S. Pat. No. 9,413,722—IPR 2018-01760.
Sep. 3, 2019 U.S. Notice of Allowance and Fees Due—U.S. Appl. No. 16/518,190.
Aug. 19, 2019 (EP) Communication pursuant to Article 94(3) EPC—Examination Report—App. 14719415.3.
Oct. 11, 2019—U.S. Non-Final Office Action—U.S. Appl. No. 16/554,293.
Oct. 10, 2019—U.S. Notice of Allowance—U.S. Appl. No. 16/448,997.
Sep. 30, 2019 (WO) International Search Report and Written Opinion of International Searching Authority—Application No. PCT/US2019/040830.
Exhibit 1022—"Transmission Control Protocol," IETF RFC 793. J. Postel, ed., Sep. 1981.
Exhibit 1023—"Internet Protocol," IETF RFC 791, J. Postel, ed., Sep. 1981.

(56) References Cited

OTHER PUBLICATIONS

Exhibit 1024—"File Transfer Protocol," IETF RFC 765, J. Postel, ed., Jun. 1980.
May 20, 2019 (US) Decision—Institution of Inter Partes Review of U.S. Pat. No. 9,413,722 B1—IPR 2018-01760.
Aug. 20, 2019 (US) Declaration of Dr. Alessandro Orso in Support of Patent Owner's Response of U.S. Pat. No. 9,413,722—IPR 2018-01760.
Feb. 21, 2019 (US) Patent Owner's Preliminary Response of U.S. Pat. No. 9,413,722—IPR 2018-01760.
Aug. 20, 2019 (US) Patent Owner's Response of U.S. Pat. No. 9,413,722—IPR 2018-01760.
Jan. 15, 2020 (US) Patent Owner's Sur-Reply to Petitioner's Reply—IPR 2018-01760.
Jan. 8, 2020 (US) Deposition of Jacob H. Baugher, III—IPR 2018-01760.
May 18, 2020 (US)—Judgment—Final Written Decision—IPR 2018-01760.
Dec. 2, 2020—U.S. Notice of Allowance—U.S. Appl. No. 17/001,164.
Dec. 4, 2019—U.S. Notice of Allowance—U.S. Appl. No. 16/217,720.
Nov. 13, 2019—U.S. Notice of Allowance—U.S. Appl. No. 16/554,252.
Nov. 11, 2020—(EP) Examination Report—App 19179539.2.
Jan. 30, 2020—U.S. Notice of Allowance—U.S. Appl. No. 16/706,388.
Apr. 28, 2020—U.S. Notice of Allowance—U.S. Appl. No. 16/813,220.
Jul. 8, 2020—U.S. Corrected Notice of Allowability—U.S. Appl. No. 16/813,220.
Mar. 28, 2019—(AU) First Examination Report—App 2016247760.
Nov. 11, 2019—(AU) Second Examination Report—App 2016247760.
Exhibit 1002 in IPR2021-01147, File History of U.S. Pat. No. 10,542,208, Ahn, et al., issued Jan. 21, 2020.
Exhibit 1003 in IPR2021-01147, Declaration of Dr. Wenke Lee in Support of Petition for Inter Partes Review of U.S. Pat. No. 10,542,028, 164 pages, executed Jul. 19, 2021.
Exhibit 1004 in IPR2021-01147, IPR2021-01148 and IPR2021-01149, "Sourcefire 3D System User Guide," IPR2021-01147, 2123 pages, dated Mar. 16, 2011.
Exhibit 1007 in IPR2021-01147, IPR2021-01148 and IPR2021-01149, Leiner, et al., "A Brief History of the Internet," 1997, internetsociety.org, 19 pages, date of publication unknown bur, prior to Jul. 26, 2021, IPR2021-01147.
Exhibit 1009 in IPR2021-01147, IPR2021-01148 and IPR2021-01149, Spafford, "The Internet Worm Program: An Analysis," Purdue Technical Report CSD-TR-823, IPR2021-01147, 41 pages, date of publication unknown but, prior to Jul. 26, 2021.
Exhibit 1010 in IPR2021-01147, IPR2021-01148 and IPR2021-01149. Rochlis, et al., "With Miscroscope and Tweezers: The Worm from MIT's Perspective," Jun. 1989, vol. 32, No. 6, Communications of the ACM, pp. 689-698.
Exhibit 1011 in IPR2021-01147, IPR2021-01148 and IPR2021-01149, Eisenberg, et al., The Cornell Commission: On Morris and the Worm, The Internet Worm, Communications of the ACM, Jun. 1989, vol. 32, No. 6, pp. 706-709.
Exhibit 1012 in IPR2021-01147, IPR2021-01148 and IPR2021-01149, Mogul, "Simple and Flexible Datagram Access Controls for Unix-Based Gateways,", Mar. 1989, 34 pages.
Exhibit 1013 in IPR2021-01147, IPR2021-01148 and IPR2021-01149, Abernathy, PhoneBoy's Security Theater, "Blast from the CHKP Past: Can't Talk to Translated IP from Internal Net," <<https://web.archive.org/web/20140102143305/http://phoneboy.net/>>, printed Sep. 17, 2018, 12 pages.
Exhibit 1014 in IPR2021-01147, IPR2021-01148 and IPR2021-01149, SonicWALL Global Management System, 2 pages, date of publication unknown but, prior to Jul. 26, 2021.
Exhibit 1015 in IPR2021-01147, IPR2021-01148 and IPR2021-01149, SonicWALL ViewPoint 60 Administrator Guide, 2010, 392 pages.
Exhibit 1016 in IPR2021-01147, IPR2021-01148 and IPR2021-01149, Heberlein, et al., "A Network Security Monitor," Nov. 1989, 37 pages.
Exhibit 1017 in IPR2021-01147, IPR2021-01148 and IPR2021-01149, Netranger™, User's Guide, 335 pages, date of publication unknown but, prior to Jul. 26, 2021.
Nov. 23, 2021—(EP) Notice of Intervention, Opposition Against EP3395043, 29 pages.
Jun. 23, 2021—(EP) Notice of Opposition—Patent No. 2974212 [App. No. 14719415.3].
Deering & Hinden, "Internet Protocol, Version 6 (IPv6)," The Internet Society, RFC 2460 (Dec. 1998).
Dierks & Allen, "The TLS Protocol, Version 1.0," The Internet Society, RFC 2246 (Jan. 1999).
Dierks & Rescorla, "The Transport Layer Security (TLS) Protocol Version 1.2," The IETF Trust, RFC 5246 (August (2008).
Fielding et al., "Hypertext Transfer Protocol—HTTP/1.1," The Internet Society, RFC 2616 (Jun. 1999).
Eric Cole et al., Network Security Bible, pp. 237-254 (2005).
Richard A. Deal, "Cisco Router Firewall Security," pp. 5-51, 259-260, 301-317, 351-361, 444-450, 597-603, 631 (2004).
Declaration of Sarah Ehrig on "Sourcefire 3D System User Guide Version 4.10" (Jun. 14, 2021).
Declaration of Jacob H. Baugher III filed in IPR2018-01760 *Cisco Systems, Inc.* v. *Centripetal Networks, Inc.* (Dec. 4, 2019).
Declaration of Sarah Ehrig on "Sourcefire 3D System User Guide Version 5.1.1" (Jun. 21, 2021).
May 5, 2021 (US) Re-Exam of U.S. Pat. No. 9,686,193.
Nov. 12, 2021—Patent Owner's Preliminary Response Under 37 C.F.R. § 42.107, Caes IPR2021-01147, U.S. Pat. No. 10,542,028, *Palo Alto Networks, Inc.* v. *Centripetal Networks, Inc.*, 67 pages.
Feb. 10, 2022—Decision Granting Institution of Inter Partes Review 35 U.S.C. § 314, IPR2021-01147, U.S. Pat. No. 10,542,028 B2, *Palo Alto Networks, Inc.* v. *Centripetal Networks, Inc.*, 35 pages.
Nov. 12, 2021—Patent Owner's Preliminary Response Under 37 C.F.R. § 42.107, Case IPR2021-01148, U.S. Pat. No. 10,757,126, *Palo Alto Networks, Inc.* v. *Centripetal Networks, Inc.*, 73 pages.
Feb. 10, 2022—Decision Granting Institution of Inter Partes Review 35 U.S.C. § 314, IPR2021-01148, U.S. Pat. No. 10,757,126 B2, *Palo Alto Networks, Inc.* v. *Centripetal Networks, Inc.*, 41 pages.
Nov. 24, 2021—Patent Owner's Preliminary Response Under 37 C.F.R. § 42.107, Case IPR2021-01149, U.S. Pat. No. 10,567,413, *Palo Alto Networks, Inc.* v. *Centripetal Networks, Inc.*, 68 pages.
Feb. 22, 2022—Decision Granting Institution of Inter Partes Review 35 U.S.C. § 314, IPR2021-01149, U.S. Pat. No. 10,567,413 B2, *Palo Alto Networks, Inc.* v. *Centripetal Networks, Inc.*, 50 pages.
May 20, 2022—Patent Owner's Response—Case IPR2021-01147, U.S. Pat. No. 10,542,028, 79 pages.
Exhibit 2001 listed in Patent Owner's Responses dated May 20, 2022, in IPR2021-01147, IPR2021-01148 and IPR2021-01149—Declaration of Hannah Lee in Support of Plaintiff Centripetal Networks, Inc.'s Opposition to Defendant Palo Alto Networks, Inc.'s Motion to Stay, with Exhibits 1 and 4, *Centripetal Networks, Inc.* v. *Palo Alto Networks, Inc.*, Case No. 2:21-cv-00137 (RCY), Dkt. No. 86 (E.D. Va. Jul. 23, 2021), 25 pages.
Exhibit 2002 listed in Patent Owner's Responses dated May 20, 2022, in IPR2021-01147, IPR2021-01148 and IPR2021-01149—Protective Order, *Centripetal Networks, Inc.* v. *Palo Alto Networks, Inc.*, Case No. 2:21-cv-00137- RCY-RJK, Dkt. No. 93 (E.D. Va. Jul. 30, 2021)("Protective Order"), 36 pages.
Exhibit 2003 listed in Patent Owner's Responses dated May 20, 2022 in IPR2021-01147, IPR2021-01148 and IPR2021-01149—Amended Complaint for Patent Infringement, *Centripetal Networks, Inc.* v. *Palo Alto Networks, Inc.*, Case 2:21-cv-00137-RCY, Dkt. No. 65 (E.D. Va. Jul. 9, 2021), 167 pages.
Exhibit 2004 listed in Patent Owner's Responses dated May 20, 2022, in IPR2021-01147, IPR2021-01148 and IPR2021-01149—Order Regarding Discovery of Electronically Stored Information ("ESI"), *Centripetal Networks, Inc.* v. *Palo Alto Networks, Inc.*, Case No. 2:21-cv-00137-AWA-RJK, Dtk. No. 155 (E.D. Va. Sep. 13, 2021)("ESI Order"), 14 pages.
Exhibit 2005 listed in Patent Owner's Responses dated May 20, 2022, in IPR2021-01147, IPR2021-01148 and IPR2021-01149—Memorandum in Support of Defendant's Motion to Stay Pending Resolution of Inter Partes Review Proceedings, *Centripetal Net-*

(56) References Cited

OTHER PUBLICATIONS

*works, Inc.* v. *Palo Alto Networks, Inc.*, Case No. 2:21-cv-00137-RCY-RJK, Dkt. No. 68 (E.D. Va. Jul. 9, 2021), 19 pages.
Exhibit 2006 listed in Patent Owner's Response dated May 20, 2022, in IPR2021-01147—Declaration of James Hannah in Support of Patent Owner's Preliminary Response, Case IPR2021-01147, U.S. Pat. No. 10,542,028, Nov. 12, 2021, 4 pages.
Exhibit 2007 listed in Patent Owner's Responses dated May 20, 2022, in IPR2021-01147, IPR2021-01148 and IPR2021-01149—Order, *Bushnell Hawthorne LLC* v. *Cisco Sys., Inc.*, Case No. 1:18-cv-00760-TSE-MSN, Dkt. No. 88 (E.D. Va. Apr. 22, 2019), 2 pages.
Exhibit 2008 listed in Patent Owner's Responses dated May 20, 2022, in IPR2021-01147, IPR2021-01148 and IPR2021-01149—Memorandum Order, *Cont'l Auto. Sys. Inc.* v. *Hamaton Auto. Tech. Co.*, Case No. 2:16-cv-00226-RAJ-LRL, Dkt. No. 63 (E.D. Va. Feb. 7, 2017), 10 pages.
Exhibit 2009 listed in Patent Owner's Responses dated May 20, 2022, in IPR2021-01147 and IPR2021-01148—Petition for Inter Partes Review of U.S. Pat. No. 10,567,343, *Palo Alto Networks Inc.* v. *Centripetal Networks, Inc.*, No. IPR2021-01155, Paper 2 (P.T.A.B. Jul. 6, 2021), 83 pages.
Exhibit 2010 listed in Patent Owner's Responses dated May 20, 2022, in IPR2021-01147 and IPR2021-01148—Internet Archive WayBack Machine—Bugtraq ID 17134: Microsoft Commerce Server 2002 Authentication Bypass Vulnerability, available from https://web.archive.org/web/20210119043621/https://www.securityfocus.com/bid/17134, captured Jan. 19, 2021 ("Bugtraq 17134"), 6 pages.
Exhibit 2011 listed in Patent Owner's Responses dated May 20, 2022, in IPR2021-01147 and IPR2021-01148—Wikipedia Webpage—Bugtraq, available from https://en.wikipedia.org/wiki/Bugtraq, dated Nov. 9, 2021, 4 pages.
Exhibit 2012 listed in Patent Owner's Responses dated May 20, 2022, in IPR2021-01147 and IPR2021-01148—Wikipedia Webpage—Nessus (software), available from https://en.wikipedia.org/wiki/Nessus_(software), dated Nov. 10, 2021, 2 pages.
Exhibit 2013 listed in Patent Owner's Responses dated May 20, 2022, in IPR2021-01147 and IPR2021-01148—CVE Webpage—CVE—CVE-1999-0191, available from https://cve.mitre.org/cgi-bin/cvename.cgi?name=CVE-1999-0191, dated Nov. 11, 2021, 1 page.
Exhibit 2015 listed in Patent Owner's Responses dated May 20, 2022, in IPR2021-01147, IPR2021-01148 and IPR2021-01149—Excerpts from Palo Alto Networks, Inc.'s First Supplemental Objections and Responses to Plaintiff's Interrogatory No. 4, *Centripetal Networks, inc.* v. *Palo Alto Networks*, Inc., Case No. 2:21-cv-00137-RCY-RJK (E.D. Va.), dated Oct. 22, 2021, 37 pages.
Exhibit 2016 listed in Patent Owner's Responses dated May 20, 2022, in IPR2021-01147, IPR2021-01148 and IPR2021-01149—E-mail Correspondence between the Board and Counsel of Record, dated between Dec. 8, 2021, through Dec. 9, 2021, 2 pages.
Exhibit 2017 listed in Patent Owner's Responses dated May 20, 2022, in IPR2021-01147, IPR2021-01148 and IPR2021-01149—Defendant Palo Alto Networks, Inc.'s Request for Hearing on its Motion to Compel Plaintiff Centripetal Networks, Inc. to Produce Related Patent Documents, *Centripetal Networks, Inc.* v. *Palo Alto Networks, Inc.*, Case No. 2:21-cv-00137-RCY-RJK (E.D. Va.), Dkt. 207, dated Nov. 30, 2021, 3 pages.
Exhibit 2018 listed in Patent Owner's Responses dated May 20, 2022, in IPR2021-01147, IPR2021-01148 and IPR2021-01149—Plaintiff Centripetal Networks, Inc.'s Memorandum in Support of its Motion to Compel Defendant Palo Alto Networks, Inc. to Produce 30(b)(6) Witnesses, Certain Documents, and Source Code, *Centripetal Networks, Inc.* v. *Palo Alto Networks, Inc.*, Case No. 2:21-cv-00137-RCY-RJK (E.D. Va.), Dkt. 212, datd Dec. 2, 2021, 24 pages.
Exhibit 2019 listed in Patent Owner's Response dated May 20, 2022, in IPR2021-01147—Declaration of Dr. Alex Orso in Support of Patent Owner's Response, Case No. IPR2021-01147, U.S. Pat. No. 10,542,028, May 20, 2022, 109 pages.
Exhibit 2020 listed in Patent Owner's Responses dated May 20, 2022, in IPR2021-01147 and IPR2021-01148—File History of U.S. Pat. No. 10,567,413 (issued Feb. 18, 2020), 410 pages.
Exhibit 2021 listed in Patent Owner's Response dated May 20, 2022, in IPR2021-01147—File History of U.S. Pat. No. 10,757,126 (issued Aug. 25, 2020), 351 pages.
Exhibit 2022 listed in Patent Owner's Responses dated May 20, 2022, in IPR2021-01147 and IPR2021-01148—Internet Archive Wayback Machine—Bugtraq ID 1818: Microsoft IIS 3.0 newdsn.exe File Creation Vulnerability, available from https://web.archive.org/web/20080725190626/http://www.securityfocus.com/bid/1818/info, captured Jul. 25, 2008, 5 pages.
Exhibit 2023 listed in Patent Owner's Responses dated May 20, 2022, in IPR2021-01147 and IPR2021-01148—*Palo Alto Networks, Inc.* v. *Centripetal Networks, Inc.*, IPR2021-01150, Institution Decision, Paper 9 (P.T.A.B. Feb. 16, 2022), 51 pages.
Exhibit 2024 listed in Patent Owner's Responses dated May 20, 2022, in IPR2021-01147 and IPR2021-01148—*Cisco Systems, Inc.* v. *Centripetal Networks, Inc.*, IPR2018-01654, Decision Denying Institution, Paper 7 (P.T.A.B. May 6, 2019), 23 pages.
Exhibit 2025 listed in Patent Owner's Responses dated May 20, 2022, in IPR2021-01147 and IPR2021-01148—*Centripetal Networks, Inc.* v. *Cisco Systems, Inc.*, Case No. 2:18-cv-0094, Dkt. No. 621 (Opinion and Order Regarding Findings of Fact and Conclusions of Law)(E.D.. Va. Oct. 5, 2020), 178 pages.
Exhibit 2026 listed in Patent Owner's Responses dated May 20, 2022, in IPR2021-01147 and IPR2021-01148—Cisco Stealthwatch Threat Intelligence License, dated 2018, 3 pages.
Exhibit 2027 listed in Patent Owner's Responses dated May 20, 2022, in IPR2021-01147 and IPR2021-01148—"Cool Tool: Centripetal Networks RuleGate—Threat Intelligence Tool," The Security Blogger, published Jul. 20, 2016, 5 pages.
Exhibit 2028 listed in Patent Owner's Responses dated May 20, 2022, in IPR2021-01147 and IPR2021-01148—Internet Archive Wayback Machine—Centripetal Networks Network Protection System v2.1, available from http://web.archive.org/web/20150205034047/http://www.scmagazine.com/centripetal-networks-protection-system-v21/review/4318/, captured Feb. 5, 2015, 3 pages.
Exhibit 2029 listed in Patent Owner's Responses dated May 20, 2022, in IPR2021-01147 and IPR2021-01148—Excerpts from Andrew S. Tanenbaum and David J. Wetherall, Computer Networks, 5th Ed., Prentice Hall, 2011, 112 pages.
Exhibit 2031 listed in Patent Owner's Responses dated May 20, 2022, in IPR2021-01147 and IPR2021-01148—"What Other Stateful Inspection Firewalls Cannot Do," available from https://www.checkpoint.com/smb/help/utml/8.0/7083.httm, printout dated Jul. 24, 2019, 1 page.
Exhibit 2033 listed in Patent Owner's Responses dated May 20, 2022, in IPR2021-01147 and IPR2021-01148—"What is an Exploit," available from https://www.cisco.com/c/en/us/products/security/advanced-malware-protection/what-is-eploit.html, printed May 19, 2022, 3 pages.
Exhibit 2034 listed in Patent Owner's Responses dated May 20, 2022, in IPR2021-01147 and IPR2021-01148—"Malware vs. Exploits," available from https://www.paloaltonetworks.com/cyberpedia/malware-vs-exploits, printed May 19, 2022, 4 pages.
Exhibit 1047 listed in Petition dated Jun. 2, 2022, in IPR2022-01097—USITC News Release Instituting Inv. No. 337-TA-1314, USITC Institutes Section 337 Investigation of Certain Computer Network Security Equipment and Systems, Related Software, Components Thereof, and Products Containing Same, available at <<https://www.usitc.gov/press_room/news?release/2022/er0518111939.htm?source=govdelivery&utm_medium=email&utm_source=govdelivery>>, May 18, 2022, 3 pages.
Exhibit 1048 listed in Petition dated Jun. 2, 2022, in IPR2022-01097—Complaint of Centripetal Networks, Inc. Under Section 337 of the Tariff Act of 1930, as Amended, executed Apr. 18, 2022, 61 pages.
Exhibit 1049 listed in Petition dated Jun. 2, 2022, in IPR2022-01097—Declaration of John Hendricks In Support for Petition for Inter Partes Review of U.S. Pat. No. 10,193,917, executed May 27, 2022, 18 pages.

(56) References Cited

OTHER PUBLICATIONS

Petition for Inter Partes Review of U.S. Pat. No. 10,193,917, *Keysight Technologies, Inc. v. Centripetal Networks, Inc.*, executed Jun. 2, 2022, 81 pages.
Apr. 29, 2022, First Public Supplement to the Complaint and Exhibits, Certain Computer Network Security Equipment and Systems, Related Software, Components Thereof, and Products Containing Same, Inv. No. 337-TA-3614, 43 pages.
Apr. 19, 2022, Public Complaint, Certain Computer Network Security Equipment and Systems, Related Software, Components Thereof, and Products Containing Same Inv. No. 337-TA-, 71 pages.
May 24, 2022, Tuesday, Federal Register, Notice of Institution of Investigation, vol. 87, No. 100, Notices, 2 pages.
Jun. 1, 2022, Order No. 3: Initial Determination Setting a Target Date, In the Matter of Certain Computer Network Security Equipment and Systems, Related Software, Components Thereof, and Products Containing Same, Inv. No. 337-TA-1314, 1 page.
May 18, 2022, Notice of Institution of Investigation, in the Matter of Certain Computer Network Security Equipment and Systems, Related Software, Components Thereof, and Products Containing Same, Inv. No. 337-TA-1314, 13 pages.
Jun. 13, 2022, Respondent Keysight Technologies, Inc.'s Response to the Complaint and Notice of Investigation, In the Matter of Certain Computer Network Security Equipment & Systems, Related Software, Components Thereof, & Products Containing Same, Inv. No. 337-TA-131, 62 pages.
Jun. 13, 2022, Public Version of Exhibit 1, Confidential Exhibit 1 to Keysight Technologies, Inc.'s Response to the Complaint and Notice of Investigation, In the Matter of Certain Computer Network Security Equipment and Systems, Related Software, Components Thereof, and Products Containing Same, Inv. No. 337-TA-1314, 5 pages.
Apr. 20, 2022, Notice of Receipt of Complaint; Solicitation of Comments Relating to the Public Interest, U.S. International Trade Commission, 3 pages.
Exhibit 1, as cited in Complaint of Centripetal Networks, Inc., dated Apr. 19, 2022, Certified Copy of U.S. Pat. No. 9,264,370, 41 pages.
Exhibit 2, as cited in Complaint of Centripetal Networks, Inc., dated Apr. 19, 2022, Certified Copy of U.S. Pat. No. 10,193,917, 45 pages.
Exhibit 3, as cited in Complaint of Centripetal Networks, Inc. dated Apr. 19, 2022, Certified Copy of U.S. Pat. No. 10,284,526, 28 pages.
Exhibit 4, as cited in Complaint of Centripetal Networks, Inc. dated Apr. 19, 2022, Press Release: Centripetal Named SINET 16 Innovator for 2017, <<https://www.centripetal.ai/centripetal-named-sinet-16-innovator/>>, dated Oct. 31, 2017, 4 pages.
Exhibit 5, as cited in Complaint of Centripetal Networks, Inc. dated Apr. 19, 2022, Press Release: Centripetal Networks Named a 2017 Gartner "Cool Vendor" in Security, dated Jul. 25, 2017, 4 pages.
Exhibit 6, as cited in Complaint of Centripetal Networks, Inc. dated Apr. 19, 2022, Press Release: Centripetal Ranked No. 93 of the Fastest Growing Companies in North America on Deloitte's 2019 Technology Fast 500, dated Dec. 2, 2019, 4 pages.
Exhibit 7, as cited in Complaint of Centripetal Networks, Inc. dated Apr. 19, 2022, ComPress Release: Centripetal Features in Deloitte's 2020 Technology Fast 500, dated Dec. 1, 2020, <<https://www.centripetal.ai/deloittes-2020-technology-fast-500/>>, 4 pages.
Exhibit 8, as cited in Complaint of Centripetal Networks, Inc. dated Apr. 19, 2022, Deloitte 2021 Technology Fast 500 Rankings, updated Nov. 2021, 16 pages.
Exhibit 9, as cited in Complaint of Centripetal Networks, Inc. dated Apr. 19, 2022, SC Media Article: Finalists: Best Threat Intelligence Technology, dated Mar. 29, 2021, The Wayback Machine—<<http://web.archive.org/web/20210430232211/https://www.scmagaine.co . . . >>, 8 pages.
Exhibit 10, as cited in Complaint of Centripetal Networks, Inc. dated Apr. 19, 2022, Centripetal Data Sheet: RuleGATE 2000 Gateway, dated 2017, 3 pages.
Exhibit 11, as cited in Complaint of Centripetal Networks, Inc. dated Apr. 19, 2022, Centripetal Webpage: CleanINTERNET, dated Feb. 8, 2022, 25 pages.
Exhibit 12, as cited in Complaint of Centripetal Networks, Inc. dated Apr. 19, 2022, Public Version, Declaration of Jonathan Rogers in Support of Complaint of Centripetal Networks, Inc., dated Apr. 18, 2022, 9 pages.
Exhibit 13, as cited in Complaint of Centripetal Networks, Inc. dated Apr. 19, 2022, Centripetal Case Study: Financial Services Organization Sees Success with Smarter Threat Intelligence, dated 2018, 3 pages.
Exhibit 14, as cited in Complaint of Centripetal Networks, Inc. dated Apr. 19, 2022, Centripetal Case Study: Insurance Company Gains Real-Time Networks Enforcement, dated 2018, 2 pages.
Exhibit 15, as cited in Complaint of Centripetal Networks, Inc. dated Apr. 19, 2022, Centripetal Case Study: Retailer Safeguards Network with Advanced Security Solutions, dated 2018, 3 pages.
Exhibit 16, as cited in Complaint of Centripetal Networks, Inc. dated Apr. 19, 2022, Certified Assignments for U.S. Pat. No. 9,264,370, 30 pages.
Exhibit 17, as cited in Complaint of Centripetal Networks, Inc. dated Apr. 19, 2022, Certified Assignments for U.S. Pat. No. 10,193,917, 12 pages.
Exhibit 18, as cited in Complaint of Centripetal Networks, Inc. dated Apr. 19, 2022, Certified Assignments for U.S. Pat. No. 10,284,526, 5 pages.
Exhibit 19, as cited in Complaint of Centripetal Networks, Inc. dated Apr. 19, 2022, Keysight Webpage: ThreatARMOR: Threat Intelligence Gateway, dated Jan. 5, 2022, 7 pages.
Exhibit 20, as cited in Complaint of Centripetal Networks, Inc. dated Apr. 19, 2022, Keysight Webpage: Application and Threat Intelligence (Subscription), dated Feb. 3, 2022, 4 pages.
Exhibit 21, as cited in Complaint of Centripetal Networks, Inc. dated Apr. 19, 2022, Infringement Chart for U.S. Pat. No. 9,264,370, 52 pages.
Exhibit 22, as cited in Complaint of Centripetal Networks, Inc. dated Apr. 19, 2022, Infringement Chart for U.S. Pat. No. 10,193,917, 29 pages.
Exhibit 23, as cited in Complaint of Centripetal Networks, Inc. dated Apr. 19, 2022, Infringement Chart for U.S. Pat. No. 10,284,526, 27 pages.
Exhibit 24, as cited in Complaint of Centripetal Networks, Inc. dated Apr. 19, 2022, IPWatchdog.com Article: Centripetal Networks Awarded $1.9 Billion in Infringement Suit Against Cisco, dated Oct. 9, 2020, 6 pages.
Exhibit 25, as cited in Complaint of Centripetal Networks, Inc. dated Apr. 19, 2022, SC Media Article: Judge Denies Cisco New Trial, Upholds Judgment in Patent Infringement Suit, dated Mar. 29, 2021, 4 pages.
Exhibit 26, as cited in Complaint of Centripetal Networks, Inc. dated Apr. 19, 2022, Keysight Network Visibility Products Catalog, dated Nov. 3, 2021, 19 pages.
Exhibit 27 as cited in Complaint of Centripetal Networks, Inc. dated Apr. 19, 2022, Keysight Webpage: Vision ONE, dated Jan. 9, 2022, 11 pages.
Exhibit 28, as cited in Complaint of Centripetal Networks, Inc. dated Apr. 19, 2022, Keysight Webpage: Network Packet Brokers, dated Dec. 31, 2021, 5 pages.
Exhibit 29, as cited in Complaint of Centripetal Networks, Inc. dated Apr. 19, 2022, Keysight Data Sheet: CloudLens Self-Hosted, dated Aug. 21, 2020, 20 pages.
Exhibit 30, as cited in Complaint of Centripetal Networks, Inc. dated Apr. 19, 2022, Keysight Webpage: NetStack, dated Dec. 31, 2021, 6 pages.
Exhibit 31, as cited in Complaint of Centripetal Networks, Inc. dated Apr. 19, 2022, Keysight Webpage: SecureStack, dated Dec. 31, 2021, 6 pages.
Exhibit 32, as cited in Complaint of Centripetal Networks, Inc. dated Apr. 19, 2022, Keysight Webpage: AppStack, dated Dec. 31, 2021, 6 pages.
Exhibit 33, as cited in Complaint of Centripetal Networks, Inc. dated Apr. 19, 2022, Keysight Webpage: AppStack, dated Dec. 31, 2021, 6 pages.
Exhibit 34, as cited in Complaint of Centripetal Networks, Inc. dated Apr. 19, 2022, Keysight Webpage: MobileStack, dated Dec. 31, 2021, 7 pages.

(56) References Cited

OTHER PUBLICATIONS

Exhibit 35, as cited in Complaint of Centripetal Networks, Inc. dated Apr. 19, 2022, Keysight Data Sheet: ThreatARMOR, dated Apr. 28, 2021, 6 pages.
Exhibit 36, as cited in Complaint of Centripetal Networks, Inc. dated Apr. 19, 2022, Keysight Solution Brief: Threat Simulator: Proving You're Safer Than You Were Yesterday, dated Nov. 25, 2020, 5 pages.
Exhibit 37, as cited in Complaint of Centripetal Networks, Inc. dated Apr. 19, 2022, Keysight Webpage: Network Security Tools, dated Dec. 31, 2021, 6 pages.
Exhibit 38, as cited in Complaint of Centripetal Networks, Inc. dated Apr. 19, 2022, Keysight Webpage: Application and Threat Intelligence (Subscription), dated Dec. 31, 2021, 7 pages.
Jul. 26, 2018 (US) Declaration of Kevin Jeffay, PhD in Support of First Petition for Inter Partes Review of U.S. Pat. No. 9,137,205—IPR2018-01443.
Jul. 26, 2018 (US) Declaration of Kevin Jeffay, PhD in Support of Second Petition for Inter Partes Review of U.S. Pat. No. 9,137,205—IPR2018-01444.
Jul. 27, 2018 (US) First Petition for Inter Partes Review of U.S. Pat. No. 9,137,205—IPR2018-01443.
Jul. 27, 2018 U.S. Non-Final Office Action—U.S. Appl. No. 15/382,806.
Jul. 27, 2018 (US) Second Petition for Inter Partes Review of U.S. Pat. No. 9,137,205—IPR2018-01444.
Jul. 5, 2018 U.S. Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 U.S. Non-Final Office Action—U.S. Appl. No. 14/745,207.
May 25, 2018 U.S. Notice of Allowance—U.S. Appl. No. 15/413,834.
Nov. 14, 2018 U.S. Final Office Action—U.S. Appl. No. 14/745,207.
Oct. 12, 2018 U.S. Non-Final Office Action—U.S. Appl. No. 16/039,896.
Oct. 4, 2018 U.S. Non-Final Office Action—U.S. Appl. No. 16/030,374.
Oct. 4, 2018 U.S. Notice of Allowance—U.S. Appl. No. 15/827,477.
Sep. 27, 2018 (WO) International Search Report and Written Opinion—App. PCT/US2018/043367.
Sep. 4, 2018 (WO) International Search Report and Written Opinion—App. PCT/US2018/041355.
Sep. 27, 2018 U.S. Non-Final Office Action—U.S. Appl. No. 15/614,956.
A. Feldmann et al., "Tradeoffs for Packet Classification", Proceedings of the IEEE INFOCOM, 397-413, 2000.
A. Hari et al., "Detecting and Resolving Packet Filter Conflicts", Proceedings of IEEE INFOCOM, 1203-1212, 2000.
Acharya et al, "Optwall: A Hierarchical Traffic-Aware Firewall," Department of Computer Science, Telecommunications Program, University of Pittsburgh, pp. 1-11 (2007).
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Bellion, "High Performance Packet Classification", http://www.hipac.org (Publication Date Unknown).
Blake, et al., "An Architecture for Differentiated Services," Network Working Group RFC 2475, Dec. 1998, 36 pages.
Blake, et al., "An Architecture for Differentiated Services," also known as the Diffserv architecture, as defined in RFC 2475, Network Working Group, Dec. 1998, 36 pages.
C. Benecke, "A Parallel Packet Screen for High Speed Networks", Proceedings of the 15th Annual Computer Security Applications Conference, 1999.
Chen, et al., "Research on the Anomaly Discovering Algorithm of the Packet Filtering Rule Sets," Sep. 2010, First International Confererence on Pervasive Computing, Signal Processing and Applications, pp. 362-366.

D. Comer, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.
E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Scient Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.
E.W. Fulp, "Firewall Architectures for High Speed Networks", U.S. Department of Energy Grant Application, Funded Sep. 2003.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
G. Brightwell et al., "Counting Linear Extensions is #P-Complete", Proceedings of the Twenty-Third Annual ACM Symposium on Theory of Computing, 1991.
G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with Surf"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1): 22-35,1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).
M. Al-Suwaiyel et al., "Algorithms for Trie Compaction", ACM Transactions on Database Systems, 9(2): 243-263, Jun. 1984.
M. Christiansen et al., "Using IDDs for Packet Filtering," Technical Report, BRICS, Oct. 2002.
M. Degermark et al., "Small Forwarding Tables for Fast Routing Lookups", Proceedings of ACM SIGCOMM, 4-13, 1997.
Exhibit 2035 listed in Patent Owner's Responses dated May 20, 2022, in IPR2021-01147 and IPR2021-01148—Merriam-Webster—Definition of option, available from https://www.merriam-webster.com/dictionary/option#:-:text=1, printout dated May 19, 2022, 12 pages.
Exhibit 2036 listed in Patent Owner's Responses dated May 20, 2022, in IPR2021-01147 and IPR2021-01148—Merriam-Webster—Definition of optional, available from https://www.merriam-webster.com/dictionary/optional#:-:text=%3A, printout dated May 19, 2022, 13 pages.
Exhibit 2037 listed in Patent Owner's Responses dated May 20, 2022, in IPR2021-01147 and IPR2021-01148—Transcript for Depo-

(56) References Cited

OTHER PUBLICATIONS sition of Dr. Wenke Lee, *Palo Alto Networks, Inc.* v. *Centripetal Networks, Inc.*, No. IPR2021-01147, taken on May 11, 2022, 65 pages.
Exhibit 2038 listed in Patent Owner's Responses dated May 20, 2022, in IPR2021-01147 and IPR2021-01148—Transcript for Deposition of Dr. Wenke Lee, *Palo Alto Networks, Inc.* v. *Centripetal Networks, Inc.*, No. IPR2021-01148, taken on May 12, 2022, 37 pages.
Exhibit 2039 listed in Patent Owner's Responses dated May 20, 2022, in IPR2021-01147 and IPR2021-01148—"Work with the Search Editor," available from https://docs.paloaltonetworks.com/autofocus/autofocus-admin/autofocus-search/work-with-the-search-editor, printout dated May 20, 2022, 12 pages.
May 20, 2022—Patent Owner's Response, Case IPR2021-01148, U.S. Pat. No. 10,757,126, 81 pages.
Exhibit 2006 listed in Patent Owner's Response dated May 20, 2022, in IPR2021-01148—Declaration of James Hannah in Support of Patent Owner's Preliminary Response, Case IPR2021-01148, U.S. Pat. No. 10,757,126, Nov. 12, 2021, 4 pages.
Exhibit 2014 listed in Patent Owner's Responses dated May 20, 2022, in IPR2021-01148 and IPR2021-01149—File History for U.S. Pat. No. 10,609,062 (issued Mar. 31, 2020), 307 pages.
Exhibit 2019 listed in Patent Owner's Response dated May 20, 2022, in IPR2021-01148—Declaration of Dr. Alex Orso in Support of Patent Owner's Response, Case No. IPR2021-01148, U.S. Pat. No. 10,757,126, 113 pages.
May 20, 2022—Patent Owner's Response—Case IPR2021-01149, U.S. Pat. No. 10,567,413, 75 pages.
Exhibit 2006 listed in Patent Owner's Response dated May 20, 2022, in IPR2021-01149—Declaration of James Hannah in Support of Patent Owner's Preliminary Response, Case IPR2021-01149, U.S. Pat. No. 10,567,413, Nov. 24, 2021, 4 pages.
Exhibit 2019 listed in Patent Owner's Response dated May 20, 2022, in IPR2021-01149—Declaration of Dr. Alex Orso In Support of Patent Owner's Response, Case No. IPR2021-01149, U.S. Pat. No. 10,567,413, May 20, 2022, 112 pages.
Exhibit 2020 listed in Patent Owner's Response dated May 20, 2022, in IPR2021-01149—"Sourcefire 3D System—3D Sensor Installation Guide," Version 4.10.3, dated Jan. 15, 2014, available at https://community.cisco.com/kxiwq67737/attachments/kxiwq67737/4561-docs-security/4819/1/sourcefire_3d_sensor_installation_guide_v4.10.3.pdf, 204 pages.
Exhibit 2021 listed in Patent Owner's Response dated May 20, 2022, in IPR2021-01149—"Guide to Cyber Threat Information Sharing," NIST Special Publication 800-150, National Institute of Standards and Technology, available at http://dx.doi.org/10.6028/NIST.SP.800-150, Oct. 2016, 43 pages.
Exhibit 2022 listed in Patent Owner's Response dated May 20, 2022, in IPR2021-01149—"Annual Report 2014," NIST Special Publication 800-176, National Institute of Standards and Technology, Computer Security Division, available at http://dx.doi.org/10.6028/NIST.SP.800-176, Aug. 2015, 116 pages.
Exhibit 2023 listed in Patent Owner's Response dated May 20, 2022, in IPR2021-01149—Johnson, Thomas A., "Cybersecurity: Protecting Critical Infrastructure from Cyber Attack and Cyber Warfare," CRC Press, 2015, 346 pages.
Exhibit 2024 listed in Patent Owner's Response dated May 20, 2022, in IPR2021-01149—"Computer Security Incident Handling Guide," NIST Special Publication 800-61 Revision 2, National Institute of Standards and Technology, available at http://dx.doi.org/10.6028/NIST.SP.800-61r2, Aug. 2012, 79 pages.
Exhibit 2025 listed in Patent Owner's Response dated May 20, 2022, in IPR2021-01149—Letter from the Intelligence and National Security Alliance (INSA) to NIST dated Oct. 9, 2014, including "Comments on Experience with the Framework for Improving Critical Infrastructure Cybersecurity," available at https://www.nist.gov/system/files/documents/2017/01/24/20141009_insa_detrani.pdf (last visited Apr. 7, 2022), 7 pages.

Exhibit 2026 listed in Patent Owner's Response dated May 20, 2022, in IPR2021-01149—Centripetal Network's webpage for CleanINTERNET, "Our Advanced Strategy Against Advanced Threats," available at https://www.centripetal.ai/cleaninternet/ (last visited Apr. 7, 2022), 4 pages.
Exhibit 2027 listed in Patent Owner's Response dated May 20, 2022, in IPR2021-01149—Stanley Chincheck, US Naval Research Laboratory, Computer Network Defense/Information Assurance (CNDA/IA) Enabling Capability (EC) Industry Day, 23 pages.
Exhibit 2028 listed in Patent Owner's Response dated May 20, 2022, in IPR2021-01149—ESG White Paper—Centripetal Networks Threat Intelligence Gateway, by Tony Palmer (May 2018), 8 pages.
Exhibit 2029 listed in Patent Owner's Response dated May 20, 2022, in IPR2021-01149—IBM, "Centripetal Networks Inc.: Operationalize threat intelligence to act against cyberthreats in real time," available at https://www.ibm.com/case-studies/centripetal-networks-x-force-security (last visited Apr. 27, 2022), published Jan. 2021, 9 pages.
Exhibit 2030 listed in Patent Owner's Response dated May 20, 2022, in IPR2021-01149—Gartner—Cool Vendors in Security for Technology and Service Providers, 2017, published May 4, 2017, 10 pages.
Exhibit 2031 listed in Patent Owner's Response dated May 20, 2022, in IPR2021-01149—American Banker article, "Top 10 FinTech Companies to Watch," published Nov. 6, 2013, 19 pages.
Exhibit 2033 listed in Patent Owner's Response dated May 20, 2022, in IPR2021-01149—KeySight Technologies, Inc. Annual Report 2018, 116 pages.
Exhibit 2034 listed in Patent Owner's Response dated May 20, 2022, in IPR2021-01149—"Cool Tool: Centripetal Networks RuleGate—Threat Intelligence Tool," The Security Blogger, published Jul. 20, 2016, 5 pages.
Exhibit 2035 listed in Patent Owner's Response dated May 20, 2022, in IPR2021-01149—Internet Archive Wayback Machine—Centripetal Networks Network Protection System v2.1, available from https://web.archive.org/web/20150205034047/http://www.scmagazine.com/centripetal-networks-protection-system-v21/review/4318/, captured Feb. 5, 2015, 3 pages.
Exhibit 2036 listed in Patent Owner's Response dated May 20, 2022, in IPR2021-01149—Excerpts from Andrew S. Tanenbaum and David J. Wetherall, Computer Networks, 5th Ed., Prentice Hall, 2011, 112 pages.
Exhibit 2037 listed in Patent Owner's Response dated May 20, 2022, in IPR2021-01149—"What Other Stateful Inspection Firewalls Cannot Do," available from https://www.checkpoint.com/smb/help/utml/8.0/7083.htm, printout dated Jul. 24, 2019, 1 page.
Exhibit 1002 listed in Petition dated Jun. 2, 2022, in IPR2022-01097—File History of U.S. Pat. No. 10,193,917, issued Jan. 29, 2019, 263 pages.
Exhibit 1003 listed in Petition dated Jun. 2, 2022, in IPR2022-01097—Declaration of Dr. Stuart Staniford In Support of Petition for Inter Partes Review of U.S. Pat. No. 10,193,917, executed Jun. 1, 2022, 121 pages.
Exhibit 1005 listed in Petition dated Jun. 2, 2022, in IPR2022-01097—IPR2018-01760 CS-1005: Declaration of John Leone, U.S. Pat. No. 9,413,722, executed Jul. 20, 2018, 12 pages.
Exhibit 1006 listed in Petition dated Jun. 2, 2022, in IPR2022-01097—Claim Comparison Chart Between U.S. Pat. No. 10,193,917 and U.S. Pat. No. 9,413,722, submitted with Petition dated Jun. 2, 2022, 13 pages.
Exhibit 1013 listed in Petition dated Jun. 2, 2022, in IPR2022-01097—"FireWall-1 User Interface from 3.0," PhoneBoy's Security Theater, archived at the Internet Archive Wayback Machine on Jan. 2, 2014, at <<https://web.archive.org/web/20140102143305/http://phoneboy.net>>, 9 pages.
Exhibit 1016 listed in Petition dated Jun. 2, 2022, in IPR2022-01097—IPR2018-01760 CS-1016: Heberlein, L. T.L, et al., "A Network Security Monitor," Proceedings, 1990 IEEE Computer Society Symposium on Security and Privacy, 1990, available at <<https://ieeexplore.ieee.org/document/63859>>, 9 pages.
Exhibit 1021 listed in Petition dated Jun. 2, 2022, in IPR2022-01097—IPR2018-01760 CS-1021: "(Vendor Issues Fix) Re: Helix

(56) References Cited

OTHER PUBLICATIONS

Universal Server and RealServer URL Parsing Flaw in View Source Plug-in Lets Remote Users Execute Arbitrary Code with Root Privileges" Security Tracker, Sep. 13, 2003, available at: <<https://web.archive.org/web/20040123004734/http://www.securitytracker.com/alerts/2003/Sep/1007692.html>>, 4 pages.
Exhibit 1022 listed in Petition dated Jun. 2, 2022, in IPR2022-01097—"Transmission Control Protocol," IETF RFC 793. J. Postel, ed., Sep. 1981, archived at Internet Archive Wayback Machine on Feb. 2, 2007, at <<https://web.archive.org/web/20070202201546/https://tools.ietf.org/html/rfc793>>, 91 pages.
Exhibit 1023 listed in Petition dated Jun. 2, 2022, in IPR2022-01097—"Internet Protocol," IETF RFC 791, J. Postel, ed., Sep. 1981, archived at Internet Archive Wayback Machine on Feb. 4, 2007, at <<https://web.archive.org/web/20070204151303/http://tools.ietf.org/html/rfc791>>, 50 pages.
Exhibit 1024 listed in Petition dated Jun. 2, 2022, in IPR2022-01097—"File Transfer Protocol," IETF RFC 765, J. Postel, ed., Jun. 1980, archieved at Internet Archive Wayback Machine on Feb. 6, 2007, at <<https://web.archive.org/web/20070206005843/https://tools.ietf.org/html/rfc765>>, 73 pages.
Exhibit 1027 listed in Petition dated Jun. 2, 2022, in IPR2022-01097—"SSL Inspection," Sourcefire Cybersecurity, archived at Internet Archive Wayback Machine on Dec. 20, 2010, at <<https://web.archive.org/web/20101220151851/http:/www.sourcefire.com/security-technologies/cyber-security-products/3d-system/ssl-encryption-decryption>>, ("SSL Appliances Webpage"), 4 pages.
Exhibit 1028 listed in Petition dated Jun. 2, 2022, in IPR2022-01097—Sourcefire SSL Appliances data sheet, archived at Internet Archive Wayback Machine on Mar. 16, 2012, at <<https://web.archive.org/web/20120316165725/http://www.ndm.net:80/sourcefirestore/downloads/Sourcefire%20SSL%20Appliance%20Fact%20Sheet%20%28English%29.pdf>>, ("SSL Appliances Data Sheet"), 4 pages.
Exhibit 1031 listed in Petition dated Jun. 2, 2022, in IPR2022-01097—*Centripetal Networks, Inc.* v. *Cisco Sys.*, 847 Fed. Appx. 881 (Fed. Cir. Mar. 10, 2021), 7 pages.
Exhibit 1032 listed in Petition dated Jun. 2, 2022, in IPR2022-01097—K. Ingham & S. Forrest, "A History and Survey Network Firewalls," University of New Mexico Computer Science Department Technical Report 2002-37, 2002, available at <<https://www.cs.unm.edu/-treport/tr/02-12/firewall.pdf.>>, 42 pages.
Exhibit 1033 listed in Petition dated Jun. 2, 2022, in IPR2022-01097—IPR2018-01760 CS-1033: Sourcefire Support Website Webpage, archived at Internet Archive Wayback Machine on Apr. 30, 2011, available at <<https://web.archive.org/web/20110430194135/https:/support.sourcefire.com/>>, ("Sourcefire Support Webpage"), 2 pages.
Exhibit 1035 listed in Petition dated Jun. 2, 2022, in IPR2022-01097—Curriculum Vitae of Stuart Staniford, submitted with Petition for Inter Partes Review, U.S. Pat. No. 10,193,917, dated Jun. 2, 2022, 7 pages.
Exhibit 1037 listed in Petition dated Jun. 2, 2022, in IPR2022-01097—J. Melton and A.R. Simon, Understanding the New SQL: A Complete Guide, Morgan Kaufmann Publishers, San Mateo, California, 1993, 33 pages.
Exhibit 1038 listed in Petition dated Jun. 2, 2022, in IPR2022-01097—R. Feiertag, et al., A Common Intrusion Specification Language (CISL), Revised Jun. 1999, archived at Internet Archive Wayback Machine on May 2, 2003, at <<https://web.archive.org/web/20030502051801/https:/gost.isi.edu/cidf/drafts/language.txt>>, 86 pages.
Exhibit 1041 listed in Petition dated Jun. 2, 2022, in IPR2022-01097—E.F. Codd, A Relational Model of Data for Large Shared Data Banks, Communications of the ACM, vol. 13, No. 6, Jun. 1970, available at <<https://www.seas.upenn.edu/-zives/03f/cis550/codd.pdf>>, 11 pages.
Exhibit 1042 listed in Petition dated Jun. 2, 2022, in IPR2022-01097—Sourcefire Annual Report 2012, available at <<https://www.sec.gov/Archives/edgar/vprr/1300/13002391.pdf>>, 91 pages.

Exhibit 1044 listed in Petition dated Jun. 2, 2022, in IPR2022-01097—"The Intrusion Detection Message Exchange Format (IDMEF)," IETF RFC 4765. H. Debar, et al., Mar. 2007, archived at Internet Archive Wayback Machine on Oct. 12, 2007, at <<https://web.archive.org/web/20071012114928/https://www.ietf.org/rfc/rfc4765.txt>>, 136 pages.
Exhibit 1018 in IPR2021-01147, IPR2021-01148 and IPR2021-01149, Roesch, "Snort—Lightwegith Intrusion Detection for Networks," Proceedings of LISA '99: 13th Systems Administration Conference, Seattle, Washington, USA, Nov. 7-12, 1999, 11 pages.
Exhibit 1020 in IPR2021-01147, IPR2021-01148 and IPR2021-01149, Symantec, W32.HLLW.Doomjuice, Feb. 9, 2004, <<https://www.symantec.com/secuiryt-center/writeup/2004-020909-2916-99>>, 2 pages.
Exhibit 1021 in IPR2021-01147, IPR2021-01148 and IPR2021-01149, Vendor Issues Fix, <<http://securitytracker.com/id/1007692>>, 2 pages, Sep. 13, 2003.
Exhibit 1022 in IPR2021-01147, IPR2021-01148 and IPR2021-01149 Transmission Control Protocol, DARPA Internet Program Protocol Specification, RFC793, <<https://web.archive.org/web/20070202201546/https://tools.ietf.org/html/rfc793>>, Sep. 1981, 64 pages.
Exhibit 1023 in IPR2021-01147, IPR2021-01148 and IPR2021-01149, Internet Protocol, DARPA Internet Program Protocol Specification, RFC 791, <<https://web.archive.org/web/20070204151303/https://tools.ietf.org/html/rfc791>>, Sep. 1981, 36 pages.
Exhibit 1024 in IPR2021-01147, IPR2021-01148 and IPR2021-01149, RFC 765, Postel, "File Transfer Protocol,", <<https://web.archive.org/web/20070206005843/https://tools.ietf.org/html/rfc765>>, Jun. 1980, 52 pages.
Exhibit 1025 in IPR2021-01147, IPR2021-01148 and IPR2021-01149, Lee, "The Original HTTP as defined in 1991," The HTTP Protocol As Implemented in W3, Jun. 5, 1997-Jan. 3, 2018, <<https://web.archive.org/web/19970605071155/https://www.w3.org/Protocols/HTTP/AsImplemented.html>>, 2 pages.
Exhibit 1026 in IPR2021-01147 and IPR2021-01148, Jun. 28, 2021, Email from the Court, 5 pages.
Exhibit 1030 in IPR2021-01147, IPR2021-01148 and IPR2021-01149, Petition for Inter Parties Review of U.S. Pat. No. 9,413,722 Under 35 U.S.C. §§ 311-319 and 37 C.F.R. §§ 42.1-.80, 42.100-.107, executed Sep. 18, 2018, 97 pages.
Exhibit 1031 in IPR2021-01147, IPR2021-01148 and IPR2021-01149, Judgment, Final Written Decision, U.S. Pat. No. 9,413,722 B1, dated May 18, 2020, 57 pages.
Exhibit 1033 in IPR2021-01147, IPR2021-01148 and IPR2021-01149, PTAB IPR2018 1760 CS 1033, Sourcefire Network Security—Security for the Real World, Jul. 20, 2007-Feb. 24, 2018, <<https://web.archive.org/web/20110430194135/https:/support.sourcefire.com/>>, 2 pages.
Exhibit 1034 in IPR2021-01147, IPR2021-01148 and IPR2021-01149, PTAB IPR 2018 1760 CS 1034, Sourcefire Expands IPS Solutions Portfolio, Adding FirePOWER to the Industry's Leading Protection, Business Wire, Apr. 18, 2011, <<https://www.businesswire.com/news/home/20110418005189/enSourcefire-Expands-IPS-Solutions-Portfolio-Adding-FirePOWER>>, 3 pages.
Exhibit 1037 in IPR2021-01147, Estoppel Chart, date unknown, but prior to Jul. 26, 2021, 13 pages.
Exhibit 1038 in IPR2021-01147, IPR2021-01148 and IPR2021-01149, PTAB IPR2018 01760 CS 1038, Affidavit of Christopher Butler, executed May 8, 2019, 1630 pages.
Exhibit 1042 in IPR2021-01147, IPR2021-01148 and IPR2021-01149, PTAB IPR2018 01760 CS 1042, Declaration of Jacob H. Baugher III, U.S. Pat. No. 9,413,722, issued Aug. 9, 2016, Inter Partes Review No. IPR2017-01760, 6 pages.
Exhibit 1049 in IPR2021-01147, IPR2021-01148 and IPR2021-01149, Complaint for Patent Infringement, Case 2:21-cv-00137-RCY-RJK, Document 1, filed Mar. 12, 2021, 146 pages.
Exhibit 1050 in IPR2021-01147, Declaration of Jonathan L. Bradford, U.S. Pat. No. 10,542,028, executed Jul. 19, 2021, 17 pages.
Exhibit 1051 in IPR2021-01147, IPR2021-01148 and IPR2021-01149, 1760 CS 1005, Declaration of John Leone, U.S. Pat. No. 9,124,552, executed Jul. 20, 2018, 12 pages.

(56) References Cited

OTHER PUBLICATIONS

Exhibit 1052 in IPR2021-01147, IPR2021-01148 and IPR2021-01149, 847 FedAppx 869, *Centripetal Networks, Inc.* v. *Cisco Systems, Inc.*, decided Mar. 10, 2021, 10 pages.
Exhibit 1053 in IPR2021-01147, IPR2021-01148 and IPR2021-01149, 847 FedAppx 881, *Centripetal Networks, Inc.* v. *Cisco Systems, Inc.*, decided Mar. 10, 2021, 6 pages.
Exhibit 1054 in IPR2021-01147, IPR2021-01148 and IPR2021-01149, Opinion & Order, Case 2:17-cv-00383-HCM-RL, Document 484, filed Sep. 17, 2018, 36 pages.
Exhibit 1055 in IPR2021-01147, IPR2021-01148 and IPR2021-01149, PTAB IPR2018 01760 Ex 2009, Murphy, "Sourcefire 3D," Jan. 3, 2007, <<https://www.itpro.co.uk/101161/sourcefire-3d/page/0/1>>, 5 pages.
Exhibit 1056 in IPR2021-01147, IPR2021-01148 and IPR2021-01149, PTAB IPR2018 01760 Ex 2010, Sourcefire 3D IPS1000, May 1, 2006, <<https://www.scmagazine.com/review/sourcefire-3d-ips1000/>>, 3 pages.
Exhibit 1057 in IPR2021-01147, IPR2021-01148 and IPR2021-01149, Navarikuth, et al., "A dynamic firewall architecture based on multi-source analysis," Dec. 15, 2012, CSIT, pp. 317-329.
Exhibit 1058 on IPR2021-01147, IPR2021-01148 and IPR2021-01149, Appendix of Claims, 9 pages, date unknown, out prior to Jul. 26, 2021.
Exhibit 1059 in IPR2021-01147 and IPR2021-01149, Amended Complaint for Patent Infringement, Case 2:21-cv-00137-RCY-RJK, Document 65, filed Jul. 9, 2021, 167 pages.
Exhibit 1060 in IPR2021-01147 and IPR2021-01149, Jul. 14, 2021, Email re: PAN scheduling and discovery proposals with exhs A C, 9 pages.
Exhibit 1002 in IPR2021-01148, File History of U.S. Pat. No. 10,757,126, issued Aug. 25, 2020.
Exhibit 1003 in IPR2021-01148, Declaration of Dr. Wenke Lee in Support of Petition for Inter Partes Review of U.S. Pat. No. 10,757,126, executed Jul. 13, 2021, 178 pages.
Exhibit 1027 in IPR2021-01148, Jul. 1, 2021, Letter to Judge Young, *Centripetal Networks, Inc.* v. *Palo Alto Networks, Inc.*, Case No. 2:21-cv-00137-RCY-RJK, 2 pages.
Exhibit 1028 in IPR2021-01148, Jun. 30, 2021, Lee Email re: Ex. 46—U.S. Appl. No. 10/931,797, 2 pages.
Exhibit 1035—Claim Comparison Chart Between U.S. Pat. No. 10,757,126 and U.S. Pat. No. 9,413,722, date unknown but, prior to Jul. 26, 2021, 16 pages.
Exhibit 1050 in IPR2021-01148—Declaration of Jonathan Bradford in Support of Petition for Inter Partes Review of U.S. Pat. No. 10,757,126, executed Jul. 13, 2021, 18 pages.
Exhibit 1002 from IPR2021-01149—File History of U.S. Pat. No. 10,567,413, issued Feb. 18, 2020.
Exhibit 1003 from IPR2021-01149—Declaration of Dr. Wenke Lee, U.S. Pat. No. 10,567,413, executed Jul. 23, 2021, 153 pages.
Exhibit 1036 in IPR2021-01149—Claim Comparison Chart Between U.S. Pat. No. 10,567,413 and U.S. Pat. No. 9,413,722, 10 pages.
Exhibit 1050 in IPR2021-01149—Declaration of Jonathan Bradford in Support of Petition for Inter Partes Review of U.S. Pat. No. 10,567,413, executed Jul. 23, 2021, 19 pages.
Exhibit 1062 from IPR2021-01149—CVE Frequently Asked Questions, The Wayback Machine, <<https://web.archive.org/web/20140321140659/http://cve.mitre.org:80/about . . . >>, date of publication unknown but, prior to Jul. 26, 2021, 14 pages.
Exhibit 1063 from IPR2021-01149—Jul. 21, 2021, Minute Entry, Case 2:21-cv-00137-RCY-RJKVAED, 2 pages.
Exhibit 1064 from IPR2021-01149—Decision, Institution of Inter Partes Review, 35 U.S.C. § 314, U.S. Pat. No. 9,413,722 B1, May 20, 2019, 28 pages.
Petition for Inter Partes Review—IPR2021-01147, U.S. Pat. No. 10,542,028, executed Jul. 19, 2021, 87 pages.
Petition for Inter Partes Review—IPR2021-01148, U.S. Pat. No. 10,757,126, executed Jul. 13, 2021, 95 pages.
Petition for Inter Partes Review—IPR2021-01149, U.S. Pat. No. 10,567,413, executed Jul. 23, 2021, 78 pages.
Petitioner's Power of Attorney Under 37 CFR § 42.10(b), IPR2021-01147, U.S. Pat. No. 10,542,028, executed Jul. 13, 2021, 3 pages.
Etitioner's Power of Attorney Under 37 CFR § 42.10(b), IPR2021-01148, U.S. Pat. No. 10,757,126, executed Jul. 13, 2021, 3 pages.
Petitioner's Power of Attorney Under 37 CFR § 42.10(b), IPR2021-01149, U.S. Pat. No. 10,567,413, executed Jul. 13, 2021, 3 pages.
Patent Owner's Mandatory Notices Under 37 C.F.R. § 42.8(a)(2), IPR2021-01148, U.S. Pat. No. 10,757,126, executed Aug. 4, 2021, 4 pages.
Patent Owner's Power of Attorney, IPR2021-01148, U.S. Pat. No. 10,757,126, executed Aug. 4, 2021, 4 pages.
Sourcefire 3D System User Guide Version 5.1.1 (2012).
"Sourcefire SSL Appliance Administration & Deployment Guide for SSL 1500, SSL200, and SSL8200; Software Version 3.6," published in 2014, submitted as—Exhibit D6-.
Exhibit 39, as cited in Complaint of Centripetal Networks, Inc. dated Apr. 19, 2022, Keysight Webpage: ThreatArmor: Threat Intelligence Gateway, dated Dec. 31, 2021, 9 pages.
Exhibit 41, as cited in Complaint of Centripetal Networks, Inc. dated Apr. 19, 2022, Keysight Webpage: CloudLens, dated Jan. 25, 2022, 9 pages.
Exhibit 42, as cited in Complaint of Centripetal Networks, Inc. dated Apr. 19, 2022, Keysight Data Sheet: Vision X Network Packet Broker, dated Oct. 13, 2021, 13 pages.
Exhibit 43, as cited in Complaint of Centripetal Networks, Inc. dated Apr. 19, 2022, Keysight Webpage: Vision One, dated Feb. 3, 2022, 7 pages.
Exhibit 44, as cited in Complaint of Centripetal Networks, Inc. dated Apr. 19, 2022, Keysight Webpage: Vision X Network Packet Broker, dated Feb. 3, 2022, 8 pages.
Exhibit 45, as cited in Complaint of Centripetal Networks, Inc. dated Apr. 19, 2022, Keysight Investor Day 2020 Presentation, dated Mar. 3, 2020, 172 pages.
Exhibit 46, as cited in Complaint of Centripetal Networks, Inc. dated Apr. 19, 2022, Keysight Press Release: Keysight Technologies' Corporate Headquarters Operational After Northern California Fires, dated Nov. 6, 2017, 3 pages.
Exhibit 47, as cited in Complaint of Centripetal Networks, Inc. dated Apr. 19, 2022, Keysight/Ixia Vision One Product Label, 2 pages.
Exhibit 49, as cited in Complaint of Centripetal Networks, Inc. dated Apr. 19, 2022, Keysight Webpage: Support, dated Jan. 25, 2022, 3 pages.
Exhibit 50, as cited in Complaint of Centripetal Networks, Inc. dated Apr. 19, 2022, Keysight Webpage: Keysight Support, dated Jan. 25, 2022, 4 pages.
Exhibit 51, as cited in Complaint of Centripetal Networks, Inc. dated Apr. 19, 2022, Ixia Webpage: Support, dated Jan. 25, 2022, 11 pages.
Exhibit 52, as cited in Complaint of Centripetal Networks, Inc. dated Apr. 19, 2022, Keysight White Paper: Advanced Security Intelligence with Rap Sheet Analytics, dated Nov. 10, 2021, 9 pages.
Exhibit 53, as cited in Complaint of Centripetal Networks, Inc. dated Apr. 19, 2022, Ixia Case Study: Financial Investment Firm Reduces Risk, 6 pages.
Exhibit 54, as cited in Complaint of Centripetal Networks, Inc. dated Apr. 19, 2022, Keysight Press Release: Keysight's New Security Operations Platform Enables Organizations to Measure and Improve Effectiveness of Operational Security, dated Feb. 6, 2022, 7 pages.
Exhibit 55, as cited in Complaint of Centripetal Networks, Inc. dated Apr. 19, 2022, Keysight Form 10-K Annual Report for the fiscal year ended Oct. 31, 2021, 161 pages.
Exhibit 56, as cited in Complaint of Centripetal Networks, Inc. dated Apr. 19, 2022, Keysight Webpage: TradeVision, dated Jan. 25, 2022, 11 pages.
Exhibit 57, as cited in Complaint of Centripetal Networks, Inc. dated Apr. 19, 2022, Keysight Webpage: Network Security Tools, dated Jan. 25, 2022, 6 pages.
Exhibit 58, as cited in Complaint of Centripetal Networks, Inc. dated Apr. 19, 2022, Keysight Webpage: Sales Request. dated Feb. 4, 2022, 6 pages.

(56) References Cited

OTHER PUBLICATIONS

Exhibit 59, as cited in Complaint of Centripetal Networks, Inc. dated Apr. 19, 2022, CDW.com Webpage: Ixia Vision ONE with Fixed 48 Part SFP+ Security Appliance, dated Feb. 4, 2022, 4 pages.
Exhibit 60, as cited in Complaint of Centripetal Networks, Inc. dated Apr. 19, 2022, Insight.com Webpage: Ixia Vision ONE Sys-Va-48PX-AC Security Appliance, dated 2022, 5 pages.
Exhibit 61, as cited in Complaint of Centripetal Networks, Inc. dated Apr. 19, 2022, Shi.com Webpage: Ixia ThreatARMOR 1G Security Appliance, dated Feb. 4, 2022, 4 pages.
Exhibit 62, as cited in Complaint of Centripetal Networks, Inc. dated Apr. 19, 2022, Deltatechsol.com Webpage: Ixia ThreatARMOR-1G—ThreatArmor 1GBE Security Appliance with 4 1GB SFP Ports, Requires Active ATI, dated Feb. 4, 2022, 5 pages.
Exhibit 63, as cited in Complaint of Centripetal Networks, Inc. dated Apr. 19, 2022, Caegis Solutions Ebay Invoice: Ixia Vision ONE Security Appliance 48-Ports + 48 SFP-10G SR 2x PSU, dated Dec. 16, 2021, 2 pages.
Exhibit 67, as cited in Complaint of Centripetal Networks, Inc. dated Apr. 19, 2022, Ixia Press Release: Ixia Leverages the Cloud to Streamline Network Threat Intelligence, dated Nov. 9, 2016, 5 pages.
Exhibit 68, as cited in Complaint of Centripetal Networks, Inc. dated Apr. 19, 2022, Ixia White Paper: Application and Threat Intelligence Research Center, dated 2019, 5 pages.
Exhibit 69, as cited in Complaint of Centripetal Networks, Inc. dated Apr. 19, 2022, Ixia Feature Brief: SecureStack -Optimized Handling of Secure Traffic, dated 2018, 4 pages.
Exhibit 70, as cited in Complaint of Centripetal Networks, Inc. dated Apr. 19, 2022, Keysight Data Sheet: Vision ONE Security Without Sacrifice, dated Jul. 23, 2021, 13 pages.
Exhibit 71, as cited in Complaint of Centripetal Networks, Inc. dated Apr. 19, 2022, Ixia Technical Overview: Ixia's Inline Security Architecture, dated Jan. 7, 2020, 35 pages.
Exhibit 72, as cited in Complaint of Centripetal Networks, Inc. dated Apr. 19, 2022, Keysight White Paper: Inspecting SSL Traffic: Achieving the Right Balance of Visibility and Security, dated May 22, 2020, 9 pages.
Exhibit 73, as cited in Complaint of Centripetal Networks, Inc. dated Apr. 19, 2022, Keysight Solution Brief: Security: In An Encrypted World, dated Feb. 25, 2020, 7 pages.
Exhibit 74, as cited in Complaint of Centripetal Networks, Inc. dated Apr. 19, 2022, Centripetal Service Brief: CleanINTERNET, dated 2018, 3 pages.
Exhibit 75, as cited in Complaint of Centripetal Networks, Inc. dated Apr. 19, 2022, Centripetal Product Brief: CleanINTERNET, dated 2018, 3 pages.
Exhibit 76, as cited in Complaint of Centripetal Networks, Inc. dated Apr. 19, 2022, Centripetal: CleanINTERNET Managed Security Services, dated, 13 pages.
Exhibit 78, as cited in Complaint of Centripetal Networks, Inc. dated Apr. 19, 2022, Centripetal White Paper: Far Beyond The Firewall: Centripetal CleanINTERNET Service, dated 2019, 6 pages.
Exhibit 80, as cited in Complaint of Centripetal Networks, Inc. dated Apr. 19, 2022, Keysight Software Entitlement Certificate, 2 pages.
Exhibit 81, as cited in Complaint of Centripetal Networks, Inc. dated Apr. 19, 2022, Keysight Shipping Point Labels, 2 pages.
Exhibit 82, as cited in Complaint of Centripetal Networks, Inc. dated Apr. 19, 2022, Guidepoint Security, LLC Invoice, dated Feb. 24, 2022, 2 pages.
Appendix A, as cited in Complaint of Centripetal Networks, Inc. dated Apr. 19, 2022, Certified Copy of Prosecution History for U.S. Pat. No. 9,264,370, (2 parts), 609 pages.
Appendix C, as cited in Complaint of Centripetal Networks, Inc. dated Apr. 19, 2022, Certified Copy of Prosecution History for U.S. Pat. No. 10,193,917, 555 pages.
Appendix E, as cited in Complaint of Centripetal Networks, Inc. dated Apr. 19, 2022, Certified Copy of Prosecution History for U.S. Pat. No. 10,284,526 (20 parts), 9,093 pages.
Statement Re: Related Application, dated Sep. 30, 2015, 1 page.
Nov. 29, 2017 (US) Defendant Keysight Technologies, Inc.'s Answer to Complaint for Patent Infringement—Case No. 2:17-cv-00383-HCN-LRL, Document 62, 20 pages.
Jun. 23, 2022, Complainant Centripetal Networks, Inc.'s Notice of Priority and Conception Dates, Investigation No. 337-TA-1314, In the Matter of Certain Computer Network Security Equipment and Systems, Related Software, Components Thereof, and Products Containing Same, 4 pages.
Exhibit K06 as listed in Nullity Action dated Jun. 28, 2022, of Keysight Technologies in EP 3284238, "Firewall Policies and VPN Configurations," Henmi, et al., printed Aug. 29, 2006, 205 pages.
Exhibit K07 as cited in Nullity Action dated Jun. 28, 2022, of Keysight Technologies in EP3284238, "Configuring NetScreen® Firewalls," Cameron, et al., published 2005, 80 pages.
Exhibit K08 as listed in Nullity Action dated Jun. 28, 2022, of Keysight Technologies in EP3284238, "Configuring Check Point NGX VPN-1/FireWall-1," Stephens, et al., printed Oct. 5, 2005, 104 pages.
Exhibit K09 as cited in Nullity Action dated Jun. 28, 2022, of Keysight Technologies in EP3284238, "Dr. Tom Shinder's ISA 2006 Migration Guide," Shinder, published 2007, 94 pages.
Exhibit K10 as listed in Nullity Action dated Jun. 28, 2022, of Keysight Technologies in EP3284238, Claim Chart, 4 pages.
Exhibit K11 as listed in Nullity Action dated Jun. 28, 2022, of Keysight Technologies in EP3284238, Jun. 22, 2018, Amendment in EP16179984.3, 13 pages.
Aug. 11, 2022, Petitioner's Reply to Patent Owner's Response, Case IPR2021-01149, U.S. Pat. No. 10,567,413, 43 pages.

* cited by examiner

Log(s)

Packet Log — 502

| Time | Packet Info. | Env. Vars. | Threat ID | Disp. |
|---|---|---|---|---|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_5 | A |
| 21 | <info.> | <vars.> | Threat_1 | A |
| 22 | <info.> | <vars.> | Threat_1 | A |
| 23 | <info.> | <vars.> | Threat_1 | A |
| 26 | <info.> | <vars.> | Threat_3 | B |
| 27 | <info.> | <vars.> | Threat_3 | B |
| 28 | <info.> | <vars.> | Threat_3 | B |
| 82 | <info.> | <vars.> | Threat_3 | B |
| 83 | <info.> | <vars.> | Threat_3 | B |
| 84 | <info.> | <vars.> | Threat_3 | B |

Flow Log — 504

| Time Range | Consolidated Info. | Threat ID | Counts |
|---|---|---|---|
| [01, 28] | <info. vars.> | Threat_3 | A=03 B=03 |
| [08, 14] | <info. vars.> | Threat_5 | A=04 B=00 |
| [21, 23] | <info. vars.> | Threat_1 | A=03 B=00 |

FIG. 5E

Log(s)

Packet Log

| Time | Packet Info. | Env. Vars. | Threat ID | Disp. |
|------|------|------|------|------|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_5 | A |
| 21 | <info.> | <vars.> | Threat_1 | A |
| 22 | <info.> | <vars.> | Threat_1 | A |
| 23 | <info.> | <vars.> | Threat_1 | A |
| 26 | <info.> | <vars.> | Threat_3 | B |
| 27 | <info.> | <vars.> | Threat_3 | B |
| 28 | <info.> | <vars.> | Threat_3 | B |
| 82 | <info.> | <vars.> | Threat_3 | B |
| 83 | <info.> | <vars.> | Threat_3 | B |
| 84 | <info.> | <vars.> | Threat_3 | B |
| 92 | <info.> | <vars.> | Threat_1 | B |
| 93 | <info.> | <vars.> | Threat_1 | B |
| 94 | <info.> | <vars.> | Threat_1 | B |
| 95 | <info.> | <vars.> | Threat_1 | B |
| 96 | <info.> | <vars.> | Threat_1 | B |
| 97 | <info.> | <vars.> | Threat_1 | B |

Flow Log

| Time Range | Consolidated Info. | Threat ID | Counts |
|------|------|------|------|
| [01, 84] | <info. vars.> | Threat_3 | A=03 B=06 |
| [08, 14] | <info. vars.> | Threat_5 | A=04 B=00 |
| [21, 23] | <info. vars.> | Threat_1 | A=03 B=00 |

FIG. 5F

Log(s) 504

Packet Log 220

| Time | Packet Info. | Env. Vars. | Threat ID | Disp. |
|------|--------------|------------|-----------|-------|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_5 | A |
| 21 | <info.> | <vars.> | Threat_1 | A |
| 22 | <info.> | <vars.> | Threat_1 | A |
| 23 | <info.> | <vars.> | Threat_1 | A |
| 26 | <info.> | <vars.> | Threat_3 | B |
| 27 | <info.> | <vars.> | Threat_3 | B |
| 28 | <info.> | <vars.> | Threat_3 | B |
| 82 | <info.> | <vars.> | Threat_3 | B |
| 83 | <info.> | <vars.> | Threat_3 | B |
| 84 | <info.> | <vars.> | Threat_3 | B |
| 92 | <info.> | <vars.> | Threat_1 | B |
| 93 | <info.> | <vars.> | Threat_1 | B |
| 94 | <info.> | <vars.> | Threat_1 | B |
| 95 | <info.> | <vars.> | Threat_1 | B |
| 96 | <info.> | <vars.> | Threat_1 | B |
| 97 | <info.> | <vars.> | Threat_1 | B |

Flow Log 502

| Time Range | Consolidated Info. | Threat ID | Counts |
|------------|--------------------|-----------|--------|
| [01, 84] | <info. vars.> | Threat_3 | A=03 B=06 |
| [08, 14] | <info. vars.> | Threat_5 | A=04 B=00 |
| [21, 97] | <info. vars.> | Threat_1 | A=03 B=06 |

FIG. 5G

RULE-BASED NETWORK-THREAT DETECTION

CROSS-REFERENCE TO RELATED APPLICATIONS

This application is a continuation of U.S. patent application Ser. No. 17/232,291, filed Apr. 16, 2021, which is a continuation of co-pending U.S. patent application Ser. No. 17/001,164, filed Aug. 24, 2020, which is a continuation of co-pending U.S. patent application Ser. No. 16/813,220 which is a continuation of U.S. patent application Ser. No. 16/706,388 (now U.S. Pat. No. 10,609,062), filed Dec. 6, 2019 which is a continuation of U.S. patent application Ser. No. 16/217,720 (now U.S. Pat. No. 10,567,413), filed Dec. 12, 2018, which is a continuation of U.S. patent application Ser. No. 15/827,477 (now U.S. Pat. No. 10,193,917), filed Nov. 30, 2017, which is a continuation of U.S. patent application Ser. No. 14/690,302 (now U.S. Pat. No. 9,866,576), filed Apr. 17, 2015, the content of which are hereby incorporated by reference into the present application.

BACKGROUND

Network security is becoming increasingly important as the information age continues to unfold. Network threats may take a variety of forms (e.g., unauthorized requests or data transfers, viruses, malware, large volumes of network traffic designed to overwhelm network resources, and the like). Many organizations subscribe to network-threat services that periodically provide information associated with network threats, for example, reports that include listings of network-threat indicators (e.g., network addresses, uniform resources identifiers (URIs), and the like). The information provided by such services may be utilized by organizations to identify network threats. For example, logs generated by the organization's network devices may be reviewed for data corresponding to the network-threat indicators provided by such services. But because the logs are generated based on the traffic processed by the network devices without regard to the network-threat indicators, this process is often tedious and time consuming and is exacerbated by the continuously evolving nature of potential threats. Accordingly, there is a need for rule-based network-threat detection.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to rule-based network-threat detection. In accordance with embodiments of the disclosure, a packet-filtering device may receive packet-filtering rules configured to cause the packet-filtering device to identify packets corresponding to network-threat indicators. The packet-filtering device may receive packets and, for each packet, may determine that the packet corresponds to criteria specified by a packet-filtering rule. The criteria may correspond to one or more of the network-threat indicators. The packet-filtering device may apply an operator specified by the packet-filtering rule. The operator may be configured to cause the packet-filtering device to either prevent the packet from continuing toward its destination or allow the packet to continue toward its destination. The packet-filtering device may generate a log entry comprising information from the packet-filtering rule that identifies the one or more network-threat indicators and indicating whether the packet-filtering device prevented the packet from continuing toward its destination or allowed the packet to continue toward its destination.

In some embodiments, the packet-filtering device may generate and communicate to a user device data indicating whether the packet-filtering device prevented the packet from continuing toward its destination or allowed the packet to continue toward its destination. The user device may receive the data and indicate in an interface displayed by the user device whether the packet-filtering device prevented the packet from continuing toward its destination or allowed the packet to continue toward its destination. The interface may comprise an element that when invoked by a user of the user device causes the user device to instruct the packet-filtering device to reconfigure the operator to prevent future packets corresponding to the criteria from continuing toward their respective destinations.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIGS. 5A, 5B, 5C, 5D, 5E, 5F, and 5G depict illustrative logs for rule-based network-threat detection in accordance with one or more aspects of the disclosure;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure.

Various connections between elements are discussed in the following description. These connections are general and, unless specified otherwise, may be direct or indirect, wired or wireless. In this respect, the specification is not intended to be limiting.

Figure 1:
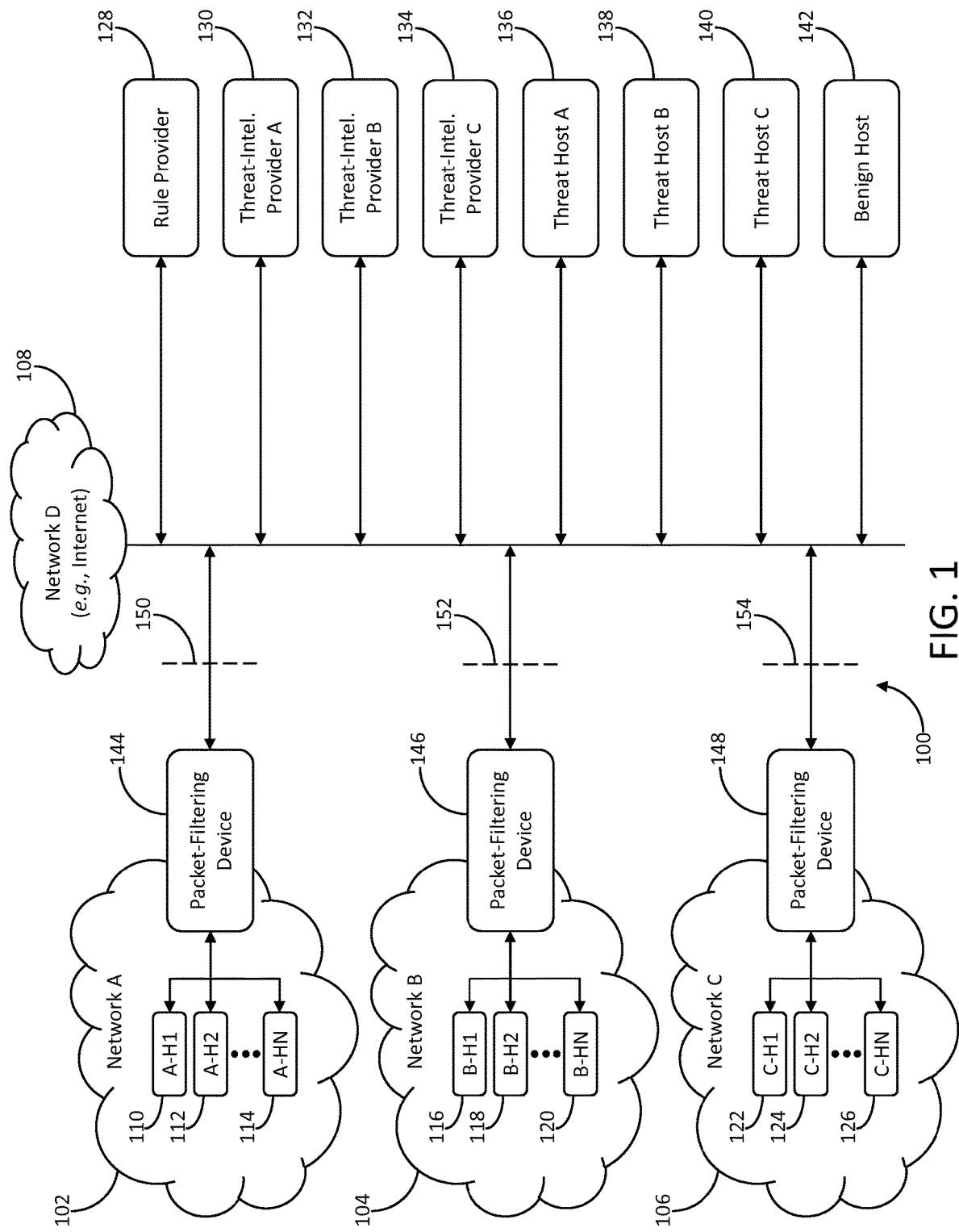
FIG. 1 depicts an illustrative environment for rule-based network-threat detection in accordance with one or more aspects of the disclosure.

FIG. 1 depicts an illustrative environment for rule-based network-threat detection in accordance with one or more aspects of the disclosure. Referring to FIG. 1, environment 100 may include one or more networks. For example, environment 100 may include networks 102, 104, 106, and 108. Networks 102, 104, and 106 may comprise one or more networks (e.g., Local Area Networks (LANs), Wide Area Networks (WANs), Virtual Private Networks (VPNs), or combinations thereof) associated with one or more individuals or entities (e.g., governments, corporations, service providers, or other organizations). Network 108 may comprise one or more networks (e.g., LANs, WANs, VPNs, or combinations thereof) that interface networks 102, 104, and 106 with each other and one or more other networks (not illustrated). For example, network 108 may comprise the Internet, a similar network, or portions thereof.

Environment 100 may also include one or more hosts, such as computing or network devices (e.g., servers, desktop computers, laptop computers, tablet computers, mobile devices, smartphones, routers, gateways, switches, access points, or the like). For example, network 102 may include hosts 110, 112, and 114, network 104 may include hosts 116, 118, and 120, network 106 may include hosts 122, 124, and 126, and network 108 may interface networks 102, 104, and 106 with one or more hosts associated with rule provider 128 or network-threat-intelligence providers 130, 132, and 134, threat hosts 136, 138, and 140, and benign host 142. Network-threat-intelligence providers 130, 132, and 134 may be associated with services that monitor network threats (e.g., threats associated with threat hosts 136, 138, and 140) and disseminate (e.g., to subscribers) network-threat-intelligence reports that include network-threat indicators (e.g., network addresses, ports, fully qualified domain names (FQDNs), uniform resource locators (URLs), uniform resource identifiers (URIs), or the like) associated with the network threats, as well as other information associated with the network threats, for example, the type of threat (e.g., phishing malware, botnet malware, or the like), geographic information (e.g., International Traffic in Arms Regulations (ITAR) country, Office of Foreign Assets Control (OFAC) country, or the like), anonymous proxies (e.g., Tor network, or the like), actors (e.g., the Russian Business Network (RBN), or the like).

Environment 100 may further include packet-filtering devices 144, 146, and 148. Packet-filtering device 144 may be located at boundary 150 between networks 102 and 108. Similarly, packet-filtering device 146 may be located at boundary 152 between networks 104 and 108, and packet-filtering device 148 may be located at boundary 154 between networks 106 and 108.

Figure 2A:
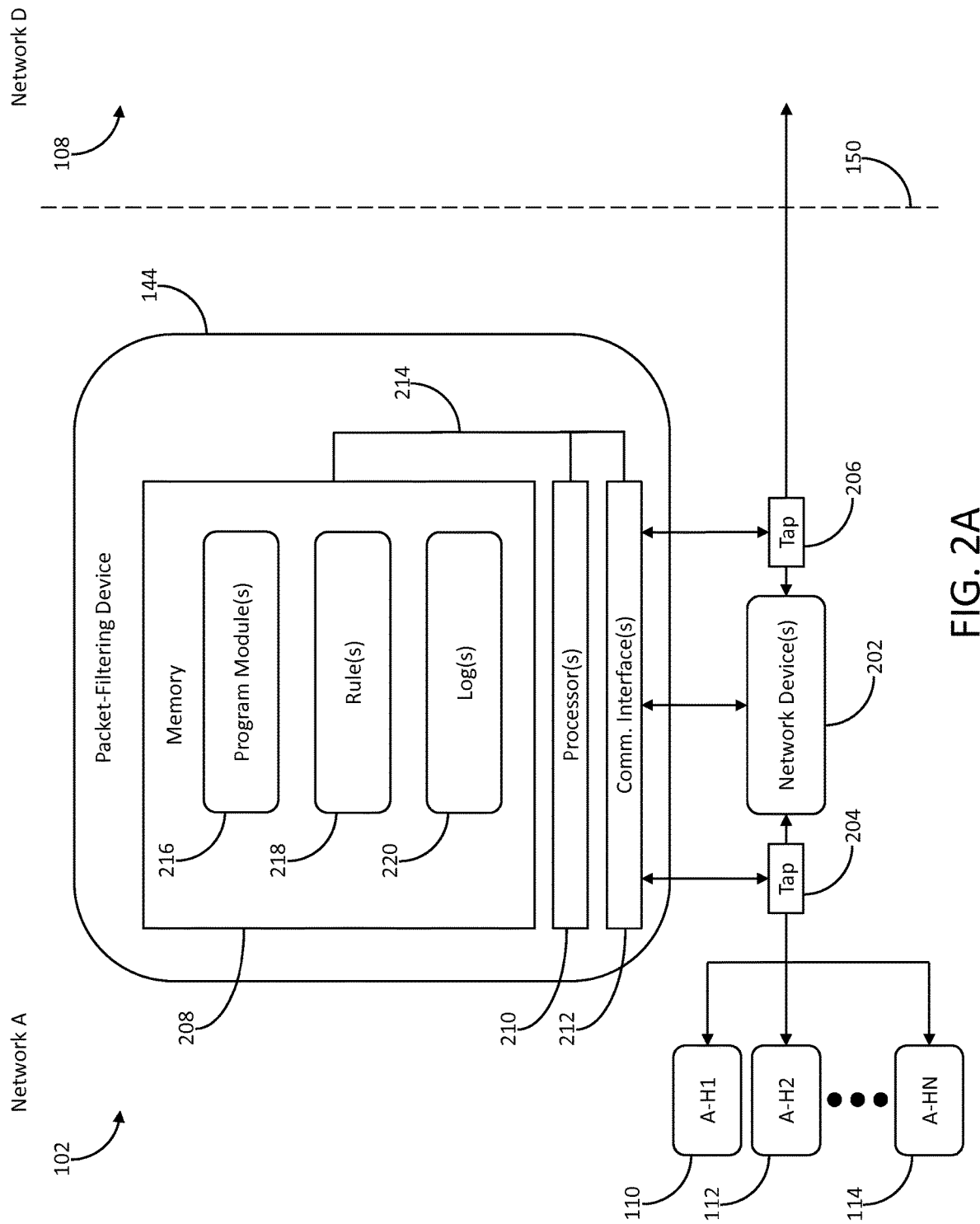
FIGS. 2A and 2B depict illustrative devices for rule-based network-threat detection in accordance with one or more aspects of the disclosure.
Figure 2B:
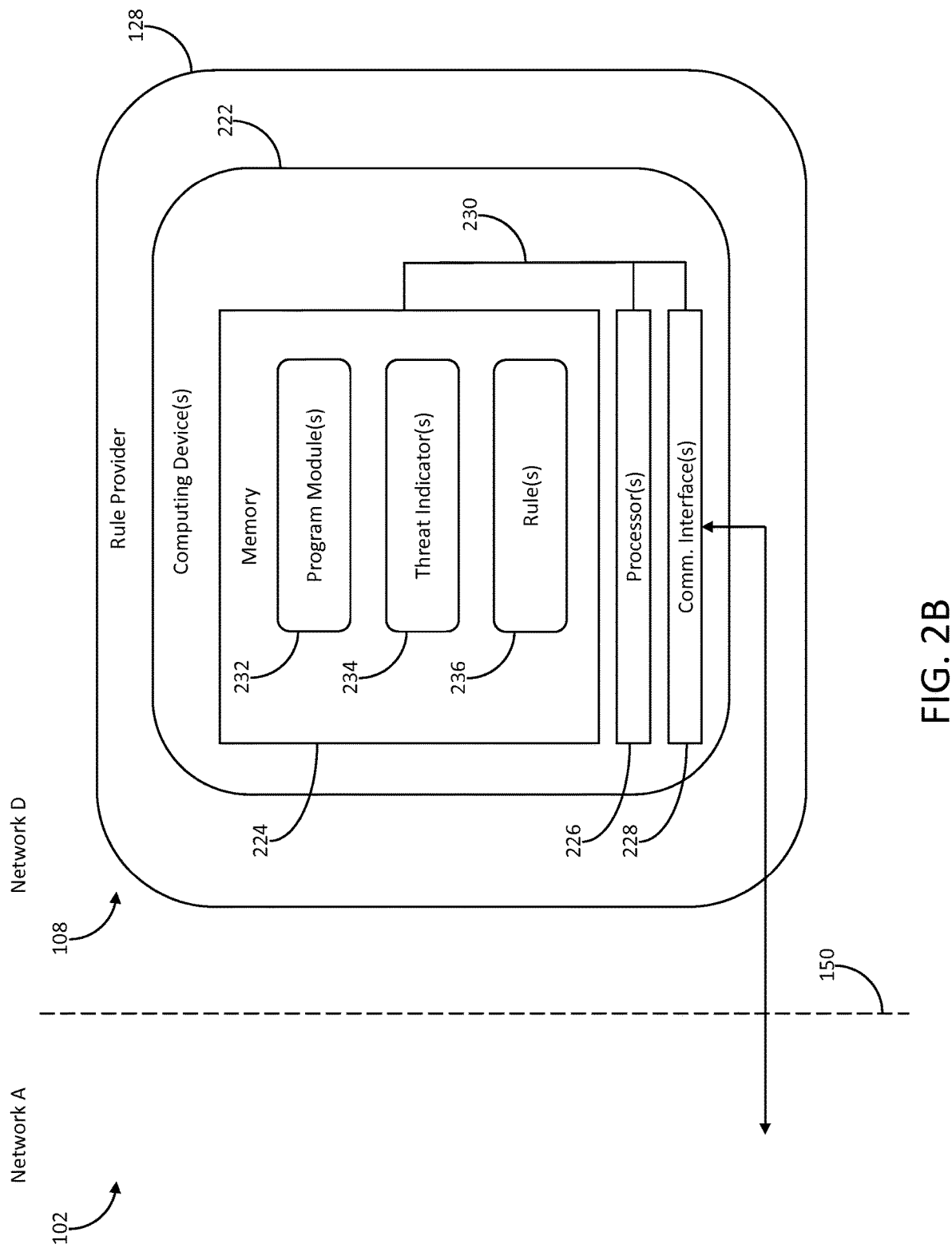

FIGS. 2A and 2B depict illustrative devices for rule-based network-threat detection in accordance with one or more aspects of the disclosure.

Referring to FIG. 2A, as indicated above, packet-filtering device 144 may be located at boundary 150 between networks 102 and 108. Network 102 may include one or more network devices 202 (e.g., servers, routers, gateways, switches, access points, or the like) that interface hosts 110, 112, and 114 with network 108. Network 102 may also include tap devices 204 and 206. Tap device 204 may be located on or have access to a communication path that interfaces network devices 202 and network 102 (e.g., one or more of hosts 110, 112, and 114). Tap device 206 may be located on or have access to a communication path that interfaces network devices 202 and network 108. Packet-filtering device 144 may include memory 208, one or more processors 210, one or more communication interfaces 212, and data bus 214. Data bus 214 may interface memory 208, processors 210, and communication interfaces 212. Communication interfaces 212 may interface packet-filtering device 144 with network devices 202 and tap devices 204 and 206. Memory 208 may comprise one or more program modules 216, one or more packet-filtering rules 218, and one or more logs 220. Program modules 216 may comprise instructions that when executed by processors 210 cause packet-filtering device 144 to perform one or more of the functions described herein. Networks 104 and 106 may each comprise components similar to those described herein with respect to network 102, and packet-filtering devices 146 and 148 may each comprise components similar to those described herein with respect to packet-filtering device 144.

Referring to FIG. 2B, rule provider 128 may include one or more computing devices 222. Computing devices 222 may include memory 224, one or more processors 226, one or more communication interfaces 228, and data bus 230. Data bus 230 may interface memory 224, processors 226, and communication interfaces 228. Communication interfaces 228 may interface computing devices 222 with network 108, which, as indicated above, may interface with network 102 at boundary 150. Memory 224 may comprise one or more program modules 232, one or more network-threat indicators 234, and one or more packet-filtering rules 236. Program modules 232 may comprise instructions that when executed by processors 226 cause computing devices 222 to perform one or more of the functions described herein.

FIGS. 3A, 3B, 3C, 3D, 3E, and 3F depict an illustrative event sequence for rule-based network-threat detection in accordance with one or more aspects of the disclosure. In reviewing the illustrative event sequence, it will be appreciated that the number, order, and timing of the illustrative events is simplified for the purpose of illustration and that additional (unillustrated) events may occur, the order and time of events may differ from the depicted illustrative events, and some events or steps may be omitted, combined, or occur in an order other than that depicted by the illustrative event sequence.

Figure 3A:
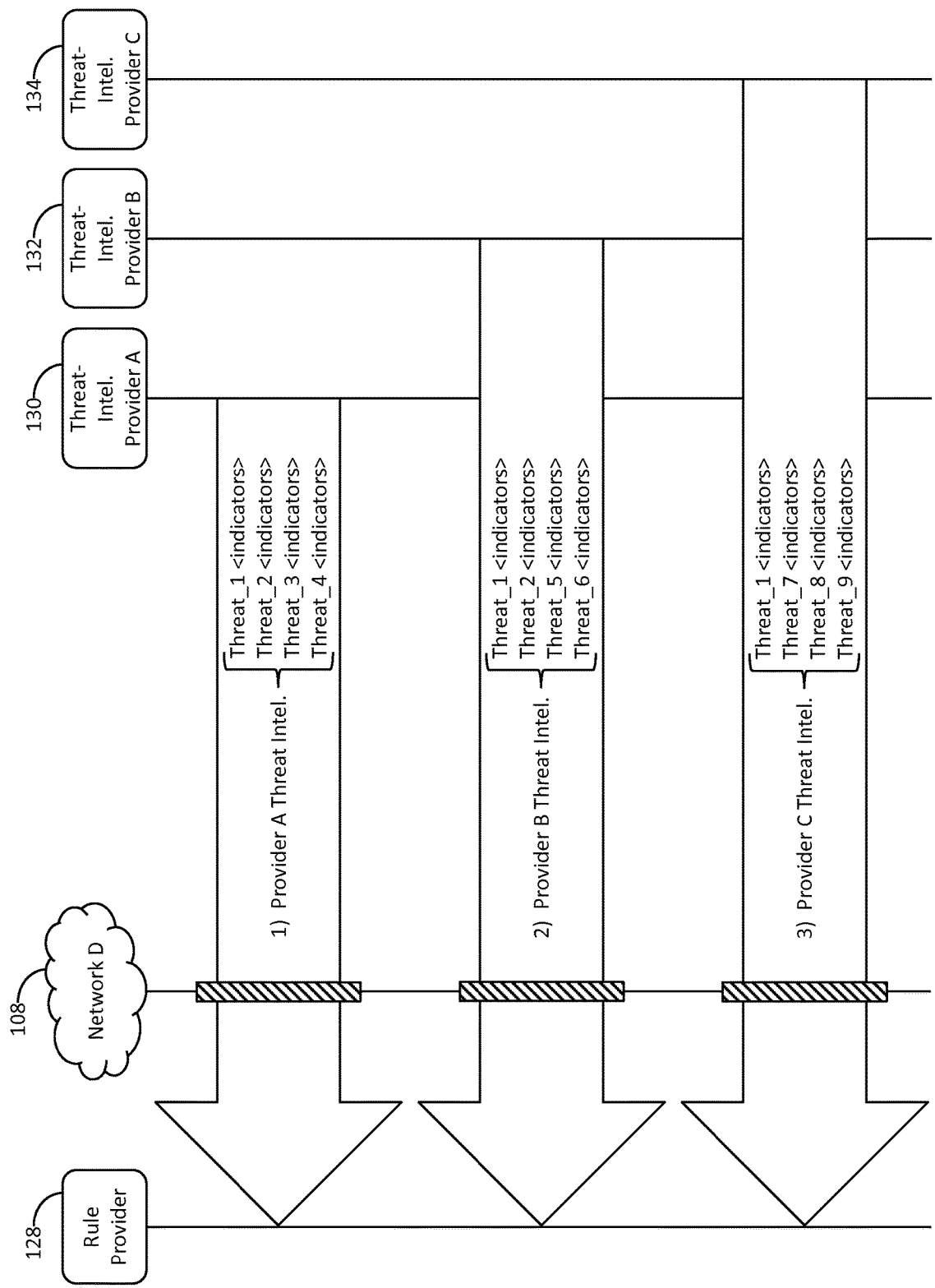
FIGS. 3A, 3B, 3C, 3D, 3E, and 3F depict an illustrative event sequence for rule-based network-threat detection in accordance with one or more aspects of the disclosure.

Referring to FIG. 3A, at step 1, network-threat-intelligence provider 130 may communicate to rule provider 128 (e.g., via network 108, as designated by the shaded box over the line extending downward from network 108) one or more network-threat-intelligence reports identifying one or more network threats (e.g., Threat_1, Threat_2, Threat_3, and Threat_4) and comprising one or more associated network-threat indicators (e.g., network addresses, ports, FQDNs, URLs, URIs, or the like), as well as other information associated with the network threats (e.g., the type of threat, geographic information, anonymous proxies, actors, or the like). Similarly, at step 2, network-threat-intelligence provider 132 may communicate to rule provider 128 one or more network-threat-intelligence reports identifying one or more network threats (e.g., Threat_1, Threat_2, Threat_5, and Threat_6) and comprising one or more associated network-threat indicators, as well as other information associated with the network threats, and, at step 3, network-threat-intelligence provider 134 may communicate to rule provider 128 one or more network-threat-intelligence reports identifying one or more network threats (e.g., Threat_1, Threat_7, Threat_8, and Threat_9) and comprising one or more associated network-threat indicators, as well as other information associated with the network threats. Rule provider 128

(e.g., computing devices 222) may receive (e.g., via communication interfaces 228) the network-threat-intelligence reports communicated by network-threat-intelligence providers 130, 132, and 134, and may store data contained therein in memory 224 (e.g., network-threat indicators 234).

Figure 3B:
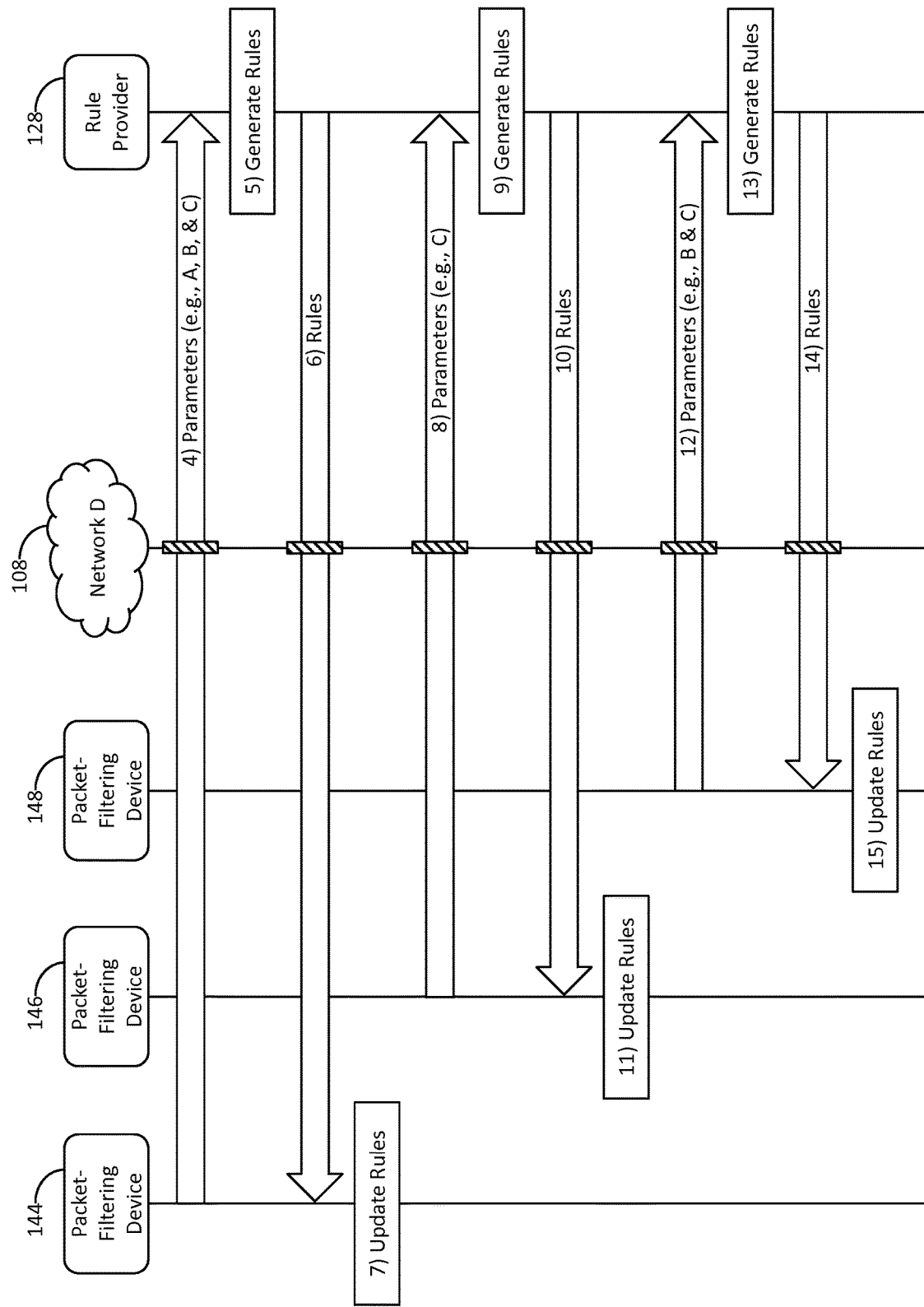

Referring to FIG. 3B, at step 4, packet-filtering device 144 may communicate one or more parameters to rule provider 128 (e.g., parameters indicating a preference, authorization, subscription, or the like to receive packet-filtering rules generated based on network-threat-intelligence reports provided by network-threat-intelligence providers 130, 132, and 134). At step 5, rule provider 128 (e.g., computing devices 222) may generate one or more packet-filtering rules (e.g., packet-filtering rules 236) based on the network-threat-intelligence reports provided by network-threat-intelligence providers 130, 132, and 134 (e.g., network-threat indicators 234) and, at step 6, may communicate the packet-filtering rules to packet-filtering device 144, which, at step 7, may update packet-filtering rules 218 to include the packet-filtering rules generated by rule provider 128 in step 5.

Figure 4A:
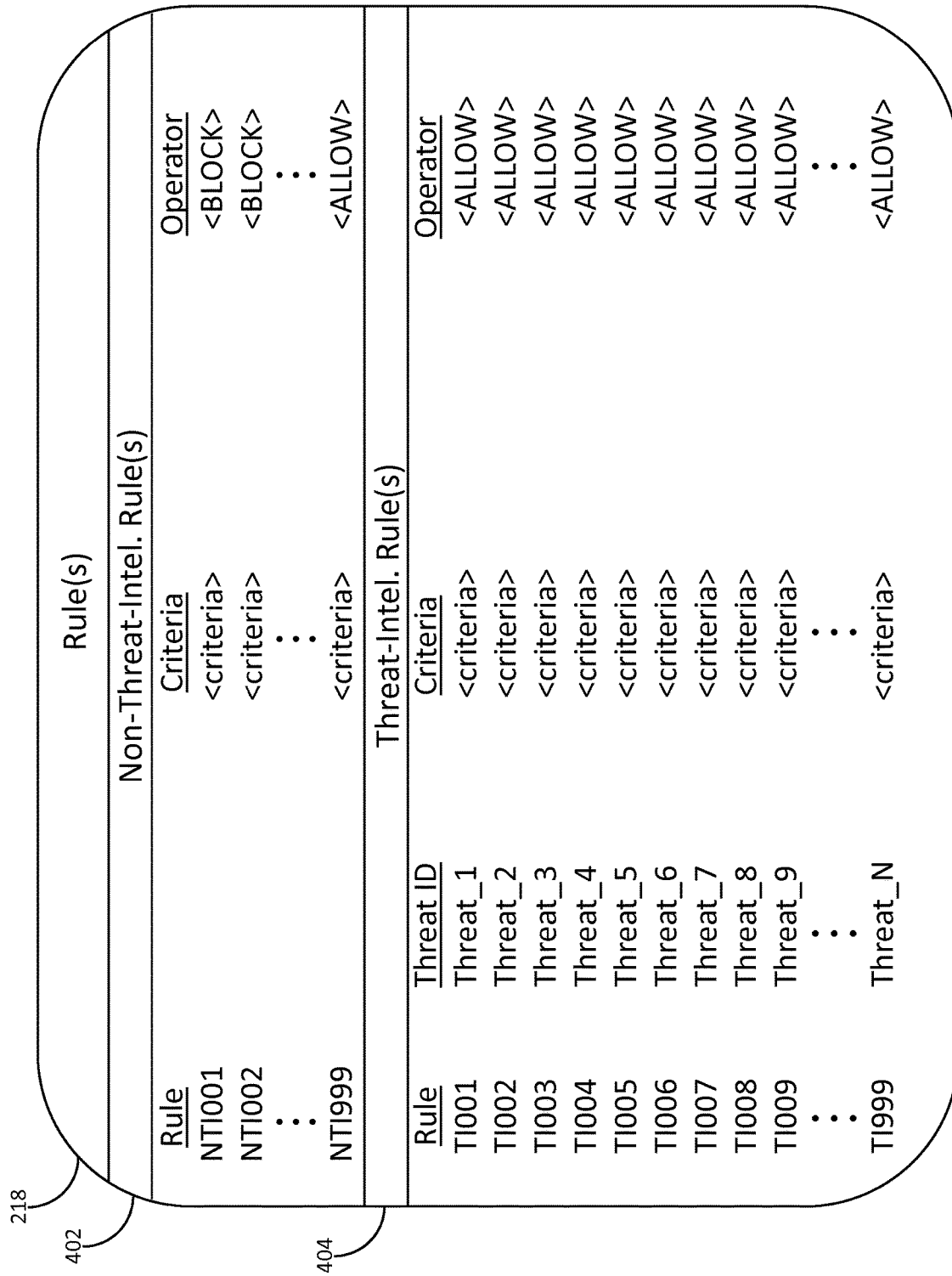
FIGS. 4A, 4B, and 4C depict illustrative packet-filtering rules for rule-based network-threat detection in accordance with one or more aspects of the disclosure.

For example, referring to FIG. 4A, packet-filtering rules 218 may include packet-filtering rules 402 that comprise non-network-threat-intelligence rules (e.g., packet-filtering rules generated by an administrator of network 102) and packet-filtering rules 404 that comprise network-threat-intelligence rules (e.g., the packet-filtering rules communicated by rule provider 128 in step 6). Each of the network-threat-intelligence rules may comprise: one or more criteria that correspond to one or more of network-threat indicators 234 upon which the rule is based and may be configured to cause packet-filtering device 144 to identify packets corresponding to the criteria (e.g., corresponding to the network-threat indicators upon which the rule is based); an operator configured to cause packet-filtering device 144 to either prevent packets corresponding to the criteria from continuing toward their respective destinations (e.g., a BLOCK operator) or allow packets corresponding to the criteria to continue toward their respective destinations (e.g., an ALLOW operator); and information distinct from the criteria (e.g., a Threat ID) that identifies one or more of the network-threat indicators upon which the rule is based, one or more network threats associated with the network-threat indicators, one or more network-threat-intelligence reports that included the network-threat indicators, one or more of network-threat-intelligence providers 130, 132, or 134 that provided the network-threat-intelligence reports, or other information contained in the network-threat-intelligence reports that is associated with the network-threat indicators or the network threats (e.g., the type of threat, geographic information, anonymous proxies, actors, or the like).

Returning to FIG. 3B, at step 8, packet-filtering device 146 may communicate one or more parameters to rule provider 128 (e.g., parameters indicating a preference, authorization, subscription, or the like to receive packet-filtering rules generated based on network-threat-intelligence reports provided by network-threat-intelligence provider 134). At step 9, rule provider 128 may generate one or more packet-filtering rules based on the network-threat-intelligence reports provided by network-threat-intelligence provider 134 (e.g., network-threat indicators 234 (or a portion thereof included in network-threat-intelligence reports received from network-threat-intelligence provider 134)) and, at step 10, may communicate the packet-filtering rules to packet-filtering device 146, which, at step 11, may update its packet-filtering rules to include the packet-filtering rules generated by rule provider 128 in step 9. Similarly, at step 12, packet-filtering device 148 may communicate one or more parameters to rule provider 128 (e.g., parameters indicating a preference, authorization, subscription, or the like to receive packet-filtering rules generated based on network-threat-intelligence reports provided by network-threat-intelligence providers 132 and 134). At step 13, rule provider 128 may generate one or more packet-filtering rules based on the network-threat-intelligence reports provided by network-threat-intelligence providers 132 and 134 (e.g., network-threat indicators 234 (or a portion thereof included in network-threat-intelligence reports received from network-threat-intelligence providers 132 and 134)) and, at step 14, may communicate the packet-filtering rules to packet-filtering device 148, which, at step 15, may update its packet-filtering rules to include the packet-filtering rules generated by rule provider 128 in step 13.

Figure 3C:
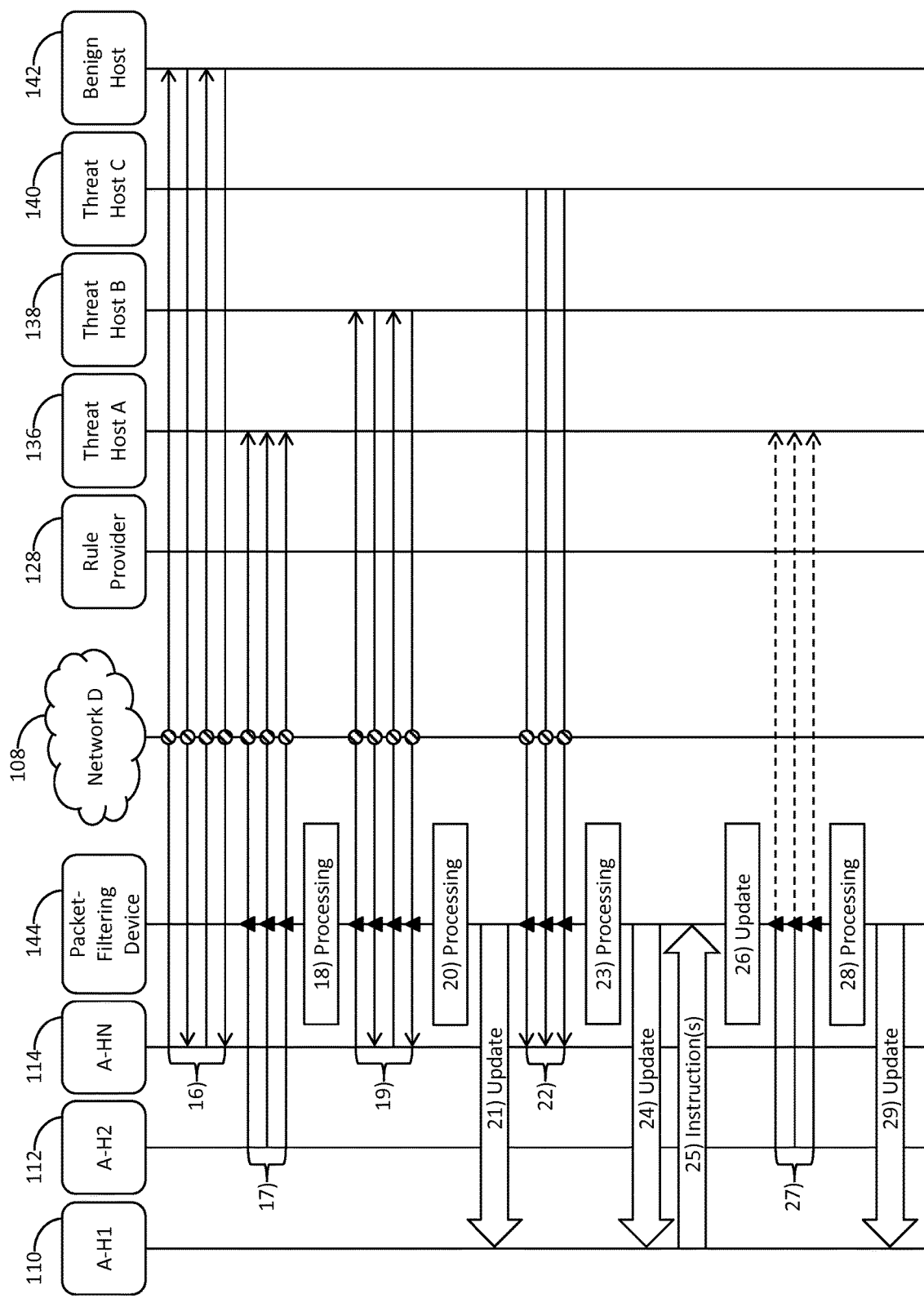

Referring to FIG. 3C, at step 16, four packets may be communicated (e.g., via network 108, as designated by the shaded circles over the line extending downward from network 108) between host 114 and benign host 142 (e.g., two packets originating from host 114 and destined for benign host 142 and two packets originating from benign host 142 and destined for host 114), and packet-filtering device 144 may receive each of the four packets (e.g., via tap devices 204 and 206), apply one or more of packet-filtering rules 218 to the four packets, and allow the four packets to continue toward their respective destinations.

At step 17, three packets may be communicated by host 112 to threat host 136, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI003), apply an operator specified by the packet-filtering rule (e.g., an ALLOW operator) to each of the three packets, allow each of the three packets to continue toward its respective destination (e.g., toward threat host 136), and generate log data for each of the three packets (as designated by the triangles over the line extending downward from packet-filtering device 144).

Figure 5A:
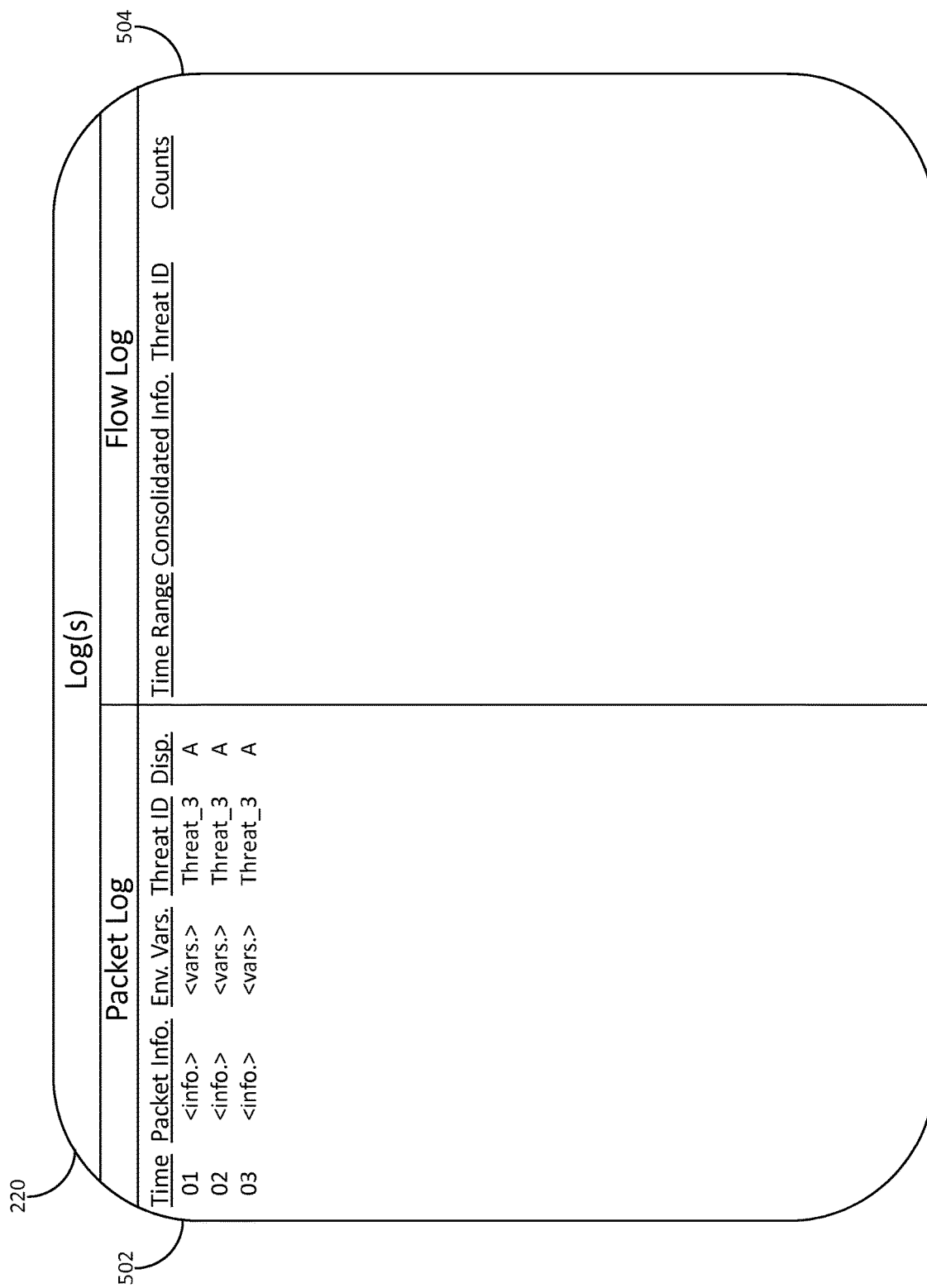

At step 18, packet-filtering device 144 may begin processing the log data generated in step 17. For example, referring to FIG. 5A, logs 220 may include packet log 502 and flow log 504, each of which (or portions thereof) may be reserved or distinguished for entries associated with packets corresponding to criteria included in packet-filtering rules 404, and packet-filtering device 144 may generate an entry in packet log 502 for each of the three packets. Each entry may comprise data indicating a hit time for the packet (e.g., a time at which the packet was received by packet-filtering device 144, identified by packet-filtering device 144, or the like), data derived from the packet (e.g., a source address, a destination address, a port number, a protocol type, a domain name, URL, URI, or the like), one or more environmental variables (e.g., an identifier of an interface of packet-filtering device 144 over which the packet was received, an identifier of an interface of packet-filtering device 144 over which the packet was forwarded toward its destination, an identifier associated with packet-filtering device 144 (e.g., distinguishing packet-filtering device 144 from packet-filtering devices 146 and 148), or the like), data identifying the packet-filtering rule of packet-filtering rules 404 to which the packet corresponded (e.g., Thread ID: Threat_3), and data indicating whether packet-filtering device 144 prevented the packet from continuing toward its destination or allowed the packet to continue toward its destination (e.g., the character A may designate that packet-filtering device 144 allowed the packet to continue toward its destination, and the character B may designate that packet-filtering device 144 prevented the packet from continuing toward its destination).

Returning to FIG. 3C, at step 19, four packets may be communicated between host 114 and threat host 138 (e.g., two packets originating from host 114 and destined for threat host 138 and two packets originating from threat host 138 and destined for host 114), and packet-filtering device 144 may receive each of the four packets, apply one or more of packet-filtering rules 218 to the four packets, determine that each of the four packets corresponds to criteria specified by a packet-filtering rule of packet-filtering rules 404 (e.g., Rule: TI005), apply an operator specified by the packet-filtering rule (e.g., an ALLOW operator) to each of the four packets, allow each of the four packets to continue toward its respective destination, and generate log data for each of the four packets. In some embodiments, the criteria specified by one or more of packet-filtering rules 404 (e.g., the criteria generated from the network-threat indicators) may include network addresses and one or more of the packets received by packet-filtering device 144 may comprise domain names, URIs, or URLs. In such embodiments, packet-filtering device 144 may comprise a local domain name system (DNS) cache (e.g., stored in memory 208) and may utilize the local DNS cache to resolve one or more of the domain names, URIs, or URLs included in the packets into one or more of the network addresses included in the criteria.

Figure 5B:
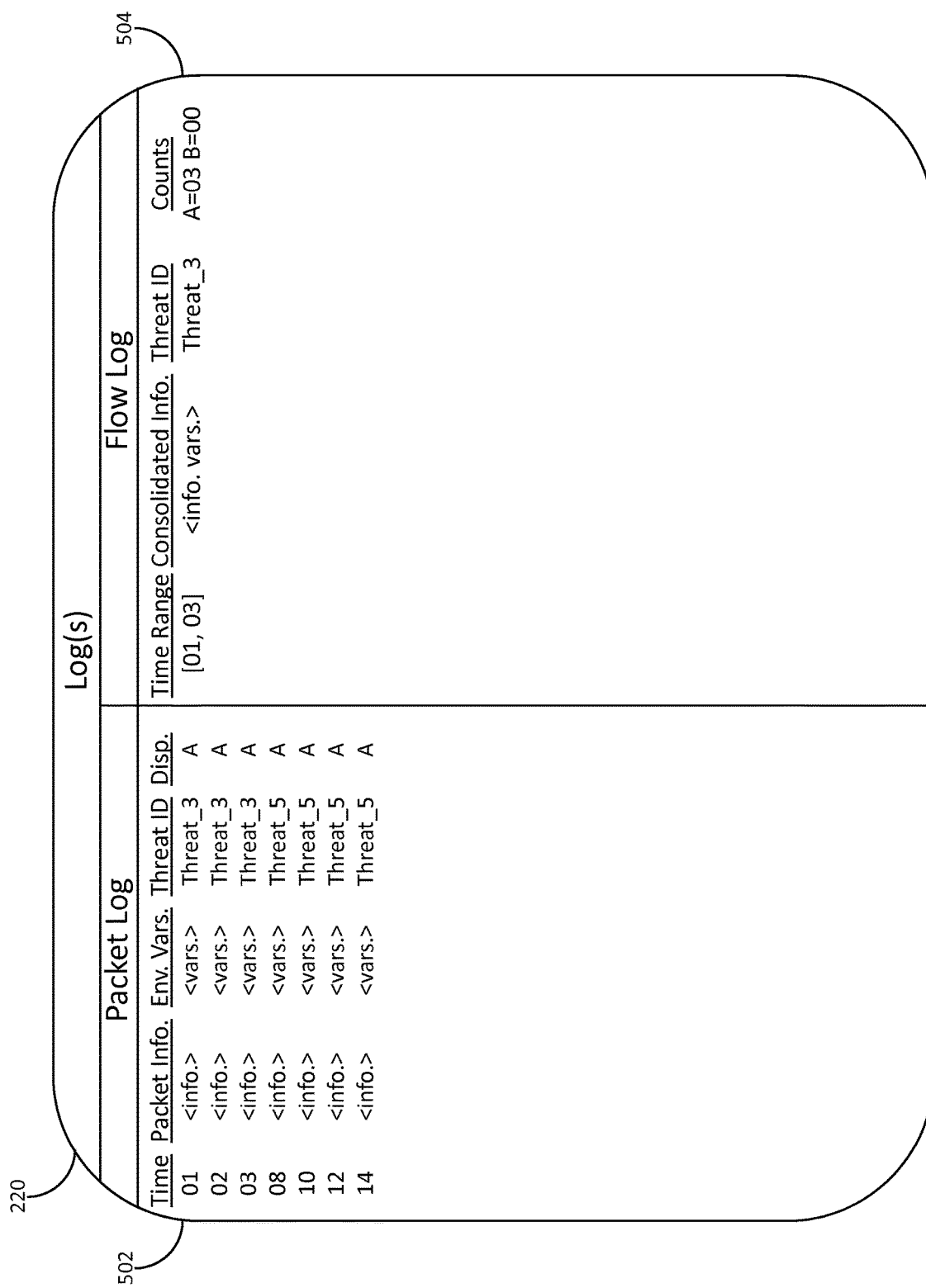

At step 20, packet-filtering device 144 may continue processing the log data generated in step 17 and may begin processing the log data generated in step 19. In some embodiments, packet-filtering device 144 may be configured in accordance with work-conserving scheduling in order to minimize latency (e.g., the time between when a packet corresponding to a network threat crosses boundary 150 and the time when an administrator associated with network 102 is presented with an interface indicating that the packet corresponding to the network threat has crossed boundary 150). For example, referring to FIG. 5B, packet-filtering device 144 may generate entries in packet log 502 for each of the packets received in step 19 while generating an entry in flow log 504 for the packets received in step 17. Packet-filtering device 144 may generate the entry in flow log 504 for the packets received in step 17 based on the entries generated in packet log 502 (e.g., in step 18) for the packets received in step 17. The entry in flow log 504 may consolidate, compress, or summarize the entries in packet log 502. For example, the entry in flow log 504 may comprise a time range (e.g., [01, 03]) indicating the earliest hit time indicated by the entries (e.g., Time: 01) to the latest hit time indicated by the entries (e.g., Time: 03), consolidated information from the entries (e.g., a consolidation of the information derived from the packets and the environmental variables), information that each of the associated packets have in common (e.g., Threat ID: Threat_3), a count of the associated packets allowed by packet-filtering device 144 to continue toward their respective destinations, and a count of the associated packets prevented by packet-filtering device 144 from continuing toward their respective destinations.

Returning to FIG. 3C, at step 21, packet-filtering device 144 may utilize flow log 504 to generate data comprising an update for an interface associated with packet-filtering device 144 and displayed by host 110, and may communicate the data comprising the update to host 110. For example, referring to FIG. 6A, host 110 may be a user device associated with an administrator of network 102 and configured to display interface 600. Interface 600 may include graphical depictions 602 and 604, which may illustrate activity associated with packet-filtering device 144. For example, graphical depiction 602 may comprise a line chart depicting, for a user-specified time interval, a number of packet hits, a number of packets prevented from continuing toward their respective destinations, a number of packets allowed to continue toward their respective destinations, or the like, and graphical depiction 604 may comprise an annulated pie chart illustrating percentages of hits during the user-specified time interval that are associated with various category types (e.g., type of network threat, geographic information, anonymous proxies, actors, or the like).

Interface 600 may also include listing 606, which may comprise entries corresponding to network threats and, for each threat, associated information derived by packet-filtering device 144 from flow log 504 (e.g., a description of the threat, information derived from the consolidated information stored in flow log 504, the time of the last associated packet hit, a count of associated packet hits, a count of associated packets allowed by packet-filtering device 144 to continue toward their respective destinations, a count of associated packets prevented by packet-filtering device 144 from continuing toward their respective destinations) and a status of the operator included in the rule associated with the threat.

Packet-filtering device 144 may be configured to determine an ordering of the network threats, and listing 606 may be displayed in accordance with the ordering determined by packet-filtering device 144. In some embodiments, packet-filtering device 144 may be configured to determine a score for each of the network threats and the ordering may be determined based on the scores. In such embodiments, the scores may be determined based on a number of associated packet hits, times associated with the packet hits (e.g., time of day, time since last hit, or the like), whether the packet was destined for a network address associated with a host in network 102 or a host in network 108, one or more network-threat-intelligence providers that provided the network-threat indicators associated with the threat, the number of network-threat intelligence providers that provided the network-threat indicators associated with the threat, other information associated with the network threat (e.g., type of network threat, geographic information, anonymous proxies, actors, or the like).

Figure 6A:
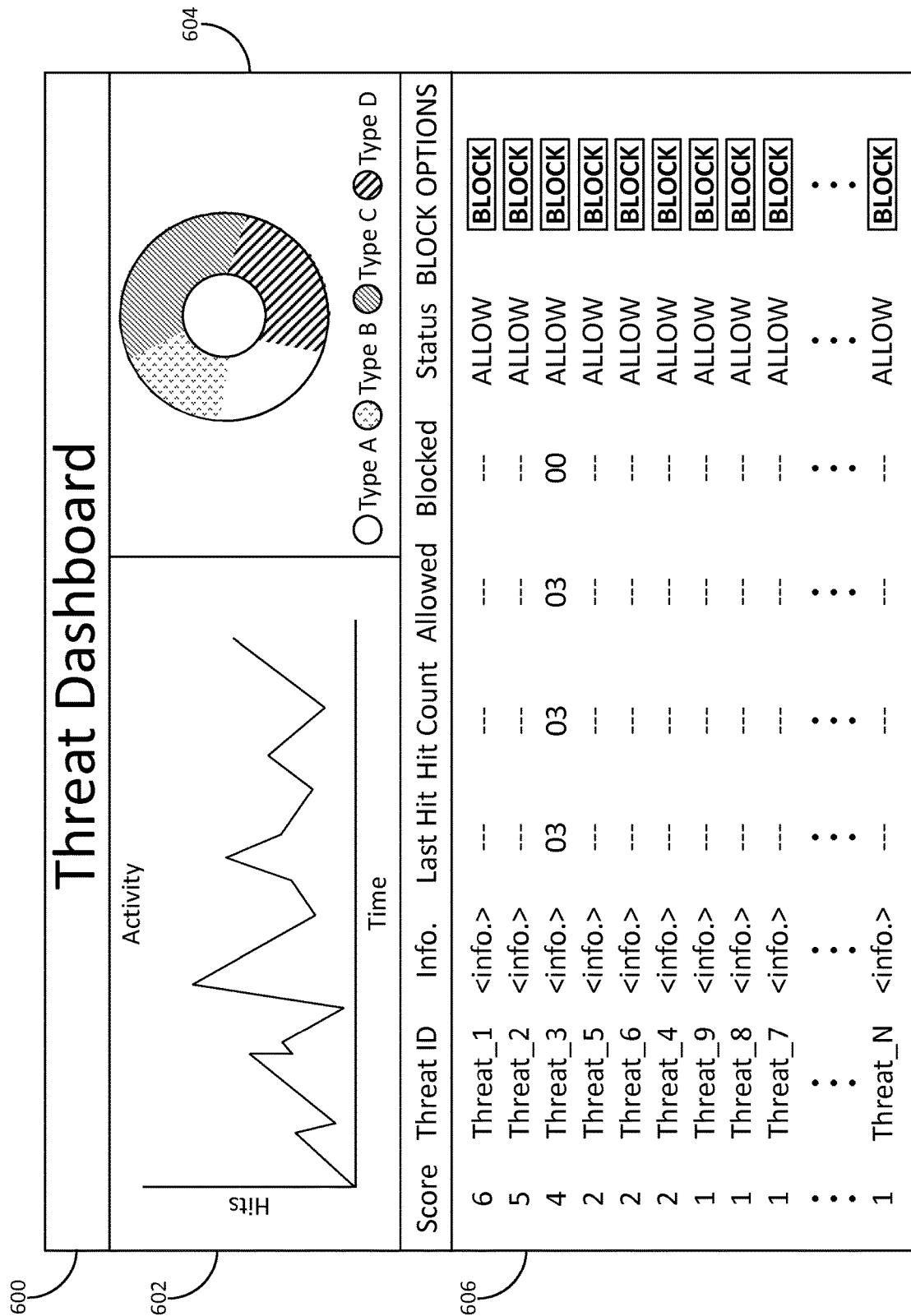
FIGS. 6A, 6B, 6C, 6D, 6E, 6F, and 6G depict illustrative interfaces for rule-based network-threat detection in accordance with one or more aspects of the disclosure.

For example, as illustrated in FIG. 6A, the threat associated with Threat ID: Threat_1 may be assigned a score (e.g., 6) higher than the score assigned to the threat associated with Threat ID: Threat_2 (e.g., 5) based on a determination that the network-threat-indicators corresponding to the threat associated with Threat ID: Threat_1 were received from three different network-threat-intelligence providers (e.g., network-threat-intelligence providers 130, 132, and 134) and a determination that the network-threat-indicators corresponding to the threat associated with Threat ID: Threat_2 were received from two different network-threat-intelligence providers (e.g., network-threat-intelligence providers 130 and 132). Similarly, the threat associated with Threat ID: Threat_2 may be assigned a score (e.g., 5) higher than the score assigned to the threat associated with Threat ID: Threat_3 (e.g., 4) based on a determination that the network-threat-indicators corresponding to the threat associated with Threat ID: Threat_2 were received from two different network-threat-intelligence providers (e.g., network-threat-intelligence providers 130 and 132) and a determination that the network-threat-indicators corresponding to the threat associated with Threat ID: Threat_3 were received from one network-threat-intelligence provider (e.g., network-threat-intelligence provider 130). Additionally, the threat associated with Threat ID: Threat_3 may be assigned a score (e.g., 4) higher than the score assigned to the threat associated with Threat ID: Threat_5 (e.g., 2) based on a determination that the last packet hit corresponding to the threat associated with Threat ID: Threat_3 is more recent than the last packet hit corresponding to the threat associated with Threat ID: Threat_5, and the threat associated with Threat ID: Threat_4 may be assigned a score (e.g., 2) higher than the score assigned to the threat associated with Threat ID: Threat_9 (e.g., 1) based on a determination that the network-threat-indicators corresponding to the threat associated with Threat ID: Threat_4 were received from network-threat-intelligence provider 130 and a determination that the network-threat-indicators corresponding to the threat associated with Threat ID: Threat_9 were received from network-threat-intelligence provider 134 (e.g., the network-threat-intelligence reports produced by network-threat-intelligence provider 130 may be regarded as more reliable than the network-threat-intelligence reports produced by network-threat-intelligence provider 134).

Returning to FIG. 3C, at step 22, three packets may be communicated by threat host 140 to host 114, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI001), apply an operator specified by the packet-filtering rule (e.g., an ALLOW operator) to each of the three packets, allow each of the three packets to continue toward its respective destination (e.g., toward host 114), and generate log data for each of the three packets.

Figure 5C:
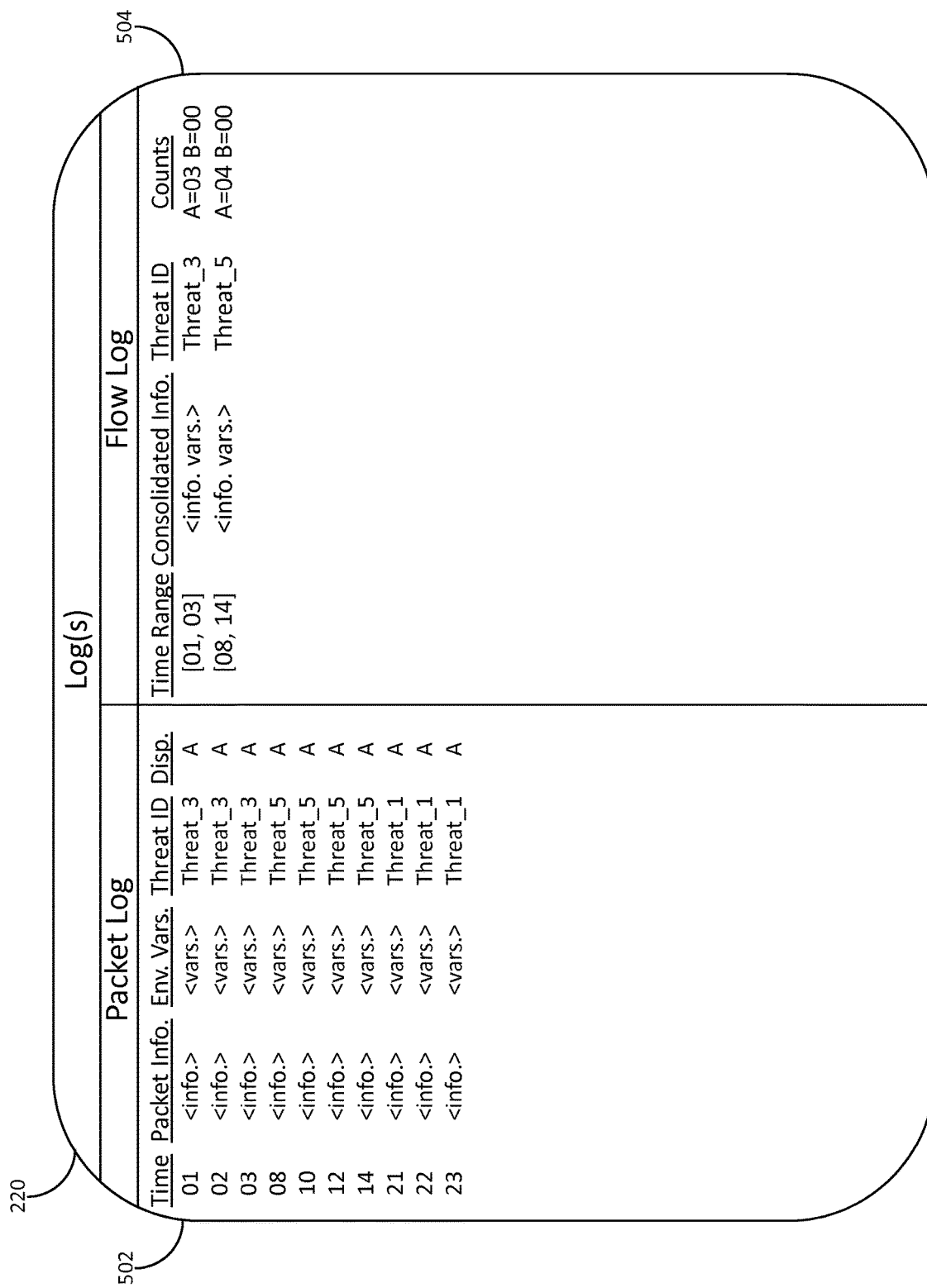

At step 23, packet-filtering device 144 may continue processing the log data generated in step 19 and may begin processing the log data generated in step 22. For example, referring to FIG. 5C, packet-filtering device 144 may generate entries in packet log 502 for each of the packets received in step 22 while generating an entry in flow log 504 for the packets received in step 19 based on the entries generated in packet log 502 (e.g., in step 20) for the packets received in step 19.

Figure 6B:
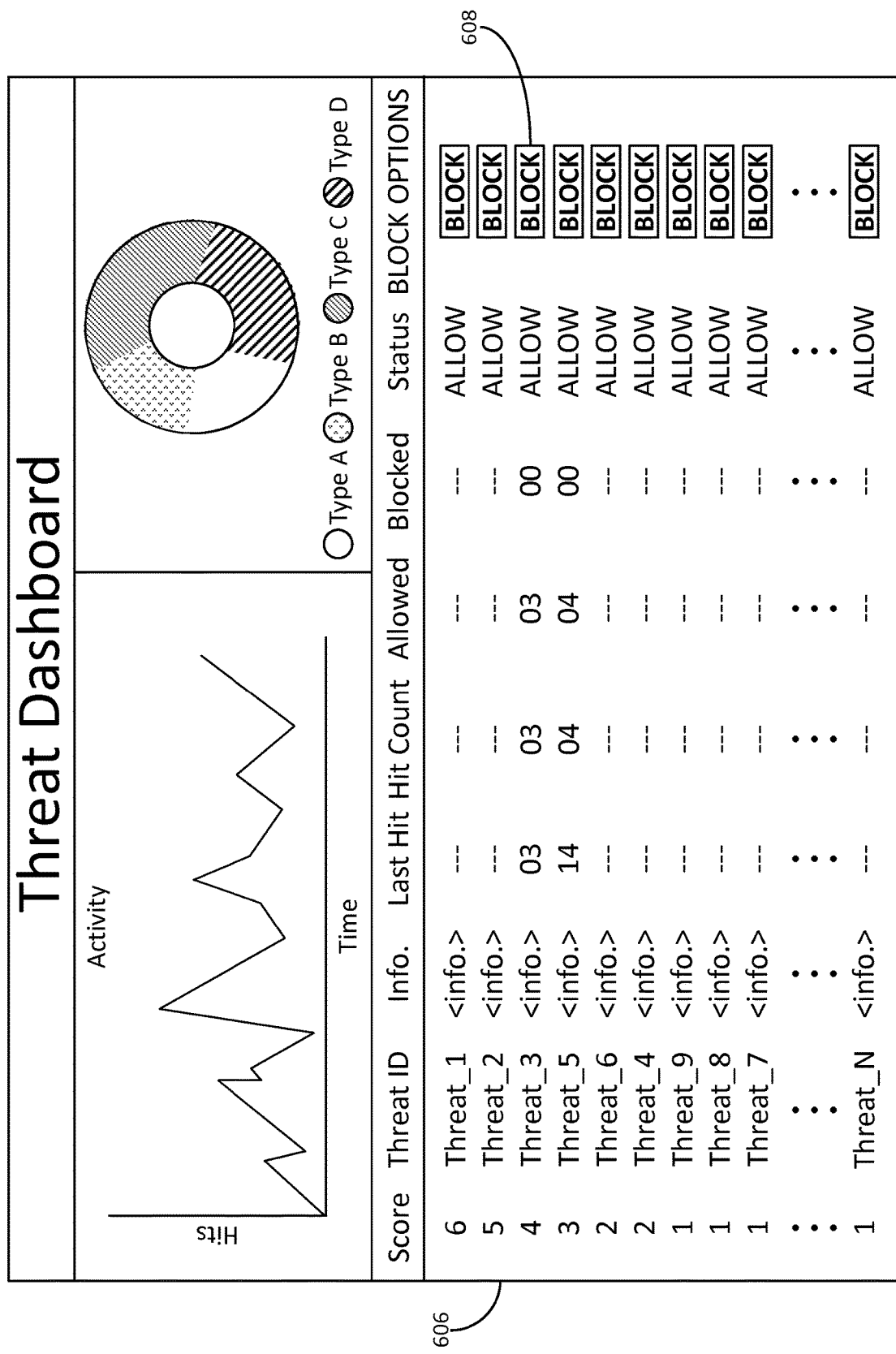

Returning to FIG. 3C, at step 24, packet-filtering device 144 may utilize flow log 504 to generate data comprising an update for interface 600 and may communicate the data to host 110. For example, referring to FIG. 6B, the update may cause interface 600 to update an entry in listing 606 corresponding to the threat associated with Threat ID: Threat_5 to reflect the packets received in step 19 and to reflect a new score (e.g., 3) assigned by packet-filtering device 144 to the threat associated with Threat ID: Threat_5 (e.g., the score may have increased based on the packets received in step 19).

Interface 600 may include one or more block options that when invoked by a user of host 110 (e.g., the administrator of network 102) cause host 110 to instruct packet-filtering device 144 to reconfigure an operator of a packet-filtering rule included in packet-filtering rules 404 to prevent packets corresponding to the criteria specified by the packet-filtering rule from continuing toward their respective destinations. In some embodiments, listing 606 may include such a block option alongside each entry, and, when invoked, the block option may cause host 110 to instruct packet-filtering device 144 to reconfigure an operator of packet-filtering rules 404 that corresponds to the network threat associated with the entry. For example, interface 600 may include block option 608, which, when invoked, may cause host 110 to instruct packet-filtering device 144 to reconfigure an operator associated with Rule: TI003 (e.g., to reconfigure the operator to cause packet-filtering device 144 to prevent packets corresponding to the one or more criteria specified by Rule: TI003 (e.g., packets corresponding to the network-threat-indicators associated with Threat ID: Threat_3) from continuing toward their respective destinations).

Figure 6C:
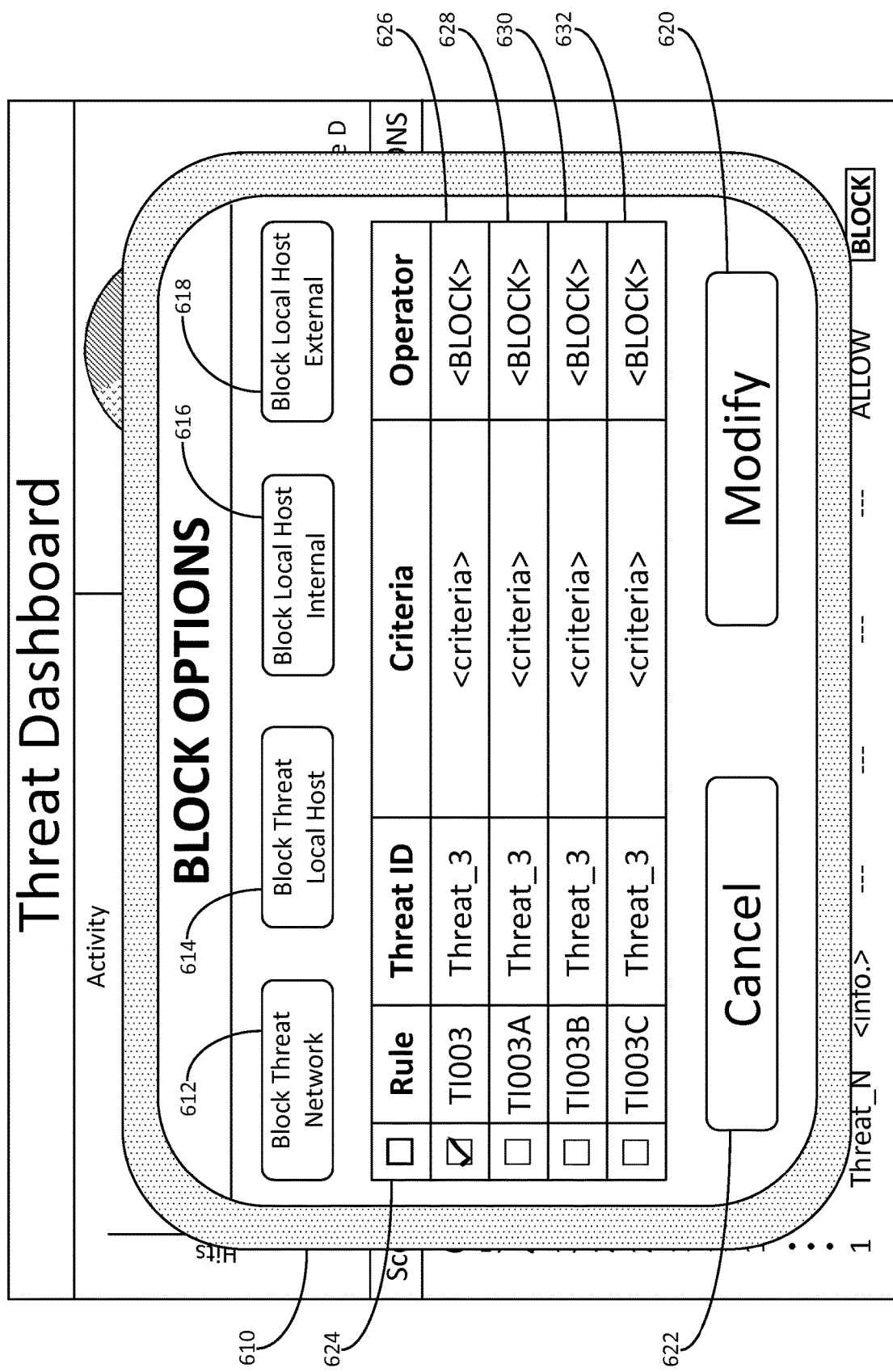

Additionally or alternatively, when invoked, such a block option may cause host 110 to display another interface (e.g., an overlay, pop-up interface, or the like) associated with packet-filtering device 144. For example, referring to FIG. 6C, when invoked, block option 608 may cause host 110 to display interface 610. Interface 610 may comprise specific block options 612, 614, 616, and 618, modify option 620, and cancel option 622. Specific block option 612 may correspond to an option to reconfigure packet-filtering device 144 to prevent packets corresponding to the network threat and destined for or originating from a host in network 102 from continuing toward their respective destinations. Specific block option 614 may correspond to an option to reconfigure packet-filtering device 144 to prevent packets corresponding to the network threat and destined for or originating from one or more particular hosts in network 102 that have generated or received packets associated with the network threat (e.g., host 112) from continuing toward their respective destinations. Specific block option 616 may correspond to an option to reconfigure packet-filtering device 144 to prevent any packets received from the particular hosts in network 102 that have generated or received packets associated with the network threat from continuing toward hosts located in network 102. And specific block option 618 may correspond to an option to reconfigure packet-filtering device 144 to prevent any packets received from the particular hosts in network 102 that have generated or received packets associated with the network threat from continuing toward hosts located in network 108.

Interface 610 may also include rule-preview listing 624, which may display a listing of rules that will be implemented by packet-filtering device 144 in response to the user invoking modify option 620. Rule-preview listing 624 may include one or more entries corresponding to each of specific block options 612, 614, 616, and 618. For example, entry 626 may correspond to, and display a rule configured to implement, specific block option 612 (e.g., Rule: TI003 with its operator reconfigured to BLOCK). Similarly, entries 628, 630, and 632 may correspond to, and display rules configured to implement, specific block options 614, 616, and 618 (e.g., one or more new rules generated by packet-filtering device 144 based on data derived from flow log 504 (e.g., a network address associated with host 112)). Responsive to a user invoking one or more of specific block options 612, 614, 616, or 618, the interface may select the corresponding rules, and responsive to a user invoking modify option 620, host 110 may instruct packet-filtering device 144 to implement the selected rules. Responsive to a user invoking cancel option 620, host 110 may redisplay interface 600.

Figure 4B:
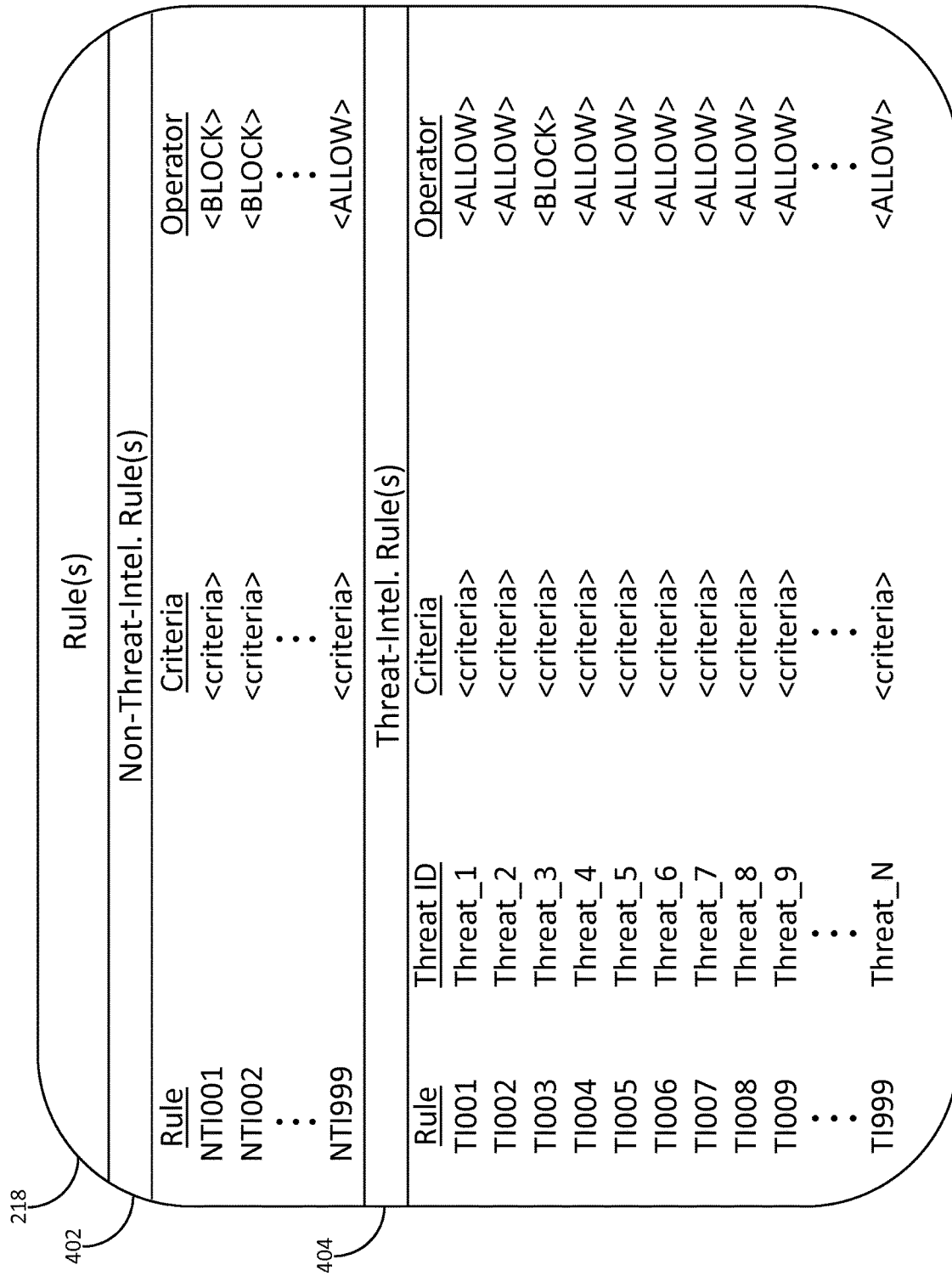

Returning to FIG. 3C, at step 25, host 110 may communicate instructions to packet-filtering device 144 instructing packet-filtering device 144 to reconfigure one or more of packet-filtering rules 404 (e.g., to reconfigure the operator of Rule: TI003 to BLOCK), and, at step 26, packet-filtering device 144 may reconfigure packet-filtering rules 404 accordingly, as reflected in FIG. 4B.

At step 27, three packets destined for threat host 136 may be communicated by host 112, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI003), apply an operator specified by the packet-filtering rule (e.g., the BLOCK operator) to each of the three packets, prevent each of the three packets from continuing toward its respective destination (e.g., toward threat host 136), and generate log data for each of the three packets.

Figure 5D:
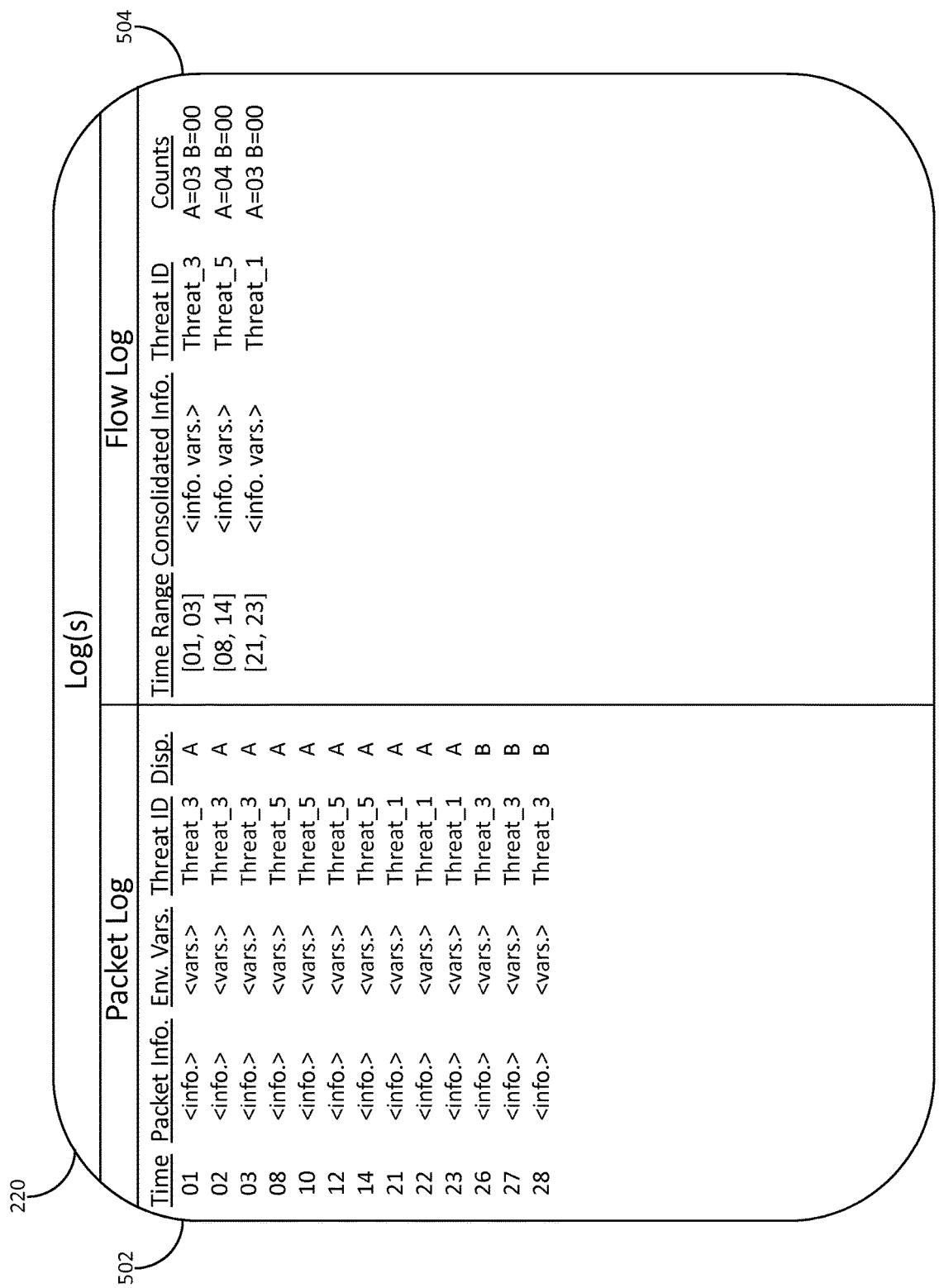

At step 28, packet-filtering device 144 may continue processing the log data generated in step 22 and may begin processing the log data generated in step 27. For example, referring to FIG. 5D, packet-filtering device 144 may generate entries in packet log 502 for each of the packets received in step 27 while generating an entry in flow log 504 for the packets received in step 22 based on the entries generated in packet log 502 (e.g., in step 23) for the packets received in step 22.

Figure 6D:
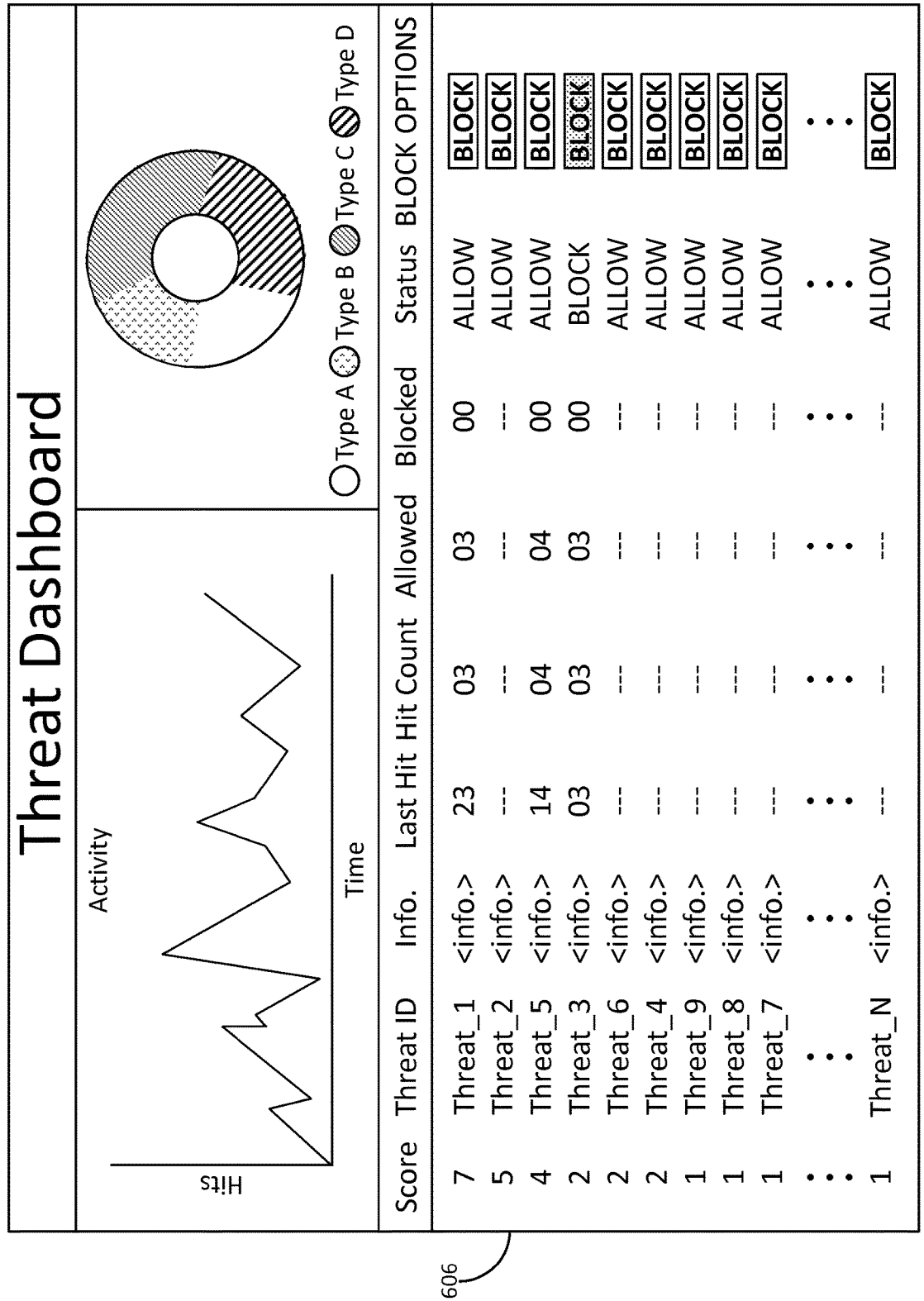

Returning to FIG. 3C, at step 29, packet-filtering device 144 may utilize flow log 504 to generate data comprising an update for interface 600 and may communicate the data to host 110. For example, referring to FIG. 6D, the update may cause interface 600 to update an entry in listing 606 that is associated with the threat associated with Threat ID: Threat_1 to reflect the packets received in step 22, the change in the operator of the packet-filtering rule associated with the threat associated with Thread ID: Threat_3, a new score (e.g., 7) assigned by packet-filtering device 144 to the threat associated with Threat ID: Threat_1 (e.g., the score may have increased based on the packets received in step 22), a new score (e.g., 2) assigned by packet-filtering device 144 to the threat associated with Threat ID: Threat_3 (e.g., the score may have decreased based on the change of the operator in its associated packet-filtering rule), a new score (e.g., 4) assigned by packet-filtering device 144 to the threat associated with Threat ID: Threat_5, and a revised ordering, determined by packet-filtering device 144 based on the new scores.

Figure 3D:
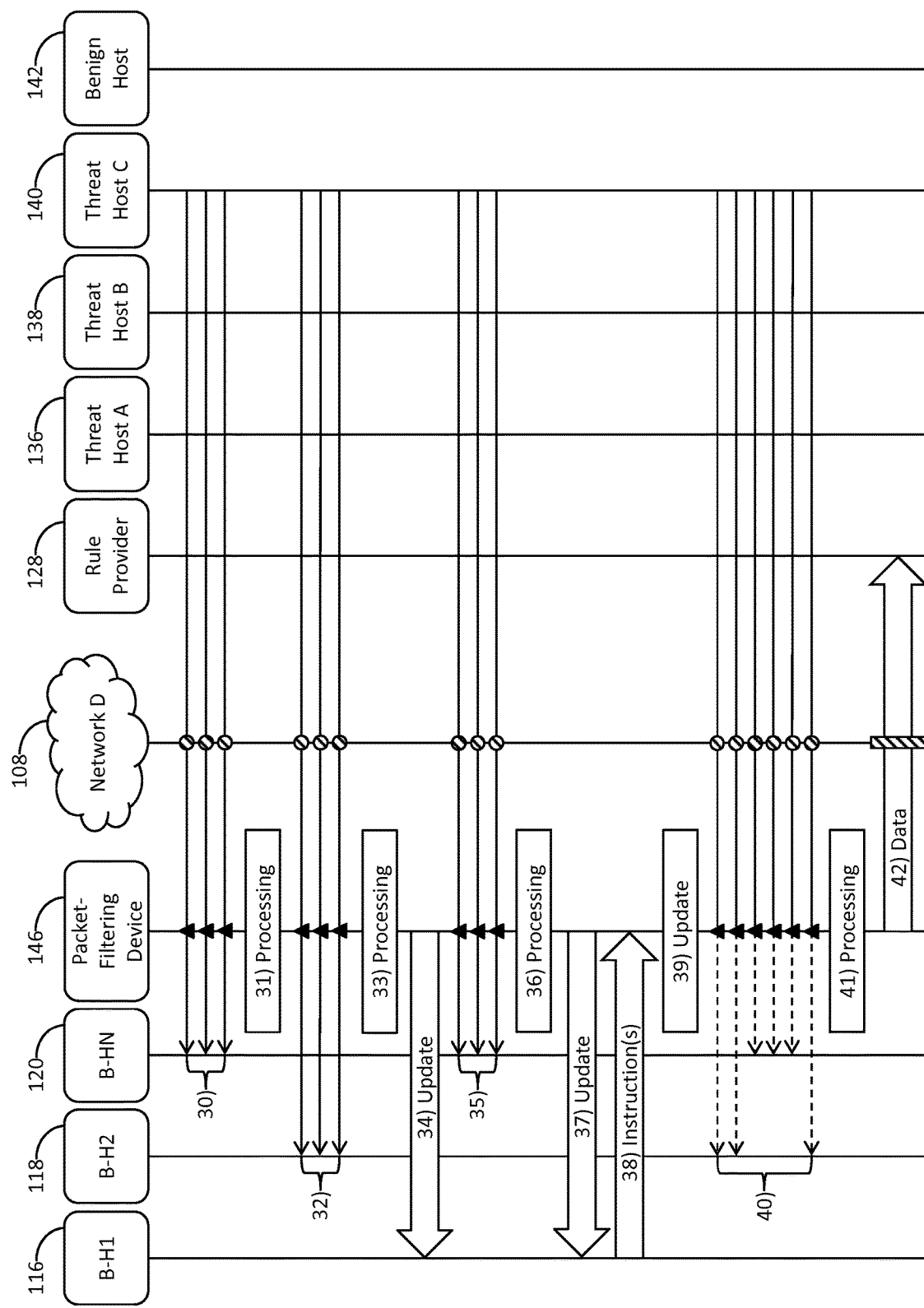

Referring to FIG. 3D, at step 30, three packets destined for host 120 may be communicated by threat host 140, and packet-filtering device 146 may receive each of the three packets, apply one or more of its packet-filtering rules to the three packets, determine that each of the three packets corresponds to criteria specified by a packet-filtering rule (e.g., a rule corresponding to Threat ID: Threat_1), apply an operator specified by the packet-filtering rule (e.g., an ALLOW operator) to each of the three packets, allow each of the three packets to continue toward its respective destination (e.g., toward host 120), and generate log data for each of the three packets. At step 31, packet-filtering device 146 may begin processing the log data generated in step 30.

At step 32, three packets destined for host 118 may be communicated by threat host 140, and packet-filtering device 146 may receive each of the three packets, apply one or more of its packet-filtering rules to the three packets, determine that each of the three packets corresponds to criteria specified by a packet-filtering rule (e.g., the rule corresponding to Threat ID: Threat_1), apply an operator specified by the packet-filtering rule (e.g., an ALLOW operator) to each of the three packets, allow each of the three packets to continue toward its respective destination (e.g., toward host 118), and generate log data for each of the three packets.

At step 33, packet-filtering device 146 may continue processing the log data generated in step 30 and may begin processing the log data generated in step 33. At step 34, packet-filtering device 146 may generate data comprising an update for an interface associated with packet-filtering device 146 and displayed by host 116 (e.g., an interface similar to interface 600) and may communicate the data comprising the update to host 116.

At step 35, three packets destined for host 120 may be communicated by threat host 140, and packet-filtering device 146 may receive each of the three packets, apply one or more of its packet-filtering rules to the three packets, determine that each of the three packets corresponds to criteria specified by a packet-filtering rule (e.g., the rule corresponding to Threat ID: Threat_1), apply an operator specified by the packet-filtering rule (e.g., an ALLOW operator) to each of the three packets, allow each of the three packets to continue toward its respective destination (e.g., toward host 120), and generate log data for each of the three packets. At step 36, packet-filtering device 146 may continue processing the log data generated in step 32 and may begin processing the log data generated in step 35.

At step 37, packet-filtering device 146 may generate data comprising an update for the interface associated with packet-filtering device 146 and displayed by host 116 and may communicate the data comprising the update to host 116. At step 38, host 116 may communicate instructions to packet-filtering device 146 instructing packet-filtering device 146 to reconfigure one or more of its packet-filtering rules (e.g., to reconfigure the operator of the rule corresponding to Threat ID: Threat_1 to BLOCK), and, at step 39, packet-filtering device 146 may reconfigure its packet-filtering rules accordingly.

At step 40, three packets destined for host 118 and three packets destined for host 120 may be communicated by threat host 140, and packet-filtering device 146 may receive each of the six packets, apply one or more of its packet-filtering rules to the six packets, determine that each of the six packets corresponds to criteria specified by a packet-filtering rule (e.g., the rule corresponding to Threat ID: Threat_1), apply an operator specified by the packet-filtering rule (e.g., the BLOCK operator) to each of the six packets, prevent each of the six packets from continuing toward its respective destination, and generate log data for each of the six packets. At step 41, packet-filtering device 146 may continue processing the log data generated in step 35 and may begin processing the log data generated in step 40.

At step 42, packet-filtering device 146 may communicate data to rule provider 128 (e.g., data indicating that fifteen packets corresponding to Threat ID: Threat_1 were received by packet-filtering device 146, packet-filtering device 146 allowed nine of the fifteen packets to continue toward hosts in network 104, and packet-filtering device 146 prevented six of the fifteen packets from continuing toward hosts in network 104).

Figure 3E:
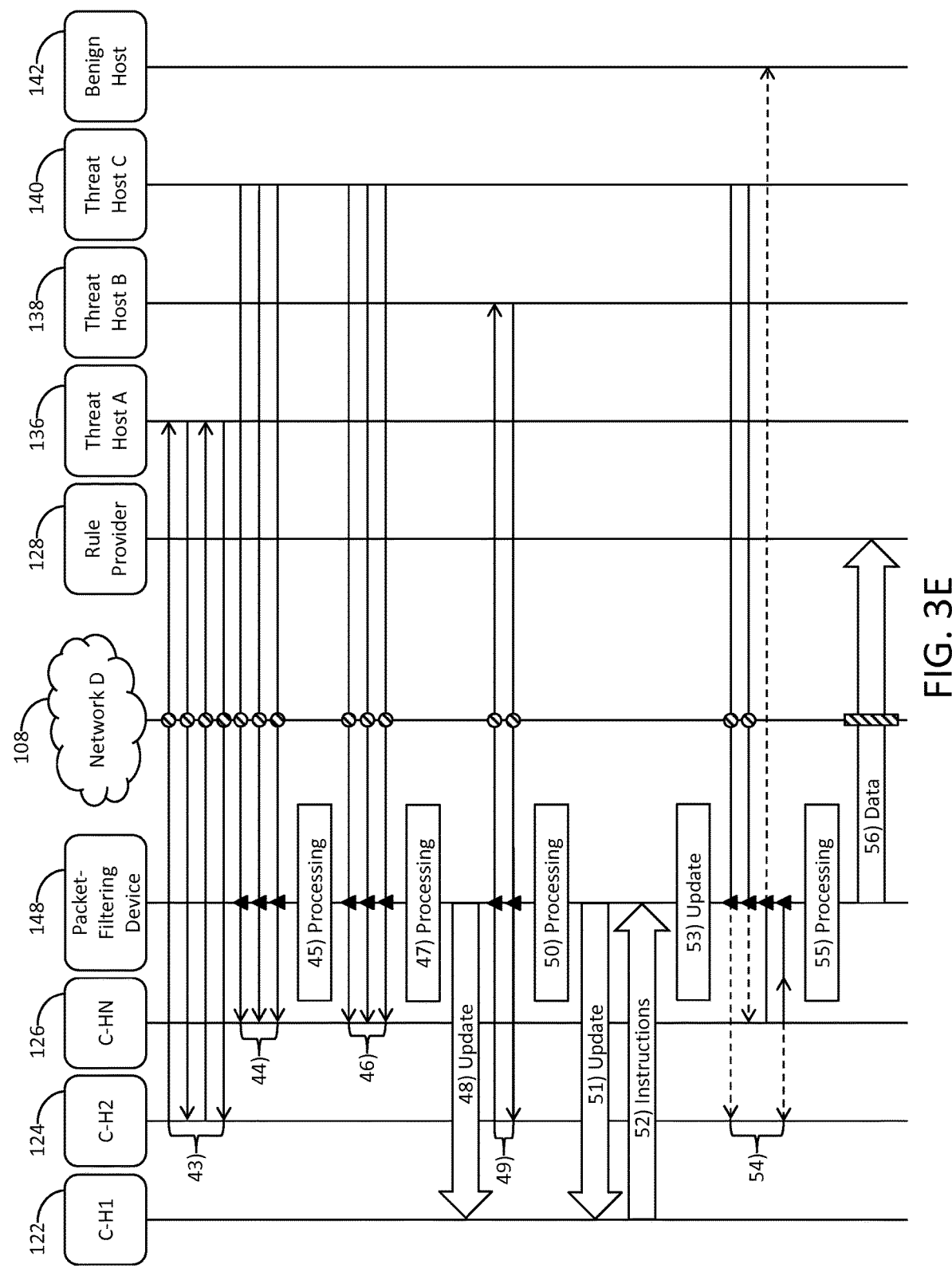

Referring to FIG. 3E, at step 43, four packets may be communicated between host 124 and threat host 136 (e.g., two packets originating from host 124 and destined for threat host 136 and two packets originating from threat host 136 and destined for host 124), and packet-filtering device 148 may receive each of the four packets, apply one or more of its packet-filtering rules to the four packets, and allow the four packets to continue toward their respective destinations.

At step 44, three packets destined for host 126 may be communicated by threat host 140, and packet-filtering device 148 may receive each of the three packets, apply one or more of its packet-filtering rules to the three packets, determine that each of the three packets corresponds to criteria specified by a packet-filtering rule (e.g., a rule corresponding to Threat ID: Threat_1), apply an operator specified by the packet-filtering rule (e.g., an ALLOW operator) to each of the three packets, allow each of the three packets to continue toward its respective destination (e.g., toward host 126), and generate log data for each of the three packets. At step 45, packet-filtering device 148 may begin processing the log data generated in step 44.

At step 46, three packets destined for host 126 may be communicated by threat host 140, and packet-filtering device 148 may receive each of the three packets, apply one or more of its packet-filtering rules to the three packets, determine that each of the three packets corresponds to criteria specified by a packet-filtering rule (e.g., the rule corresponding to Threat ID: Threat_1), apply an operator specified by the packet-filtering rule (e.g., an ALLOW operator) to each of the three packets, allow each of the three packets to continue toward its respective destination (e.g., toward host 126), and generate log data for each of the three packets.

At step 47, packet-filtering device 148 may continue processing the log data generated in step 44 and may begin processing the log data generated in step 47. At step 48, packet-filtering device 148 may generate data comprising an update for an interface associated with packet-filtering device 148 and displayed by host 122 (e.g., an interface similar to interface 600) and may communicate the data comprising the update to host 122.

At step 49, two packets may be communicated between host 124 and threat host 138 (e.g., a packet originating from host 124 and destined for threat host 138 and a packet originating from threat host 138 and destined for host 124), and packet-filtering device 148 may receive each of the two packets, apply one or more of its packet-filtering rules to the two packets, determine that each of the two packets corresponds to criteria specified by a packet-filtering rule (e.g., a rule corresponding to Threat ID: Threat_5), apply an operator specified by the packet-filtering rule (e.g., an ALLOW operator) to each of the two packets, allow each of the two packets to continue toward its respective destination, and generate log data for each of the two packets. At step 50, packet-filtering device 148 may continue processing the log data generated in step 46 and may begin processing the log data generated in step 49.

At step 51, packet-filtering device 148 may generate data comprising an update for the interface associated with packet-filtering device 148 and displayed by host 122 and may communicate the data comprising the update to host 122. At step 52, host 122 may communicate instructions to packet-filtering device 148 instructing packet-filtering device 148 to reconfigure one or more of its packet-filtering rules to block all packets corresponding to the network-threat indicators associated with Threat ID: Threat_1 (e.g., to reconfigure the operator of the rule corresponding to Threat ID: Threat_1 to BLOCK), and to implement one or more new packet-filtering rules configured to block all packets originating from host 126, and, at step 53, packet-filtering device 148 may reconfigure its packet-filtering rules accordingly.

At step 54, threat host 140 may generate a packet destined for host 124 and a packet destined for host 126, host 126 may generate a packet destined for benign host 142 and a packet destined for host 124, and packet-filtering device 148 may receive each of the four packets, apply one or more of its packet-filtering rules to the four packets, determine that the packets generated by threat host 140 correspond to criteria specified by the packet-filtering rule corresponding to Threat ID: Threat_1, apply an operator specified by the packet-filtering rule corresponding to Threat ID: Threat_1 (e.g., the BLOCK operator) to each of the two packets generated by threat host 140, determine that the packets generated by host 126 correspond to criteria specified by the new packet-filtering rules (e.g., a network address associated with host 126), apply an operator specified by the new packet-filtering rules (e.g., the BLOCK operator) to each of the two packets generated by host 126, prevent each of the four packets from continuing toward its respective destination, and generate log data for each of the four packets.

At step 55, packet-filtering device 148 may continue processing the log data generated in step 49 and may begin processing the log data generated in step 54. At step 56, packet-filtering device 148 may communicate data to rule provider 128 (e.g., data indicating that eight packets corresponding to Threat ID: Threat_1 were received by packet-filtering device 148, packet-filtering device 148 allowed six of the eight packets to continue toward hosts in network 106, packet-filtering device 148 prevented two of the eight packets from continuing toward hosts in network 106, two packets corresponding to Threat ID: Threat_5 were received by packet-filtering device 148, and packet-filtering device 148 allowed both of the two packets to continue toward their respective destinations).

Figure 3F:
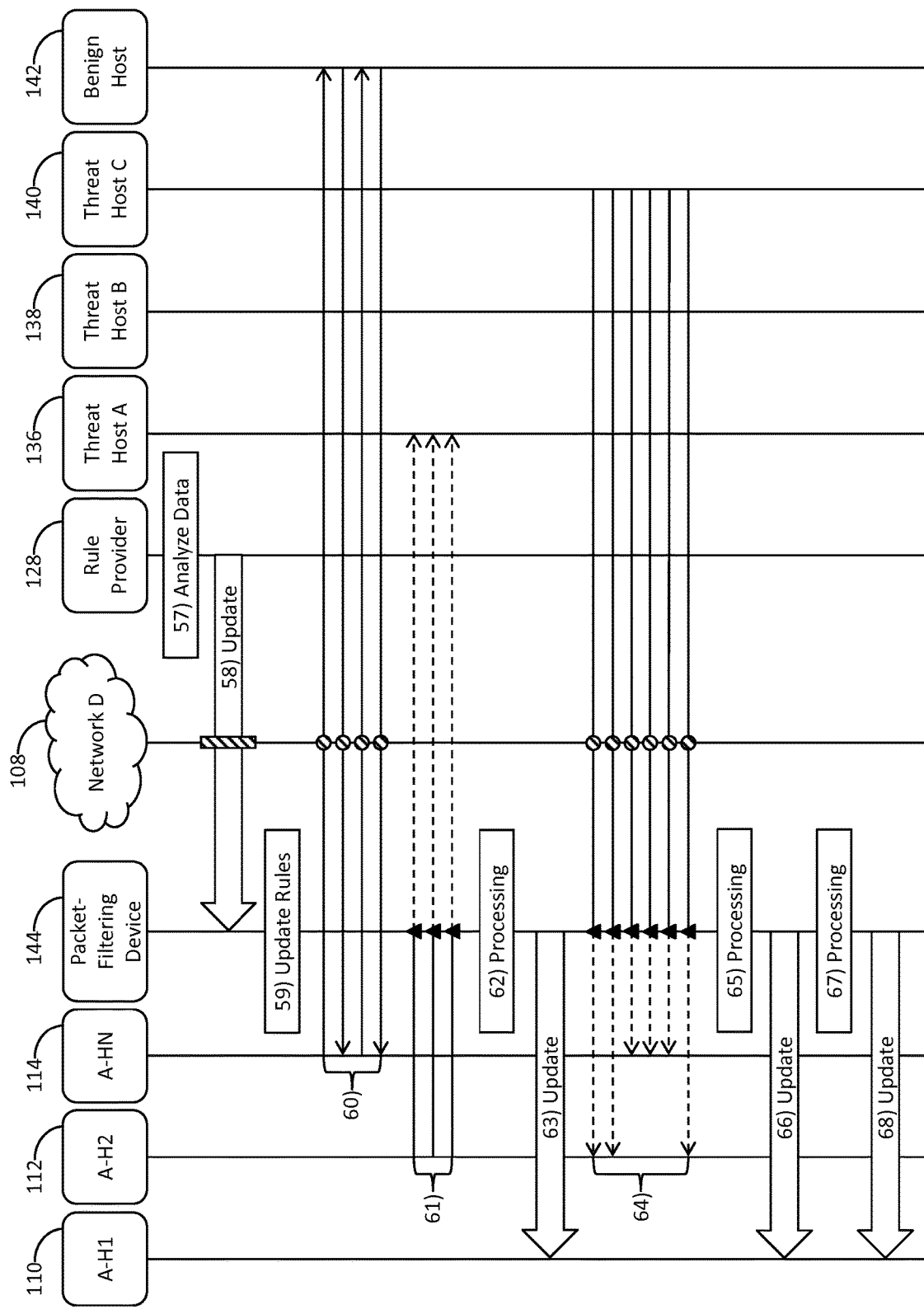
Figure 4C:
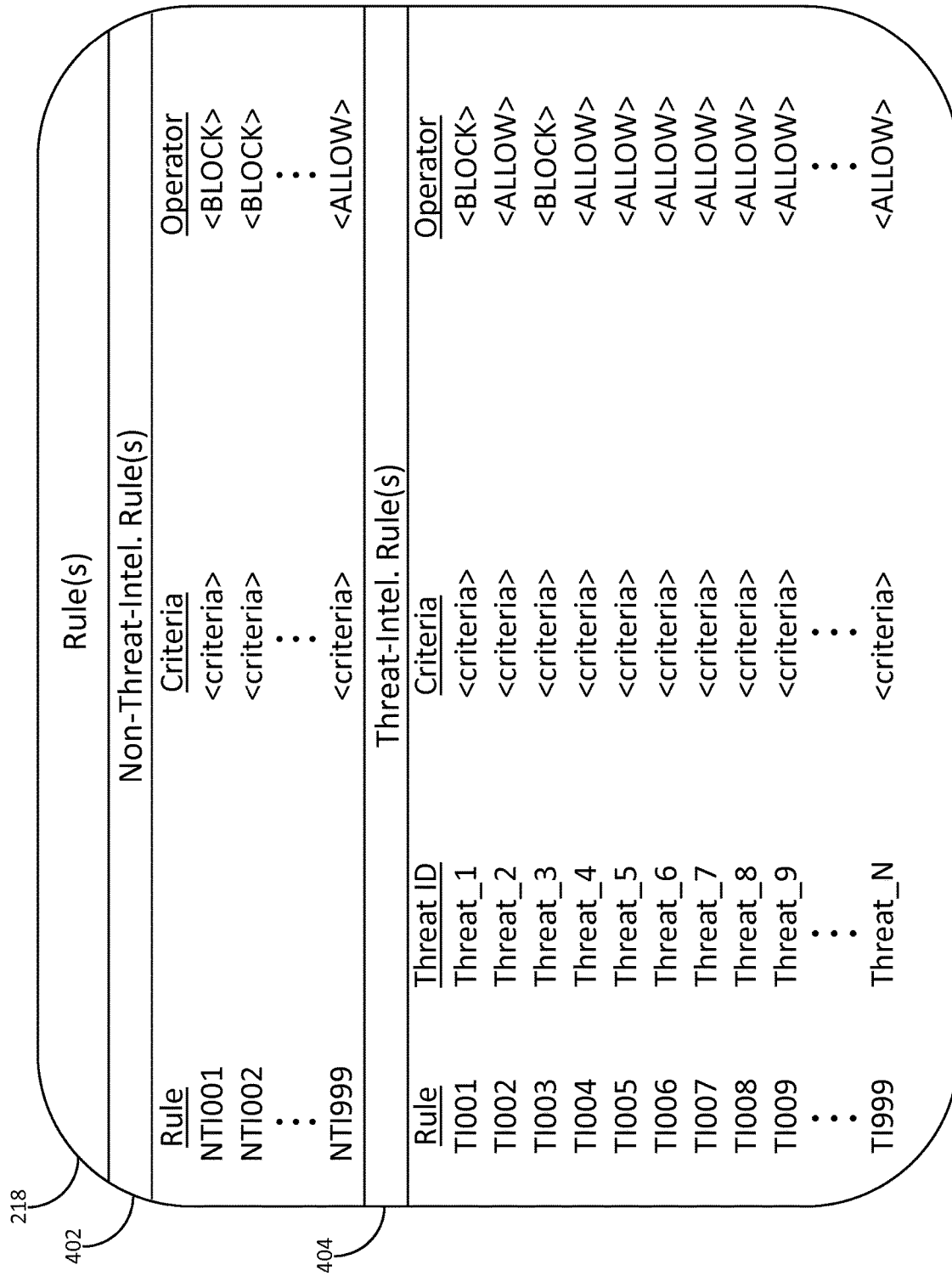

Referring to FIG. 3F, at step 57, rule provider 128 (e.g., computing devices 222) may analyze the data received from packet-filtering devices 146 and 148 (e.g., in steps 42 and 56, respectively) and may generate, based on the analysis, an update for packet-filtering device 148. In some embodiments, the update may be configured to cause packet-filtering device 144 to reconfigure an operator of a packet-filtering rule included in packet-filtering rules 404 (e.g., to reconfigure packet-filtering device 144 to prevent packets corresponding to the criteria specified by the rule from continuing toward their respective destinations). Additionally or alternatively, the update may reconfigure one or more of packet-filtering rules 404 to affect the ordering (e.g., the scoring) of the network threats associated with packet-filtering rules 404. At step 58, rule provider 128 may communicate the updates to packet-filtering device 144, which may receive the updates and, at step 59, may update packet-filtering rules 404 accordingly. For example, the update may be configured to cause packet-filtering device 144 to reconfigure the operator of Rule: TI001 to the BLOCK operator (e.g., to reconfigure packet-filtering device 144 to prevent packets corresponding to the network-threat indicators associated with the network threat corresponding to Threat ID: Threat_1 from continuing toward their respective destinations, and packet-filtering device 144 may reconfigure packet-filtering rules 404 accordingly, as reflected in FIG. 4C).

At step 60, four packets may be communicated between host 114 and benign host 142 (e.g., two packets originating from host 114 and destined for benign host 142 and two packets originating from benign host 142 and destined for host 114), and packet-filtering device 144 may receive each of the four packets, apply one or more of packet-filtering rules 218 to the four packets, and allow the four packets to continue toward their respective destinations.

At step 61, three packets destined for threat host 136 may be communicated by host 112, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI003), apply an operator specified by the packet-filtering rule (e.g., the BLOCK operator) to each of the three packets, prevent each of the three packets from continuing toward its respective destination (e.g., toward threat host 136), and generate log data for each of the three packets.

At step 62, packet-filtering device 144 may continue processing the log data generated in step 27 and may begin processing the log data generated in step 62. For example, referring to FIG. 5E, packet-filtering device 144 may generate entries in packet log 502 for each of the packets received in step 61 while modifying an entry in flow log 504 for the packets received in step 27 based on the entries generated in packet log 502 (e.g., in step 28) for the packets received in step 27, for example, modifying the entry corresponding to Threat ID: Threat_3 (e.g., the time range and the count of associated packets prevented by packet-filtering device 144 from continuing toward their respective destinations).

Figure 6E:
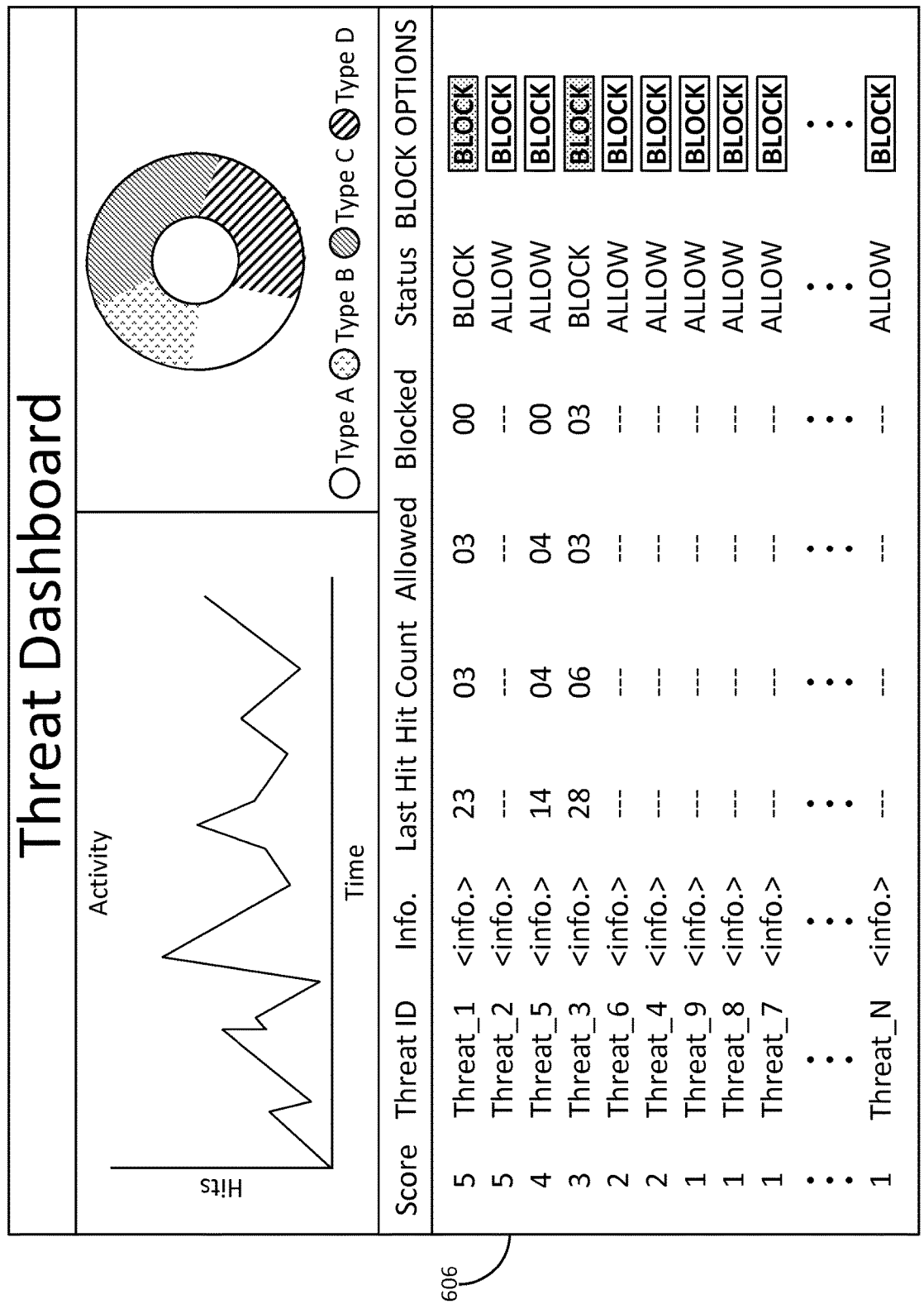

At step 63, packet-filtering device 144 may utilize flow log 504 to generate data comprising an update for interface 600 and may communicate the data to host 110. For example, referring to FIG. 6E, the update may cause interface 600 to update the entry in listing 606 associated with Threat ID: Threat_3 to reflect the packets received in step 27, the change in the operator of the packet-filtering rule associated with Thread ID: Threat_1, a new score (e.g., 3) assigned by packet-filtering device 144 to the threat associated with Threat ID: Threat_3 (e.g., the score may have increased based on the packets received in step 27), and a new score (e.g., 5) assigned by packet-filtering device 144 to the threat associated with Threat ID: Threat_1 (e.g., the score may have decreased based on the change of the operator in its associated packet-filtering rule).

At step 64, three packets destined for host 112 and three packets destined for host 114 may be communicated by threat host 140, and packet-filtering device 144 may receive each of the six packets, apply one or more of packet-filtering rules 218 to the three packets, determine that each of the three packets corresponds to criteria specified by a packet-filtering rule of packet-filtering rules 404 (e.g., Rule: TI001), apply an operator specified by the packet-filtering rule (e.g., the BLOCK operator) to each of the six packets, prevent each of the six packets from continuing toward its respective destination, and generate log data for each of the six packets.

At step 65, packet-filtering device 144 may continue processing the log data generated in step 61 and may begin processing the log data generated in step 64. For example, referring to FIG. 5F, packet-filtering device 144 may generate entries in packet log 502 for each of the packets received in step 64 while modifying an entry in flow log 504 for the packets received in step 61 based on the entries generated in packet log 502 (e.g., in step 62) for the packets received in step 61, for example, modifying the entry corresponding to Threat ID: Threat_3 (e.g., the time range and the count of associated packets prevented by packet-filtering device 144 from continuing toward their respective destinations).

Figure 6F:
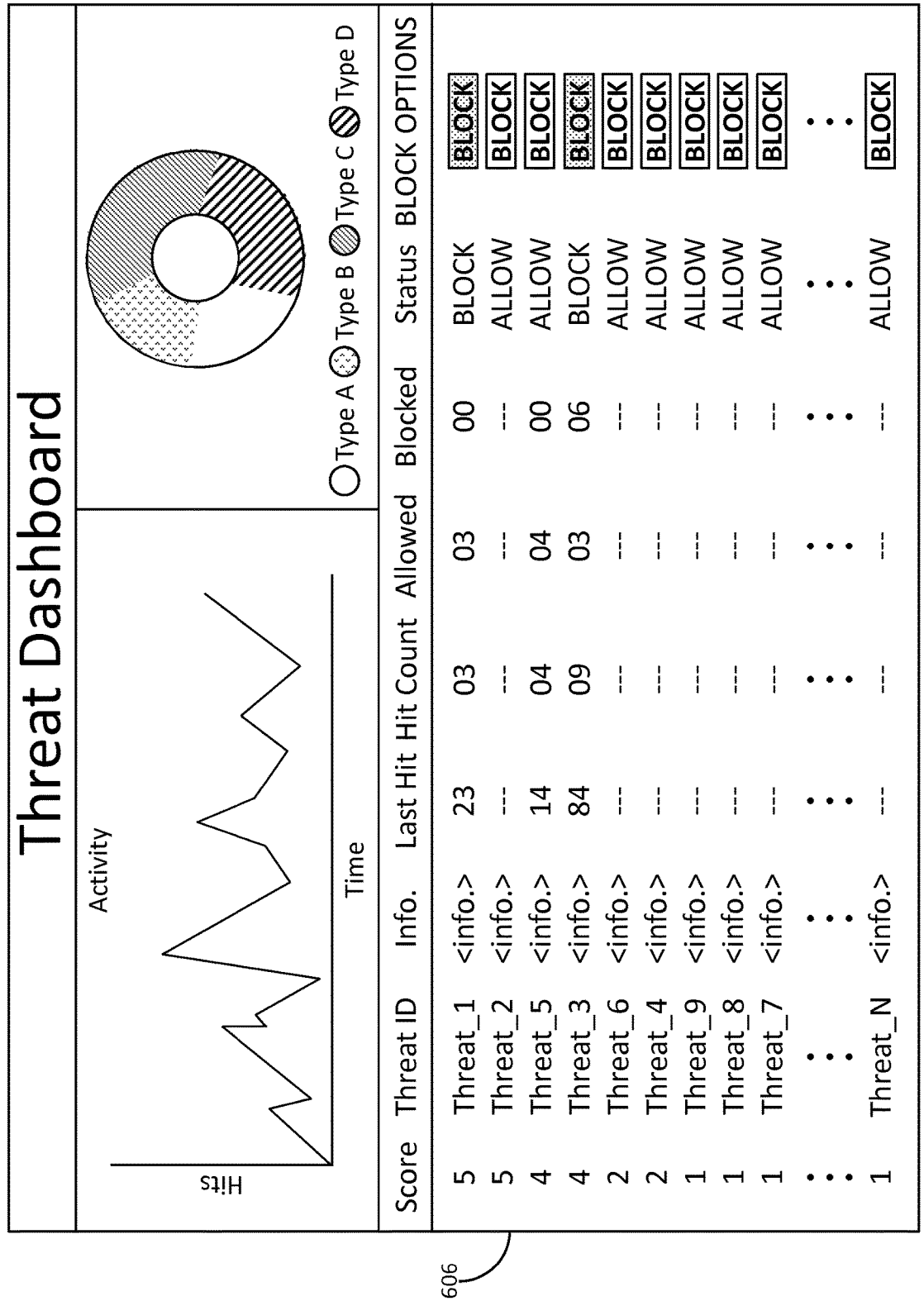

At step 66, packet-filtering device 144 may utilize flow log 504 to generate data comprising an update for interface 600 and may communicate the data to host 110. For example, referring to FIG. 6F, the update may cause interface 600 to update the entry in listing 606 associated with Threat ID: Threat_3 to reflect the packets received in step 61 and a new score (e.g., 3) assigned by packet-filtering device 144 to the threat associated with Threat ID: Threat_3 (e.g., the score may have increased based on the packets received in step 61).

At step 67, packet-filtering device 144 may continue processing the log data generated in step 64. For example, referring to FIG. 5G, packet-filtering device 144 may modify an entry in flow log 504 for the packets received in step 64 based on the entries generated in packet log 502 (e.g., in step 65) for the packets received in step 64, for example, modifying the entry corresponding to Threat ID: Threat_1 (e.g., the time range and the count of associated packets prevented by packet-filtering device 144 from continuing toward their respective destinations).

Figure 6G:
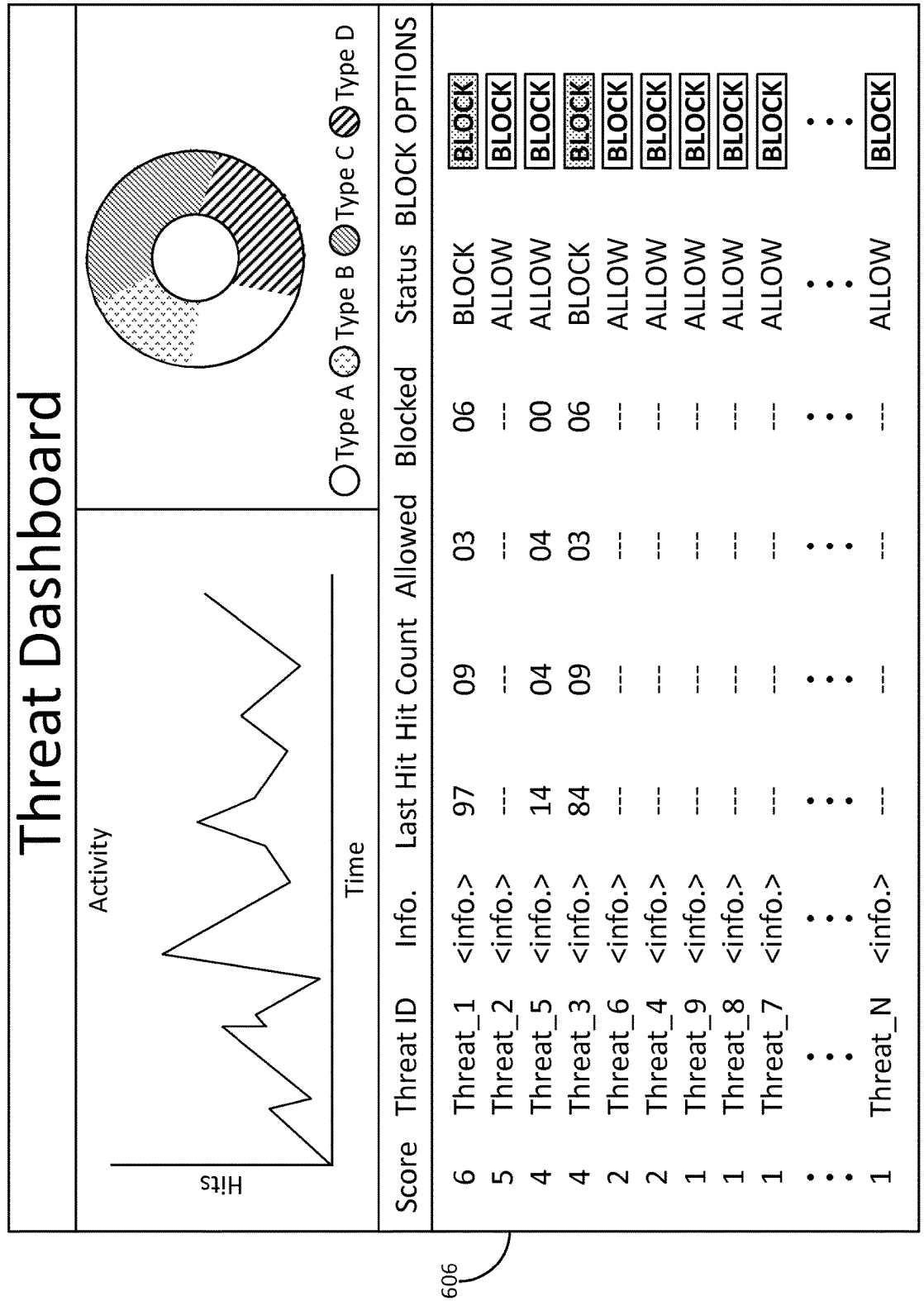

At step 68, packet-filtering device 144 may utilize flow log 504 to generate data comprising an update for interface 600 and may communicate the data to host 110. For example, referring to FIG. 6G, the update may cause interface 600 to update the entry in listing 606 associated with Threat ID: Threat_1 to reflect the packets received in step 64 and a new score (e.g., 6) assigned by packet-filtering device 144 to the threat associated with Threat ID: Threat_1 (e.g., the score may have increased based on the packets received in step 64).

Figure 7:
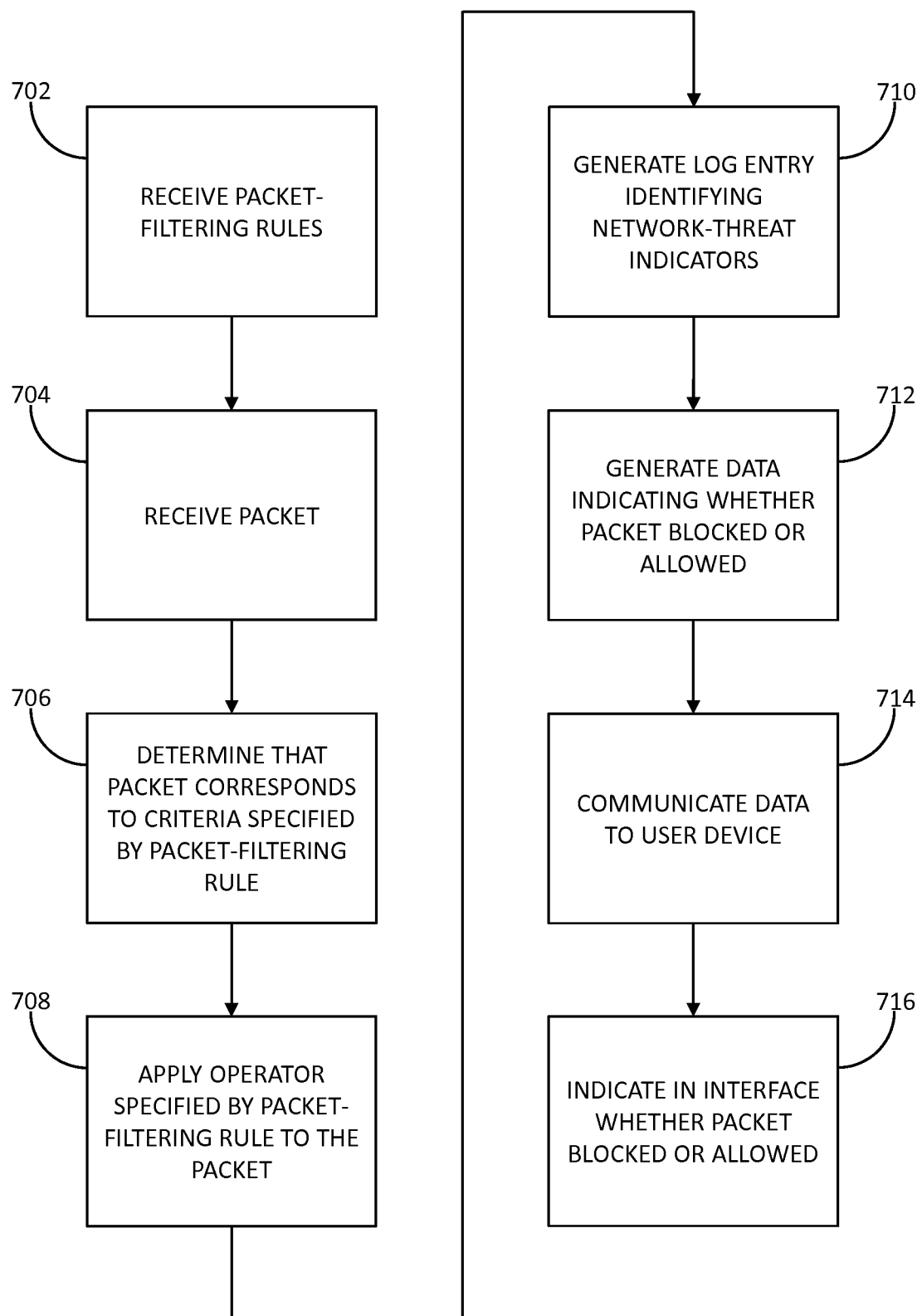
FIG. 7 depicts an illustrative method for rule-based network-threat detection in accordance with one or more aspects of the disclosure.

FIG. 7 depicts an illustrative method for rule-based network-threat detection in accordance with one or more aspects of the disclosure. Referring to FIG. 7, at step 702, a packet-filtering device may receive a plurality of packet-filtering rules configured to cause the packet-filtering device to identify packets corresponding to one or more network-threat indicators. For example, packet-filtering device 144 may receive packet-filtering rules 404 from rule provider 128. At step 704, the packet-filtering device may receive a packet corresponding to at least one of the network-threat indicators. For example, packet-filtering device 144 may receive a packet generated by host 112 and destined for threat host 136. At step 706, the packet-filtering device may determine that the packet corresponds to criteria specified by one of the plurality of packet-filtering rules. For example, packet-filtering device 144 may determine that the packet generated by host 112 and destined for threat host 136 corresponds to Rule: TI003. At step 708, the packet-filtering device may apply an operator specified by the packet-filtering rule to the packet. For example, packet-filtering device 144 may apply an operator (e.g., an ALLOW operator) specified by Rule: TI003 to the packet generated by host 112 and may allow the packet generated by host 112 to continue toward threat host 136.

At step 710, the packet-filtering device may generate a log entry comprising information from the packet-filtering rule that is distinct from the criteria and identifies the one or more network-threat indicators. For example, packet-filtering device 144 may generate an entry in packet log 502 comprising Threat ID: Threat_3 for the packet generated by host 112. At step 712, the packet-filtering device may generate data indicating whether the packet-filtering device prevented the packet from continuing toward its destination (e.g., blocked the packet) or allowed the packet to continue toward its destination. For example, packet-filtering device 144 may generate data comprising an update for interface 600 that indicates that packet-filtering device 144 allowed the packet generated by host 112 to continue toward threat host 136. At step 714, the packet-filtering device may communicate the data to a user device. For example, packet-filtering device 144 may communicate the data comprising the update for interface 600 to host 110. At step 716, the packet-filtering device may indicate in an interface whether the packet-filtering device prevented the packet from continuing toward its destination or allowed the packet to continue toward its destination. For example, communicating the data comprising the update for interface 600 may cause host 110 to indicate in interface 600 that packet-filtering device 144 allowed the packet generated by host 112 to continue toward threat host 136.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

The invention claimed is:

1. A packet-filtering device providing an interface across a boundary between a protected network and an unprotected network and configured to minimize latency between when a packet corresponding to a network threat crosses the boundary and when the network threat is included in an ordered list of network threats, wherein the packet-filtering device comprises:
    one or more processors, and
    memory storing instructions that, when executed by the one or more processors, cause the packet-filtering device to:
        receive, from a second device, a plurality of packet-filtering rules to be applied, by the packet-filtering device, to all network traffic traversing the boundary, wherein the plurality of packet-filtering rules were generated based on a plurality of network-threat-intelligence reports supplied by a plurality of independent network-threat-intelligence providers, wherein each network-threat-intelligence report comprises one or more network threat indicators each comprising at least one respective network address that has been previously determined, by one or more of the plurality of independent network-threat-intelligence providers, to be associated with a potential network threat, and wherein a first packet-filtering rule of the plurality of packet-filtering rules specifies one or more first packet-matching criteria corresponding to one or more first network-threat indicators associated with a first potential network threat;
        receive a first packet crossing the boundary between the protected network and the unprotected network;
        filter the first packet based on comparing the first packet to packet-matching criteria specified by the plurality of packet-filtering rules, wherein filtering the first packet comprises determining that the first packet corresponds to the one or more first network-threat indicators associated with the first potential network threat;
        responsive to a determination that the filtered first packet matches the first packet-matching criteria of the first packet-filtering rule, and when the filtered first packet corresponding to the first potential network threat is filtered by the packet-filtering device, generate:
            a first log entry corresponding to the first potential network threat, and
            a first score for the first potential network threat based on information associated with the first potential network threat;
        send, to the second device, the first log entry;
        cause the first log entry to be added to the ordered list of network threats, wherein an ordering of the ordered list of network threats is determined based on the first score for the first potential network threat;
        receive, from the second device, an update configured to cause the packet-filtering device to reconfigure the first packet-filtering rule to affect scoring of network threats associated with the first packet-filtering rule;
        receive a second packet crossing the boundary between the protected network and the unprotected network;
        filter the second packet based on the reconfigured first packet-filtering rule, wherein filtering the second packet comprises determining that the second packet corresponds to the one or more first network-threat indicators associated with the first potential network threat;
        generate, based on the filtering the second packet and based on the reconfigured first packet-filtering rule:
            a second log entry corresponding to the first potential network threat, and
            a second score for the first potential network threat different from the first score;
        cause a modification to the ordering of the ordered list of network threats based on the first score and the second score; and
        cause display of the ordered list of network threats.

2. The packet-filtering device of claim 1, wherein the instructions, when executed by the one or more processors, cause the packet-filtering device to cause the modification to the ordering of the ordered list of network threats by changing a location, in the ordered list, of an entry corresponding to the first potential network threat.

3. The packet-filtering device of claim 1, wherein the instructions, when executed by the one or more processors, cause the packet-filtering device to reconfigure the first packet-filtering rule based on one or more of:
 a number of packet hits associated with the filtered first packet;
 times associated with the packet hits;
 a count of the network-threat-intelligence providers that provided a network-threat indicator associated with the first packet-filtering rule;
 whether the filtered first packet was destined for a network address associated with a network host;
 geographic information associated with the filtered first packet; or
 whether the filtered first packet is associated with an anonymous proxy.

4. The packet-filtering device of claim 1, wherein the first log entry further comprises a third indication of one or more of:
 whether the packet-filtering device prevented the filtered first packet from continuing toward its destination or allowed the filtered first packet to continue to its destination,
 a type of threat,
 geographic information, or
 an actor associated with the filtered first packet.

5. The packet-filtering device of claim 1, wherein the instructions, when executed by the one or more processors, cause the packet-filtering device to:
 based on the second log entry, cause updating of a flow log entry in a second list, wherein the flow log entry consolidates a plurality of log entries.

6. The packet-filtering device of claim 1, wherein the instructions, when executed by the one or more processors, cause the packet-filtering device to determine the first score further based on one or more of:
 a count of the network-threat-intelligence providers that provided a network-threat indicator associated with the first packet-filtering rule, or
 an identity of a first independent network-threat-intelligence provider of the plurality of independent network-threat-intelligence providers that supplied the one or more first network-threat indicators.

7. The packet-filtering device of claim 1, wherein the first packet-filtering rule was generated based on two or more network-threat-intelligence reports supplied by at least two different network-threat-intelligence providers.

8. The packet-filtering device of claim 1, wherein the first packet-filtering rule of the plurality of packet-filtering rules further specifies:
 at least one first network-threat-intelligence report that supplied the first network-threat indicators; and
 at least one first network-threat-intelligence provider that supplied the first network-threat-intelligence report.

9. The packet-filtering device of claim 1, wherein the first packet-filtering rule of the plurality of packet-filtering rules further specifies one or more of:
 a type of the first potential network threat;
 geographic information;
 anonymous proxy information; or
 anonymous actor information.

10. A packet-filtering device providing an interface across a boundary between a protected network and an unprotected network and configured to minimize latency between when a packet corresponding to a network threat crosses the boundary and when the network threat is included in an ordered list of network threats maintained by a second device, wherein the packet-filtering device comprises:
 one or more processors, and
 memory storing instructions that, when executed by the one or more processors, cause the packet-filtering device to:
  receive a plurality of packet-filtering rules to be applied, by the packet-filtering device, to all network traffic traversing the boundary, wherein the plurality of packet-filtering rules were generated based on a plurality of network-threat-intelligence reports supplied by a plurality of independent network-threat-intelligence providers, wherein each network-threat-intelligence report comprises one or more network threat indicators each comprising at least one respective network address that has been previously determined, by one or more of the plurality of independent network-threat-intelligence providers, to be associated with a potential network threat, and wherein a first packet-filtering rule of the plurality of packet-filtering rules specifies one or more first packet-matching criteria corresponding to one or more first network-threat indicators associated with a first potential network threat;
  receive a first packet crossing the boundary between the protected network and the unprotected network;
  filter the first packet based on comparing the first packet to packet-matching criteria specified by the plurality of packet-filtering rules, wherein filtering the first packet comprises determining that the first packet corresponds to the one or more first network-threat indicators associated with the first potential network threat;
  responsive to a determination that the filtered first packet matches the first packet-matching criteria of the first packet-filtering rule, and when the filtered first packet corresponding to the first potential network threat is filtered by the packet-filtering device, generate:
   a first log entry corresponding to the first potential network threat, and
   a first score for the first potential network threat based on information associated with the first potential network threat;
  cause at least a portion of the first log entry to be added to the ordered list of network threats by sending, to the second device, the first log entry, wherein an ordering of the ordered list of network threats is determined based on the first score for the first potential network threat;
  receive, from the second device, an update configured to cause the packet-filtering device to reconfigure the first packet-filtering rule to affect scoring of network threats associated with the first packet-filtering rule;
  receive a second packet crossing the boundary between the protected network and the unprotected network;
  filter the second packet based on the reconfigured first packet-filtering rule, wherein filtering the second packet comprises determining that the second packet corresponds to the one or more first network-threat indicators associated with the first potential network threat;
  generate, based on the filtering the second packet and based on the reconfigured first packet-filtering rule:
   a second log entry corresponding to the first potential network threat, and a second score for the first potential network threat different from the first score;
cause a modification to the ordering of the ordered list of network threats based on the first score and the second score; and
cause display of the ordered list of network threats.

11. The packet-filtering device of claim 10, wherein the instructions, when executed by the one or more processors, cause the packet-filtering device to receive the plurality of packet-filtering rules by causing the packet-filtering device to receive, from the second device, the plurality of packet-filtering rules.

12. The packet-filtering device of claim 10, wherein the instructions, when executed by the one or more processors, cause the packet-filtering device to cause the modification to the ordering of the ordered list of network threats by changing a location, in the ordered list, of an entry corresponding to the first potential network threat.

13. The packet-filtering device of claim 10, wherein the instructions, when executed by the one or more processors, cause the packet-filtering device to reconfigure the first packet-filtering rule based on one or more of:
a number of packet hits associated with the filtered first packet;
times associated with the packet hits;
a count of the network-threat-intelligence providers that provided a network-threat indicator associated with the first packet-filtering rule;
whether the filtered first packet was destined for a network address associated with a network host;
geographic information associated with the filtered first packet; or
whether the filtered first packet is associated with an anonymous proxy.

14. The packet-filtering device of claim 10, wherein the first log entry further comprises a third indication of one or more of:
whether the packet-filtering device prevented the filtered first packet from continuing toward its destination or allowed the filtered first packet to continue to its destination,
a type of threat,
geographic information, or
an actor associated with the filtered first packet.

15. The packet-filtering device of claim 10, wherein the instructions, when executed by the one or more processors, cause the packet-filtering device to:
based on the second log entry, cause updating of a flow log entry in a second list, wherein the flow log entry consolidates a plurality of log entries.

16. The packet-filtering device of claim 10, wherein the instructions, when executed by the one or more processors, cause the packet-filtering device to determine the first score further based on one or more of:
a count of the network-threat-intelligence providers that provided a network-threat indicator associated with the first packet-filtering rule, or
an identity of a first independent network-threat-intelligence provider of the plurality of independent network-threat-intelligence providers that supplied the one or more first network-threat indicators.

17. The packet-filtering device of claim 10, wherein the first packet-filtering rule was generated based on two or more network-threat-intelligence reports supplied by at least two different network-threat-intelligence providers.

18. The packet-filtering device of claim 10, wherein the first packet-filtering rule of the plurality of packet-filtering rules further specifies:
at least one first network-threat-intelligence report that supplied the first network-threat indicators; and
at least one first network-threat-intelligence provider that supplied the first network-threat-intelligence report.

19. The packet-filtering device of claim 10, wherein the first packet-filtering rule of the plurality of packet-filtering rules further specifies one or more of:
a type of the first potential network threat;
geographic information;
anonymous proxy information; or
anonymous actor information.

20. A packet-filtering device providing an interface across a boundary between a protected network and an unprotected network and configured to minimize latency between when a packet corresponding to a network threat crosses the boundary and when the network threat is included in an ordered list of network threats, wherein the packet-filtering device comprises:
one or more processors, and
memory storing instructions that, when executed by the one or more processors, cause the packet-filtering device to:
receive a plurality of packet-filtering rules to be applied, by the packet-filtering device, to all network traffic traversing the boundary, wherein the plurality of packet-filtering rules were generated based on a plurality of network-threat-intelligence reports supplied by a plurality of independent network-threat-intelligence providers, wherein each network-threat-intelligence report comprises one or more network threat indicators each comprising at least one respective network address that has been previously determined, by one or more of the plurality of independent network-threat-intelligence providers, to be associated with a potential network threat, and wherein a first packet-filtering rule of the plurality of packet-filtering rules specifies one or more first packet-matching criteria corresponding to one or more first network-threat indicators associated with a first potential network threat;
receive a first packet crossing the boundary between the protected network and the unprotected network, wherein the first packet is part of a first packet flow;
filter the first packet based on comparing the first packet to packet-matching criteria specified by the plurality of packet-filtering rules, wherein filtering the first packet comprises determining that the first packet corresponds to the one or more first network-threat indicators associated with the first potential network threat;
responsive to a determination that the filtered first packet matches the first packet-matching criteria of the first packet-filtering rule, and when the filtered first packet corresponding to the first potential network threat is filtered by the packet-filtering device, generate:
a first log entry corresponding to the first potential network threat, and
a first score for the first potential network threat based on information associated with the first potential network threat;
cause at least a portion of the first log entry to be added to the ordered list of network threats by sending, to a second device, the first log entry, wherein an ordering of the ordered list of network threats is determined based on the first score for the first potential network threat;

modify, based on the first log entry and the first score, a flow log entry corresponding to the first potential network threat;

receive, from the second device, an update configured to cause the packet-filtering device to reconfigure the first packet-filtering rule to affect scoring of network threats associated with the first packet-filtering rule;

receive a second packet crossing the boundary between the protected network and the unprotected network, wherein the second packet is part of the first packet flow;

filter the second packet based on the reconfigured first packet-filtering rule, wherein filtering the second packet comprises determining that the second packet corresponds to the one or more first network-threat indicators associated with the first potential network threat;

generate, based on the filtering the second packet and based on the reconfigured first packet-filtering rule, a second log entry corresponding to the first potential network threat, wherein the second log entry corresponds to a second score different from the first score;

cause a modification to the ordering of the ordered list of network threats based on the first score and the second score; and modify, based on the second log entry and the second score, the flow log entry corresponding to the first potential network threat.

21. The packet-filtering device of claim 20, wherein the instructions, when executed by the one or more processors, cause the packet-filtering device to receive the plurality of packet-filtering rules by causing the packet-filtering device to receive, from the second device, the plurality of packet-filtering rules.

22. The packet-filtering device of claim 20, wherein the instructions, when executed by the one or more processors, cause the packet-filtering device to modify, based on the first log entry and the first score, the flow log entry corresponding to the first potential network threat by causing the packet-filtering device to add the flow log entry to a flow log.

23. The packet-filtering device of claim 20, wherein the instructions, when executed by the one or more processors, cause the packet-filtering device to reconfigure the first packet-filtering rule based on one or more of:

a number of packet hits associated with the filtered second packet;

times associated with the packet hits;

a count of the network-threat-intelligence providers that provided a network-threat indicator associated with the first packet-filtering rule;

whether the filtered second packet was destined for a network address associated with a network host;

geographic information associated with the filtered second packet; or whether the filtered second packet is associated with an anonymous proxy.

24. The packet-filtering device of claim 20, wherein the first log entry further comprises a third indication of whether the packet-filtering device prevented the filtered first packet from continuing toward its destination or allowed the filtered first packet to continue to its destination.

25. The packet-filtering device of claim 20, wherein the first log entry further comprises a fourth indication of one or more of:

a type of threat, geographic information, or an actor associated with the filtered first packet.

26. The packet-filtering device of claim 20, wherein the flow log entry consolidates a plurality of log entries associated with the first potential network threat.

27. The packet-filtering device of claim 20, wherein the flow log entry is part of a plurality of packet flow entries, and wherein each of the plurality of packet flow entries corresponds to a different potential network threat.

28. The packet-filtering device of claim 20, wherein the flow log entry corresponds to a time range of a plurality of log entries corresponding to the first potential network threat.

29. The packet-filtering device of claim 20, wherein the instructions, when executed by the one or more processors, cause the packet-filtering device to modify the flow log entry corresponding to the first potential network threat by causing modification to an ordering of a flow log comprising the flow log entry.

30. The packet-filtering device of claim 20, wherein the instructions, when executed by the one or more processors, cause the packet-filtering device to modify the flow log entry corresponding to the first potential network threat by causing modification to a third score associated with the flow log entry.

* * * * *

UNITED STATES PATENT AND TRADEMARK OFFICE
CERTIFICATE OF CORRECTION

PATENT NO. : 11,792,220 B2
APPLICATION NO. : 18/200801
DATED : October 17, 2023
INVENTOR(S) : Ahn et al.

It is certified that error appears in the above-identified patent and that said Letters Patent is hereby corrected as shown below:

On the Title Page

Column 2, Other Publications, Line 1:
Delete "Softward" and insert --Software-- therefor Page 6, Column 1, Other Publications, Line 56:
Delete "Nullty" and insert --Nullity-- therefor Page 7, Column 2, Other Publications, Line 17:
Delete "Staurt" and insert --Stuart-- therefor Page 8, Column 1, Other Publications, Line 45:
Delete "Miscroscope" and insert --Microscope-- therefor Page 9, Column 1, Other Publications, Line 64:
Delete "datd" and insert --dated-- therefor Page 13, Column 2, Other Publications, Line 8:
Delete ""Snort --Lightwegith" and insert --"Snort --Lightweight-- therefor Signed and Sealed this
Twenty-sixth Day of March, 2024

Katherine Kelly Vidal
*Director of the United States Patent and Trademark Office*